United States Patent
Faibish

(10) Patent No.: US 11,514,295 B2
(45) Date of Patent: Nov. 29, 2022

(54) CONTINUOUS LEARNING TECHNIQUES WITH MACHINE LEARNING SYSTEMS TO ADAPT TO NEW INPUT DATA SETS

(71) Applicant: EMC IP Holding Company LLC, Hopkinton, MA (US)

(72) Inventor: Sorin Faibish, Newton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 643 days.

(21) Appl. No.: 16/663,682

(22) Filed: Oct. 25, 2019

(65) Prior Publication Data
US 2021/0125053 A1    Apr. 29, 2021

(51) Int. Cl.
*G06N 3/04*    (2006.01)

(52) U.S. Cl.
CPC ................. *G06N 3/0454* (2013.01)

(58) Field of Classification Search
None
See application file for complete search history.

(56) References Cited

PUBLICATIONS

Han et al, "DSD: Dense-Sparse-Dense Training for Deep Neural Networks", Feb. 2017, arXiv, all pages (Year: 2017).*

* cited by examiner

*Primary Examiner* — Daniel C Puentes
(74) *Attorney, Agent, or Firm* — Muirhead and Saturnelli, LLC

(57) ABSTRACT

Continuous learning may include receiving a first neural network trained using a first training data set to predict outputs; determining whether the first neural network has a successful prediction rate greater than a prediction threshold; and responsive to determining the first neural network does not have a successful prediction rate greater than the prediction threshold, performing processing. The processing may include training the first neural network using a second training data set different than the first training data set; determining that a trigger condition has occurred, wherein the trigger condition includes detecting, during training of the first neural network using the second training data set, that a first weight of the first neural network has a corresponding weight change exceeding a threshold weight change; responsive to determining the trigger condition has occurred, reconfiguring the first neural network; and training the reconfigured first neural network using the second training data set.

19 Claims, 42 Drawing Sheets

| Hidden layer 1 | Hidden layer 2 | Hidden layer N | Output Layer |
|---|---|---|---|
| Neuron 1.1, Wgt1 | Neuron 2.1, Wgt1 | Neuron N.1, Wgt1 | Neuron N+1.1, Wgt1 |
| Neuron 1.1, Wgt2 | Neuron 2.2, Wgt2 | Neuron N.2, Wgt 2 | Neuron N+1.2, Wgt2 |
| .. | .. | .. | .. |
| .. | .. | .. | .. |
| Neuron 1. Max, Wgt1 | Neuron 2. Max, Wgt1 | Neuron N. Max, Wgt1 | Neuron N+1. Max, Wgt1 |
| Neuron 1. Max, Wgt2 | Neuron 2.Max, Wgt2 | Neuron N.Max, Wgt2 | Neuron N+1.Max, Wgt2 |
| .. | .. | .. | .. |

CONTINUOUS LEARNING TECHNIQUES WITH MACHINE LEARNING SYSTEMS TO ADAPT TO NEW INPUT DATA SETS

BACKGROUND

Technical Field

This application generally relates to machine learning systems.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein, a method, a system and a computer readable medium may be used to perform continuous learning techniques comprising: receiving a first neural network that is trained using a first training data set to predict a first set of one or more outputs; determining whether the first neural network has a successful prediction rate greater than a prediction threshold; and responsive to determining the first neural network does not have a successful prediction rate greater than the prediction threshold, performing first processing including: training the first neural network using a second training data set different than the first training data set, wherein during said training of the first neural network using the second training data set, weights of the first neural network are adjusted; determining that a trigger condition has occurred, wherein the trigger condition includes detecting, during said training of the first neural network using the second training data set, that at least a first weight of the first neural network has a corresponding weight change exceeding a threshold weight change; responsive to determining the trigger condition has occurred, performing second processing that reconfigures the first neural network and generates a reconfigured first neural network; and training the reconfigured first neural network, rather than the first neural network, using the second training data set.

In at least one embodiment, the trigger condition may be one of a plurality of trigger conditions, and wherein if any one or more of the plurality of trigger conditions occurs in connection with said training of the first neural network with the second training data set, the second processing may be performed. The plurality of trigger conditions may include a second trigger condition that includes determining that said training of the first neural network using the second training data set results in the first neural network obtaining a successful prediction rate that is not greater than the prediction threshold for at least a specified amount of time.

In at least one embodiment, a first data set may include first inputs and corresponding first outputs and the first neural network may be known to have a successful prediction rate that is not greater than the prediction threshold when predicting outputs for the first inputs of the first data set. The second training data set may include at least some of the first inputs and corresponding first outputs of the first data set.

In at least one embodiment, detecting, that at least the first weight of the first neural network has a corresponding weight change exceeding the threshold weight change, may be performed using a second neural network. The second neural network may be trained to detect weight changes of connections in a neural network where the weight changes exceed the threshold weight change. Processing may include obtaining a plurality of images, wherein each of the plurality of images represents a plurality of weights of the first neural network during said training of the first neural network using the second training data set. The step of detecting may include providing the plurality of images as inputs to the second neural network; and determining, in accordance with the plurality of images, that the first weight of the first neural network has the corresponding weight change exceeding the threshold weight change.

In at least one embodiment, the second processing that reconfigures the first neural network may include removing a first node from the first neural network. Training the first neural network using the second training data set may include assigning a value of zero to each weight applied to an output of the first node whereby the first node is effectively removed from the first neural network, wherein the reconfigured neural network may include a value of zero for each weight applied to an output of the first node, and wherein said training the reconfigured first neural network may not be allowed to modify any weight that is applied to an output of the first node and that is assigned a value of zero. Training of the first neural network using the second training data set may include assigning a value of zero to each weight applied to an input of the first node whereby the first node is effectively removed from the first neural network, wherein the reconfigured neural network may include a value of zero for each weight applied to an input of the first node, and wherein said training the reconfigured first neural network may not be allowed to modify any weight that is applied to an input of the first node and that is assigned a value of zero.

In at least one embodiment, the second processing that reconfigures the first neural network may include adding a new node to the first neural network. The first weight of the first neural network having a corresponding weight change exceeding the threshold weight change may be included on a first connection from a first node to a second node and the first weight is applied to a first output of the first node of a first hidden layer, and said second processing may add the new node to the first hidden layer. The first node may have connections to a first set of one or more other nodes and the new node may have connections to at least one node of the first set. The second processing that reconfigures the first neural network may include resetting a particular weight of the first neural network. During the training of the first neural network using the second training data set, the particular weight may have a non-zero value that is less than a specified threshold weight, and wherein the second processing may reset the particular weight to zero in the reconfigured first neural network, and training the reconfigured first neural network may be allowed to modify the particular weight.

BRIEF DESCRIPTION OF THE DRAWINGS

Features and advantages of the present invention will become more apparent from the following detailed description of exemplary embodiments thereof taken in conjunction with the accompanying drawings in which:

FIG. 18A illustrates a matrix of weights denoting the internal state of a neural network in an embodiment in accordance with the techniques herein;

DETAILED DESCRIPTION OF EMBODIMENT(S)

Figure 1:
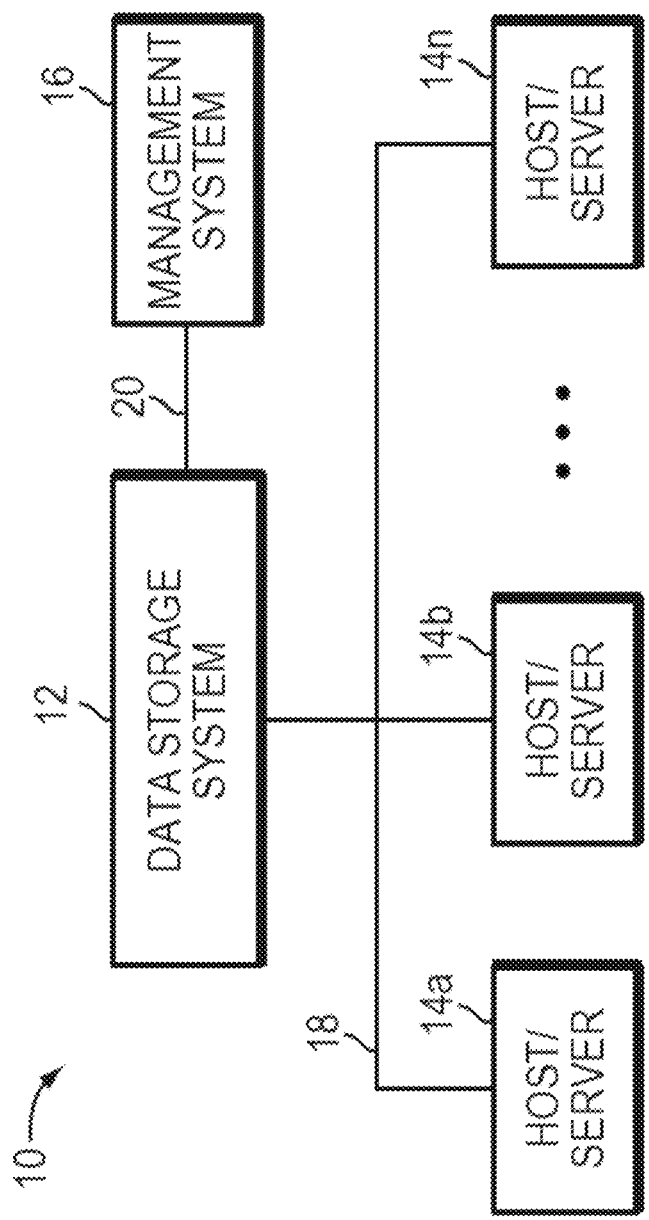
FIG. 1 is an example of components that may be included in a system in accordance with the techniques described herein.

Described below is a technique for use in analyzing a storage system using a machine learning system, which technique may be used to provide, among other things, analyzing data gathered from information associated with operations performed in a storage system, where the storage system is comprised of a plurality of components, creating a bitmap image based on the gathered data, where at least one of the plurality of components is represented in the bitmap image, and training the machine learning system using the bitmap image, where the bitmap image is organized to depict the plurality of components of the storage system.

As described herein, in at least one embodiment of the current technique logs and statistics are gathered from a storage system. A bitmap image is created from the logs representing the components in the storage system. A machine learning system is trained using the bitmap image as input. The output of the machine learning system is a graphical depiction of the components in the storage system represented as bitmap objects. A health assessment of each component is also depicted. For example, a component may be graphically depicted as a blue image when that component is functioning correctly, but may be graphically depicted as red when that component is functioning incorrectly.

In a conventional system, it is difficult or impossible to quickly detect a malfunction in a storage array when the malfunction occurs in the storage array thereby causing the storage array to become degraded in performance or result in an error. Generally, a user of a storage system expects a timely detection of a malfunction in a storage system and expects an ability to find a solution to the cause of the malfunction before the user has to call a storage vendor for providing support to address the malfunction. Consequently, storage vendors need to maintain a large number of customer support engineers to respond timely to customer complaints. Generally, data such as logs and statistical information is gathered from all the components and modules of a storage array including but not limited to hardware and software components. Thus, for example, when a malfunction is detected in a software module of a storage array, additional data such as statistical information is gathered. As a result, there is a large amount of statistical data that is collected and stored for a storage system. Conventional technologies may collect, for example, 4-5 GB of statistics and data logs per day for a storage system. Thus, in such a conventional system, it is difficult or impossible to analyze such a significant amount of data gathered in a storage system and determine what went wrong and what part of the storage system is malfunctioning and it can take a long time to analyze the data and logs and determine which component of the storage system is at fault. Thus, in such a conventional system, it requires maintaining a large staff of customer support engineers to respond quickly to customer complaints related to storage system malfunctions. Conventional technologies may require the staff of customer support engineers to spend days scanning all the logs to detect the source of the errors and faulty behavior of the storage system. In such a conventional system, such analysis of data and logs is performed manually, by inspecting the statistics and logs searching for errors.

Conventional technologies do not have an automated way to quickly identify a hardware and/or software problems in a storage system. While a customer may observe the data such as statistics and logs collected by a cloud based application, the customer cannot decipher such data and determine the source or cause of a malfunction in a storage system, even if the customer observes a change in the behavior of the storage system. For example, the customer may not be able to determine if a change in the behavior of a storage system is due to a malfunction, or due to a change in an application workload. Even the customer's Information Technology (IT) personnel and/or the vendor of the application might not be aware of the changes that a particular application may have on the Input/Output (IO) behavior of the storage array. Thus, even if IT personnel or the customer observes a change in behavior of the storage system, neither can determine if there is a fault in the hardware, for example, a failure of the disk, network, Fibre Channel port or Serial Attached Small Computer System Interface (SCSI) port. These types of failures degrade the performance of the storage system, and result in a change in behavior of the storage system. It is critical to determine the difference between simply workload changes, and actual hardware or software errors, and to determine whether and when to involve customer service engineering to locate and rectify any faulty behavior, with the least amount of disruption to the storage system.

Conventional technologies do not provide an automated mechanism that continuously monitors the storage system to detect changes that are a result of faulty components quickly enough to notify the customer service engineers to fix the faulty components. Further, in such a conventional system, manual inspection of data in log files take a large amount of time as the data stored in such logs can be significant in size and unstructured in format thereby making interpretation of such data significantly difficult. Conventional technologies of manually inspecting logs and statistics do not provide for learning from previous cases of malfunctions, other than to teach customer services engineers to look for certain storage system behaviors. This is particularly difficult when certain malfunctions may only occur once or twice during the life of a product. However, there may be hundreds of these types of malfunctions that only occur once or twice over the life of the product. Thus, conventional technologies require human intervention to decipher logs and statistics, and conventional technologies do not provide a way to share this acquired knowledge among the customer service engineers.

Conventional technologies do not organize the data collected by logs in a form that can be analyzed and interpreted quickly and easily to determine the faulty component(s). Conventional technologies cannot determine which components are faulty and also why the faulty components are failing. Conventional technologies cannot provide the level of detail necessary to determine the location of a faulty component and the level of severity associated with the malfunction.

By contrast, in at least some implementations in accordance with the current technique as described herein, a method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system.

Thus, in at least one embodiment of the current technique, the goal of the current technique is to identify malfunctions within a storage system, identify a location within the storage system associated with the malfunction, as well as to provide details associated with the severity of the malfunction. Another goal of the current technique is to quickly provide this information in a visual representation that intuitively informs a viewer which components are faulty, where in the component the malfunction occurred, and the severity of the malfunction. Additionally, the current technique provides a health assessment of components in the storage system by visually representing each component, along with an indication as to whether each component is functioning or malfunctioning.

In at least some implementations in accordance with the current technique described herein, the use of analyzing a storage system using a machine learning system technique can provide one or more of the following advantages: discerning between changes in an application workload versus a hardware and/or software malfunction, drastically reducing the time required to detect and resolve malfunctions that occur in a storage system, incorporating previously detected malfunctions into reach new release of hardware or software components of a storage system, facilitating sharing of acquired knowledge among customer service engineers, eliminating the need to interpret logs to identify malfunctions, providing a visual representation of the components in a storage system along with an indication of the health status associated with each component, identifying malfunctions within components, identifying the location of the malfunctions, and identifying a severity associated with the malfunction.

In contrast to conventional technologies, in at least some implementations in accordance with the current technique as described herein, a method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system.

In an example embodiment of the current technique, the machine learning system detects a malfunction attributed to at least one component of the plurality of components depicted in the bitmap image by analyzing the bitmap image.

In an example embodiment of the current technique, the method detects a change between the bitmap image and a second bitmap image created from a different set of data. In an example embodiment of the current technique, the method modifies a representation of at least one component of the plurality of components in a graphical user interface to indicate the detected malfunction.

In an example embodiment of the current technique, the information associated with the operations performed in the storage system includes at least one of event logs and statistics gathered from the plurality of components of the storage system upon detection of a malfunction in at least one component of the plurality of components.
In an example embodiment of the current technique, the data gathered from information associated with operations performed in the storage system is gathered by using a cloud based management application.

In an example embodiment of the current technique, when the method creates the bitmap image based on the gathered data further, the method depicts each component of the plurality of components as a bitmap object in the bitmap image, where each bitmap object has a different shape and is associated with a different sized pixel based on an importance associated with the each component in the storage system.

In an example embodiment of the current technique, when the method trains the machine learning system using the bitmap image, the method trains the machine learning system to detect at least one of an object shape, an object edge, a plurality of pixels, a color associated with at least one pixel in the bitmap image, and at least one interaction between the plurality of components in the storage system.

In an example embodiment of the current technique, when the method trains the machine learning system using the bitmap image, the method trains the machine learning system to analyze the bitmap image to detect the difference between occurrence of at least one of malfunctions in the storage system and normal functioning of the storage system.

In an example embodiment of the current technique, the method analyzes data gathered from information associated with operations performed in a storage system, where the storage system is comprised of a plurality of components, and where the data is gathered from a cloud based management application. The method creates a bitmap image based on the gathered data, where at least one of the plurality of components is represented in the bitmap image. The method trains a machine learning system to analyze, in a cloud based environment, the bitmap image to detect the difference between occurrence of at least one of malfunctions in the storage system and normal functioning of the storage system.

Referring now to FIG. 1, shown is an example of an embodiment of a system that may be used in connection with performing the technique or techniques described herein. The system 10 includes one or more data storage systems 12 connected to host systems 14a-14n through communication medium 18. The system 10 also includes a management system 16 connected to the one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a connection switch or other switching equipment that may exist such as a phone line, a repeater, a multiplexer or even a satellite. In at least one embodiment, the hosts may communicate with the data storage systems over an iSCSI or Fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems. Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment. Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices, or more generally non-volatile storage devices, such as, for example, an SATA disk drive, FC disk drive, flash drives (e.g., more generally solid state storage), and the like. Thus, the storage system may be made up of physical devices with different physical and performance characteristics (e.g., types of physical devices, disk speed such as in RPMs), Redunciani Array of Independent Disks (RAID) levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
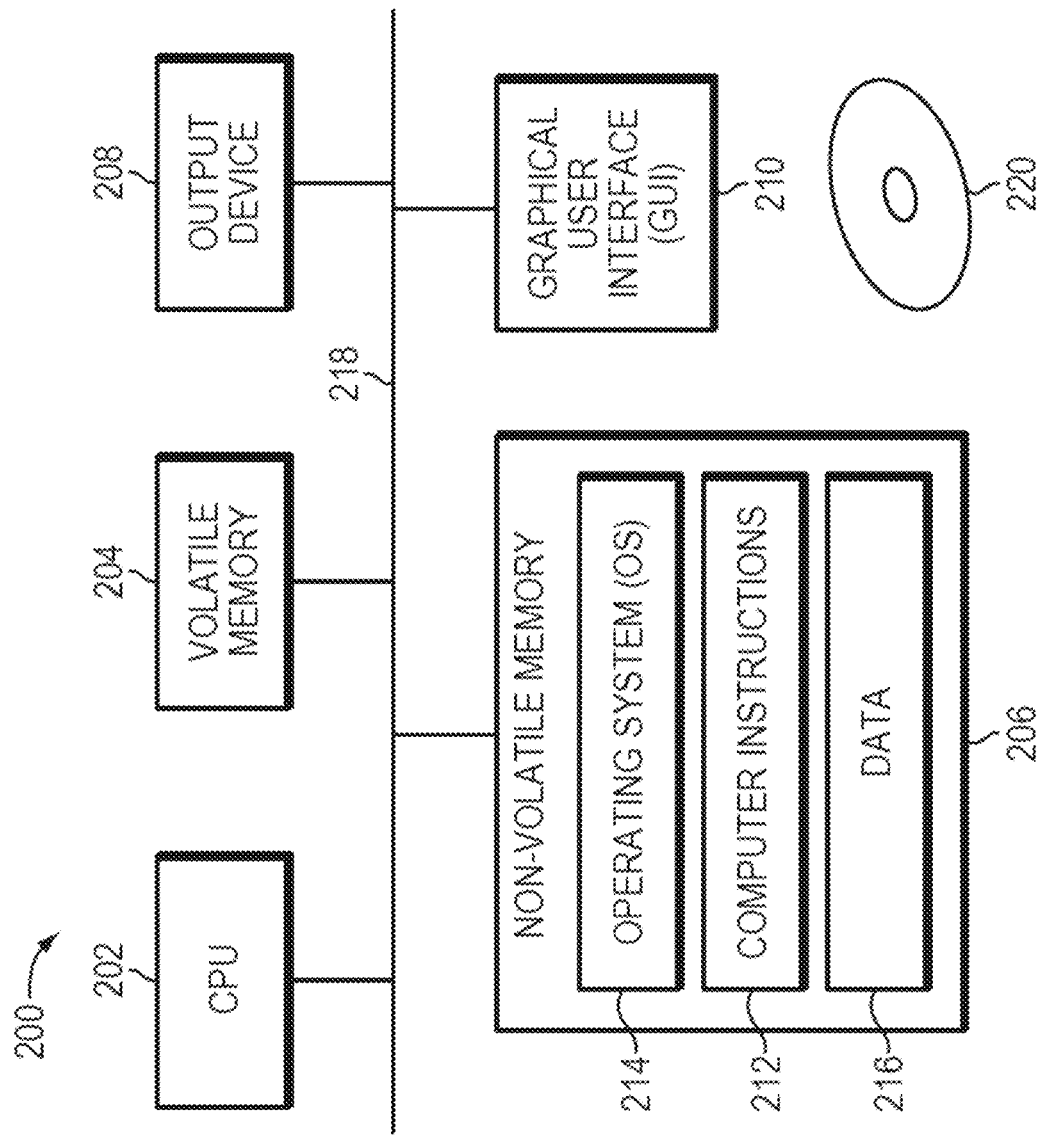
FIG. 2 is a block diagram of a computer, in accordance with an embodiment of the present disclosure.

FIG. 2 illustrates a block diagram of a computer 200 that can perform at least part of the processing described herein, according to one embodiment. The computer 200 may include a processor 202, a volatile memory 204, a non-volatile memory 206 (e.g., hard disk), an output device 208 and a graphical user interface (GUI) 210 (e.g., a mouse, a keyboard, a display, for example), each of which is coupled together by a bus 218. The non-volatile memory 206 may be configured to store computer instructions 212, an operating system 214, and data 216. In one example, the computer instructions 212 are executed by the processor 202 out of volatile memory 204. In one embodiment, an article 220 comprises non-transitory computer-readable instructions. In some embodiments, the computer 200 corresponds to a virtual machine (VM). In other embodiments, the computer 200 corresponds to a physical computer.

Figure 3:
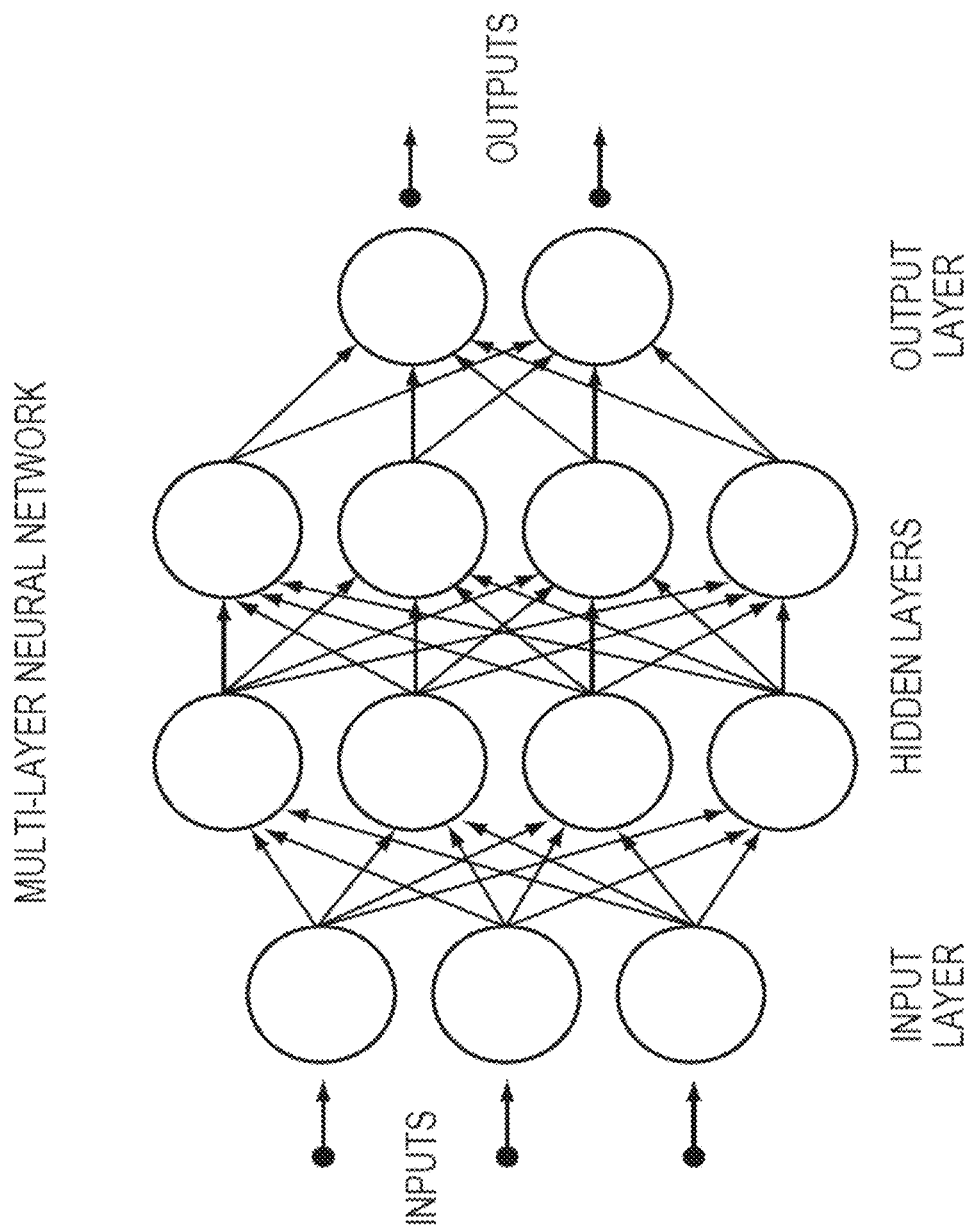
FIG. 3 illustrates an example of a multi-layer neural network.

FIG. 3 illustrates an example of a multi-layer neural network. In a storage system, multiple levels of logs and statistics may be collected from different components or modules (such as hardware or software) in a storage system. Each of the multiple levels of logs detect malfunctions of different modules in different software layers of the storage systems. This data may be used to manually train a machine learning system, such as a Neural Network, as illustrated in FIG. 3. The input data, however, is very unstructured and cannot be easily organized to train the Neural Network without human interpretation of the input (i.e., the logs and statistics), and the resulting output.

Figure 4:
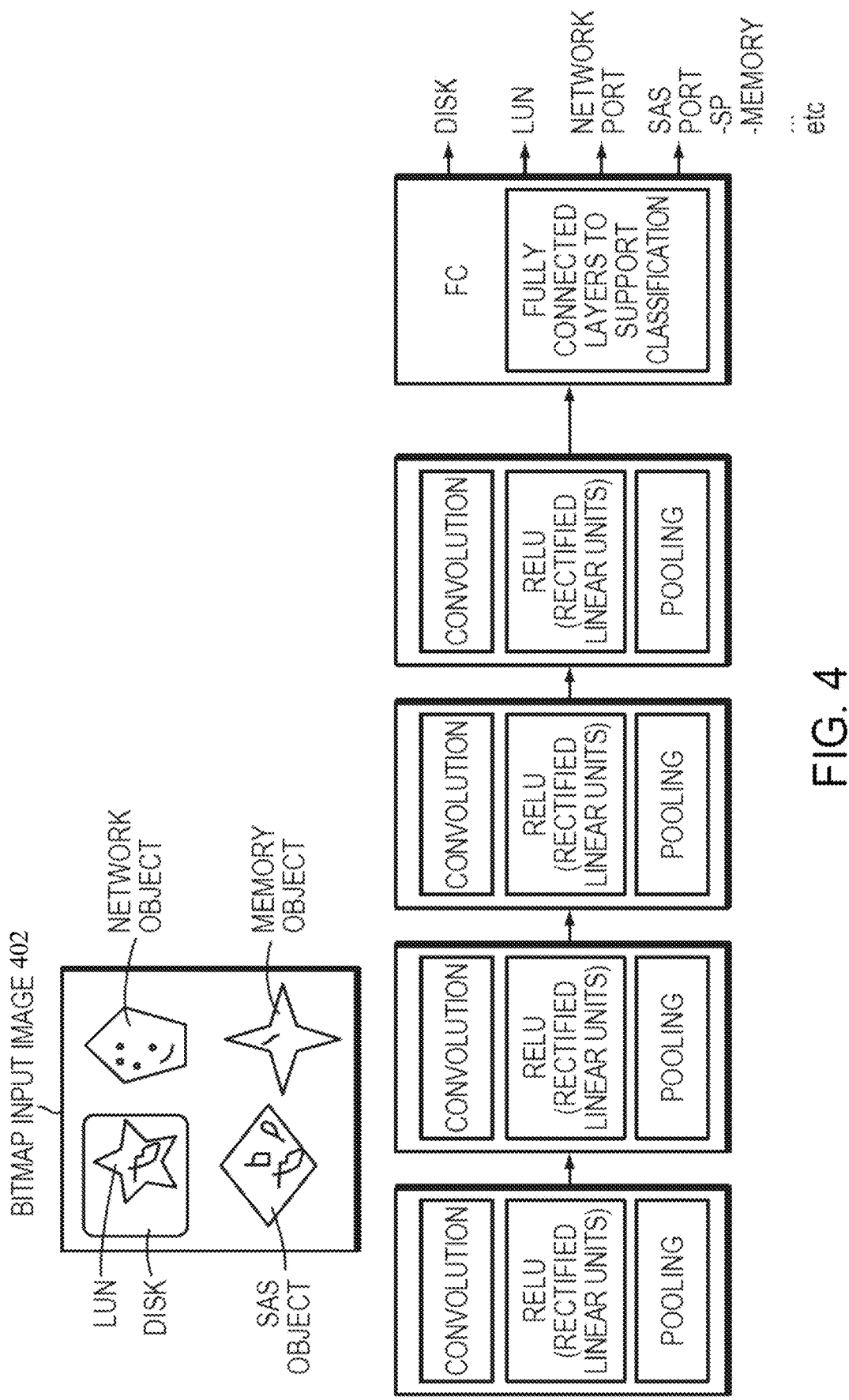
FIG. 4 illustrates creating a bitmap image from data from the logs and statistics collected by the storage system, in accordance with an embodiment of the present disclosure.

FIG. 4 illustrates creating a bitmap image 402 from data from the logs and statistics collected by the storage system, in accordance with an embodiment of the present disclosure. In an example embodiment, the method transforms the data from the logs and statistics collected by the storage system, and organizes the data as a bitmap image, as illustrated in FIG. 4. The bitmap image 402 may be used as input to the machine learning system for training and detecting malfunctions by detecting different bitmap objects in the bitmap (i.e., Disk, LUN, Network Port, SAS Port, SP, Memory, etc.). In an example embodiment, the machine learning system may use a neural network, such as a Convolutional Neural Network (CNN) that accepts images as input. The CNN preprocesses the images prior to their input into the machine learning system. In an example embodiment, the preprocessing comprises analyzing the logs and statistics, determining which components malfunctioned, and generating a bitmap image representing any faulty components.

The method transforms the data from the logs and statistics to create a bitmap image that is used as input to the machine learning system. In an example embodiment, the bitmap is created such that each module of the software in the storage array is mapped as a specific bitmap object in the bitmap image. The method detects when the bitmap objects within the bitmap image change over time, for example, when a malfunction occurs within a software module in the storage system. The bitmap is created such that each component in the storage system is represented by different shapes of objects in the bitmap with different sizes of pixels. In an example embodiment, the different sizes of pixels correspond to the importance of the module/component in the health of the entire storage system. For example the bitmap of the disk subsystem can use single pixel for each disk failure and double pixel for each RAID-5 LUN. As illustrated in FIG. 4, the bitmap image is created as a flowchart compute box, with the LUNs created as star shapes inside the compute box.

Figure 5:
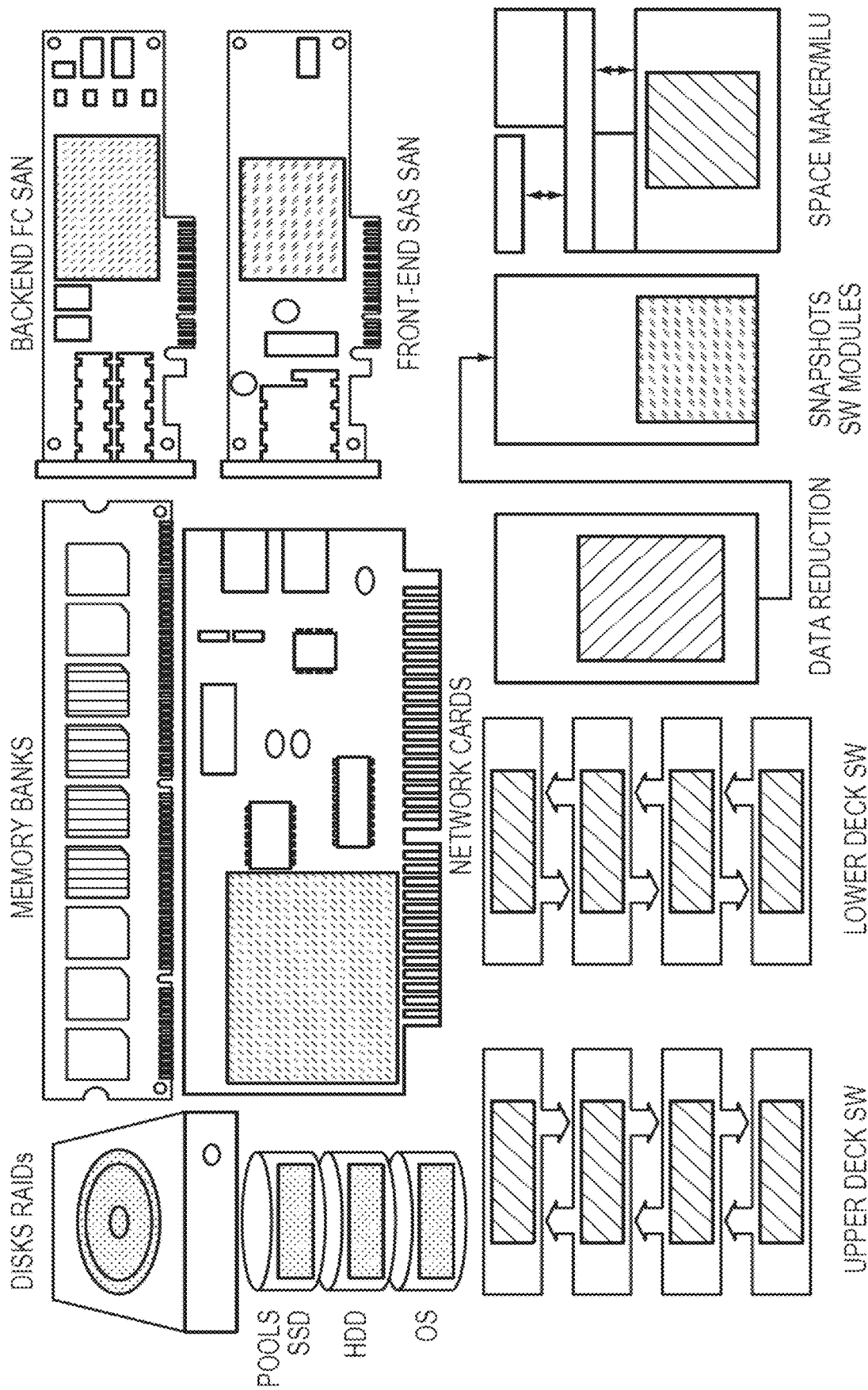
FIG. 5 illustrates a bitmap of objects of a healthy storage system, in accordance with an embodiment of the present disclosure.

FIG. 5 illustrates bitmap objects of a healthy storage system, in accordance with an embodiment of the present disclosure. In an example embodiment, components in the storage system are represented within a graphical user interface as bitmap objects. The bitmap objects may be rendered as a particular color to indicate a particular component, or may be rendered as a particular shape. The visual representation of the components within the storage system make it easy and intuitive to assess the health of the storage system. FIG. 5 illustrates a "healthy" storage system, meaning no malfunctions have been detected.

Figure 6:
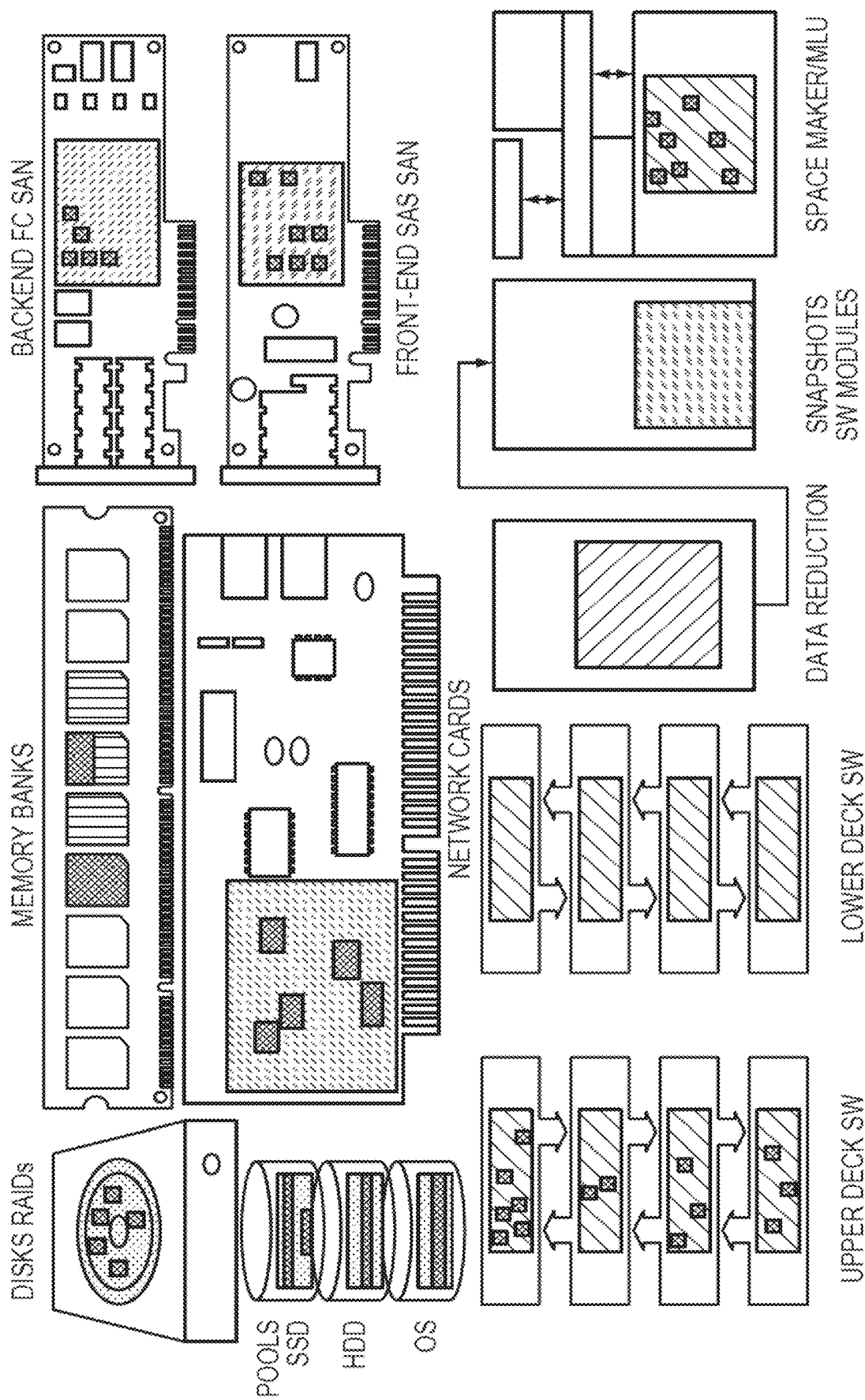
FIG. 6 illustrates a bitmap of objects of a faulty storage system, in accordance with an embodiment of the present disclosure.

FIG. 6 illustrates bitmap objects of a faulty storage system, in accordance with an embodiment of the present disclosure. For example, the "Disks Raids" depicted as "healthy" in FIG. 5, are depicted as "unhealthy" in FIG. 6, with red colored components in the depicted "Disks Raids" image. In an example embodiment, faulty components may be depicted with a color that represents a malfunction, and the shade of that color may change (or a different color may be used) depending on a threshold associated with the malfunction. In an example embodiment, the method distinguishes between the different colors and the different shades of colors to identify malfunctions and/or levels of malfunctions. In another example embodiment, shapes may be used to represent faulty versus functioning components. It should be noted that any type of visual representation may be used to indicate a difference between functioning and faulty components.

Figure 7:
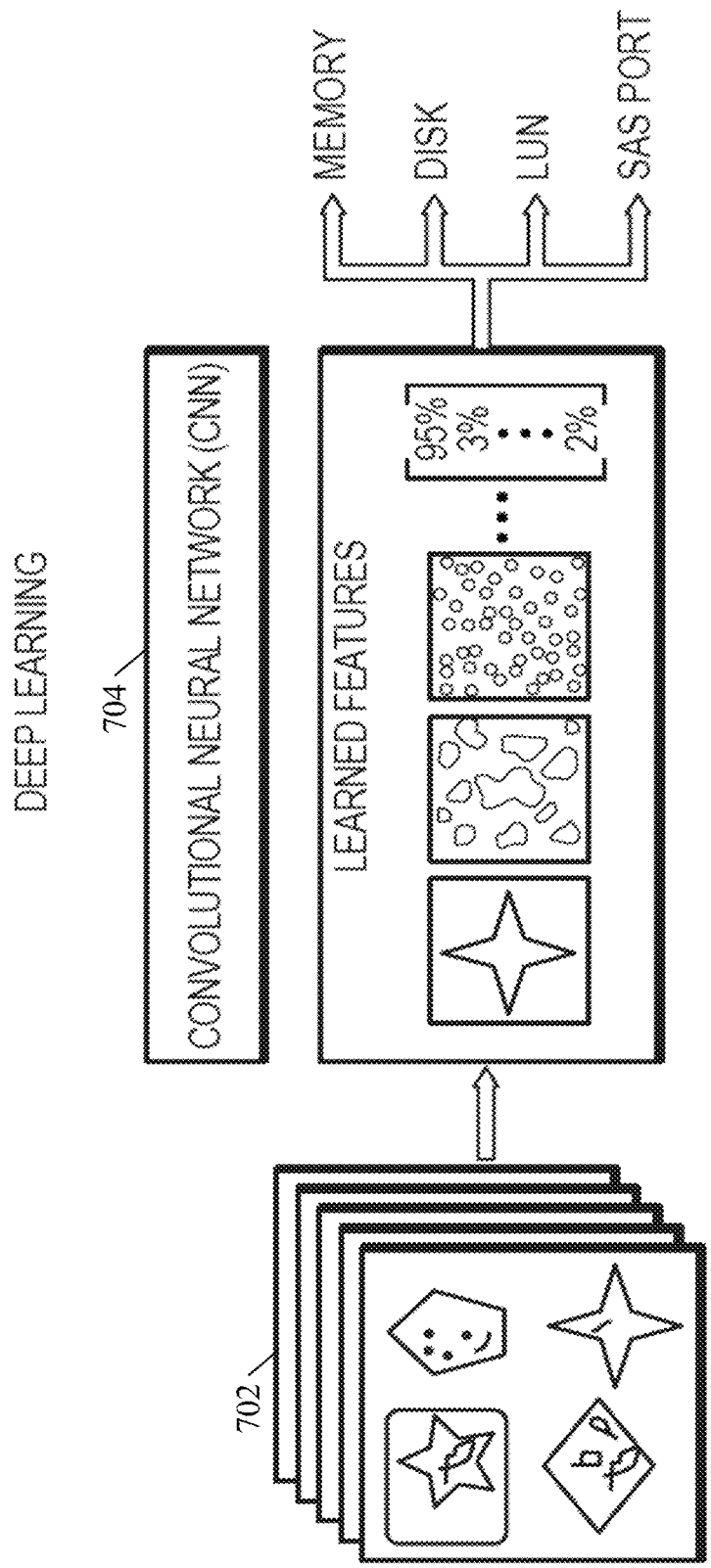
FIG. 7 illustrates a deep learning Convolutional Neural Network configuration approach to training the machine learning system using the bitmap image, in accordance with an embodiment of the present disclosure.

FIG. 7 illustrates a deep learning Convolutional Neural Network configuration approach to training the machine learning system using the bitmap image, in accordance with an embodiment of the present disclosure. In an example embodiment, the machine learning system is trained within a cloud based environment, allowing the machine learning system to train on large amounts of data gathered from multiple customers, where the large amounts of data comprise at least a few thousand types of malfunctions. In the example illustrated in FIG. 7, a plurality of bitmap images 702 are used as input to train a Convolutional Neural Network 704, and the output is a graphical user interface depicting a health assessment of a storage system. The output may be, for example, as illustrated in FIG. 5 and FIG. 6. In another example embodiment, the machine learning system executes within a cloud based environment.

Figure 8:
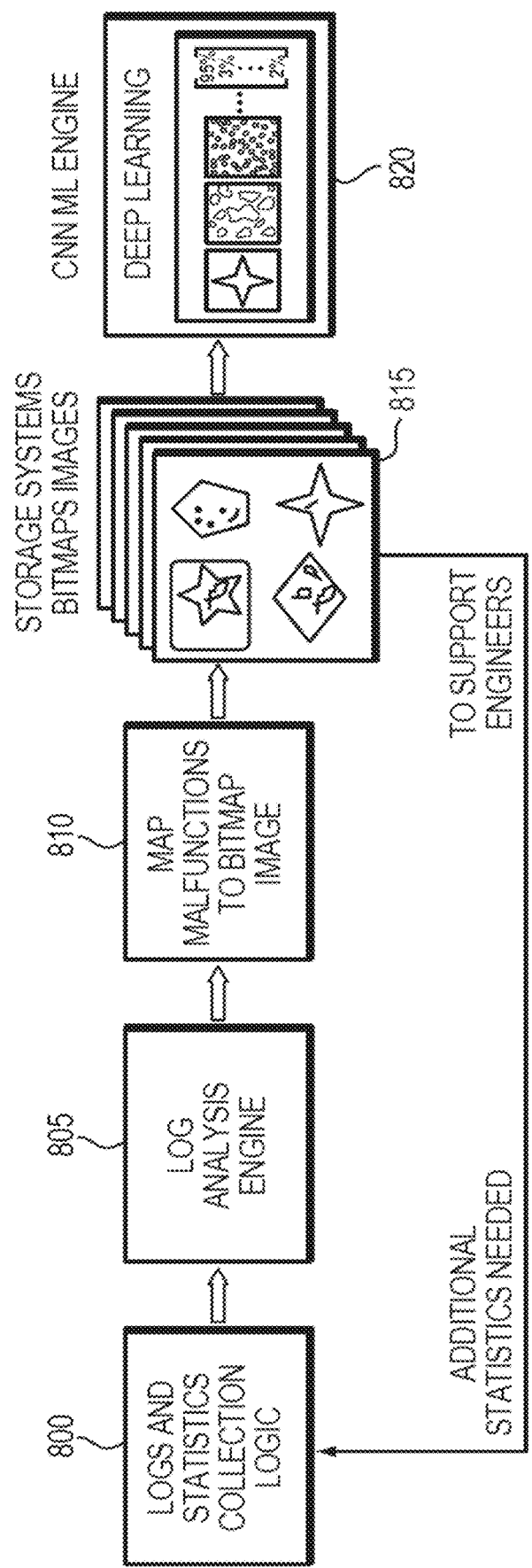
FIG. 8 illustrates mapping the text messages in the event logs to a bitmap image, in accordance with an embodiment of the present disclosure.

FIG. 8 illustrates mapping the text messages in the event logs to a bitmap image, in accordance with an embodiment of the present disclosure. In an example embodiment, data such as logs and statistics are gathered in a storage system using, for example, the Logs and Statistics Collection Logic 800. For example, storage systems have advanced mechanisms for detecting malfunctions of software and hardware by collecting logs and statistics related to the operation of the storage system. In one example embodiment, the logs and statistics are collected using a cloud based management application. The method uses a Log Analysis Engine 805 to analyze the data, and map the malfunctions identified within the logs. The method creates a bitmap image, and maps the malfunctions to bitmap pixels in the bitmap image 810. The bitmap image is the result of the analysis performed on the logs and statistics. In an example embodiment, a bitmap image is created for each hardware platform, and each new release, creating multiple bitmap images 815. The bitmap image is used as input to the machine learning system, for example a Convolutional Neural Network (CNN) Machine Learning (ML) engine 820. The CNN accepts images as input. In an example embodiment, the CNN preprocesses the images prior to their input into the machine learning system. In an example embodiment, additional statistics may be provided, for example, from customer support historical data from reported malfunctions.

Figure 9:
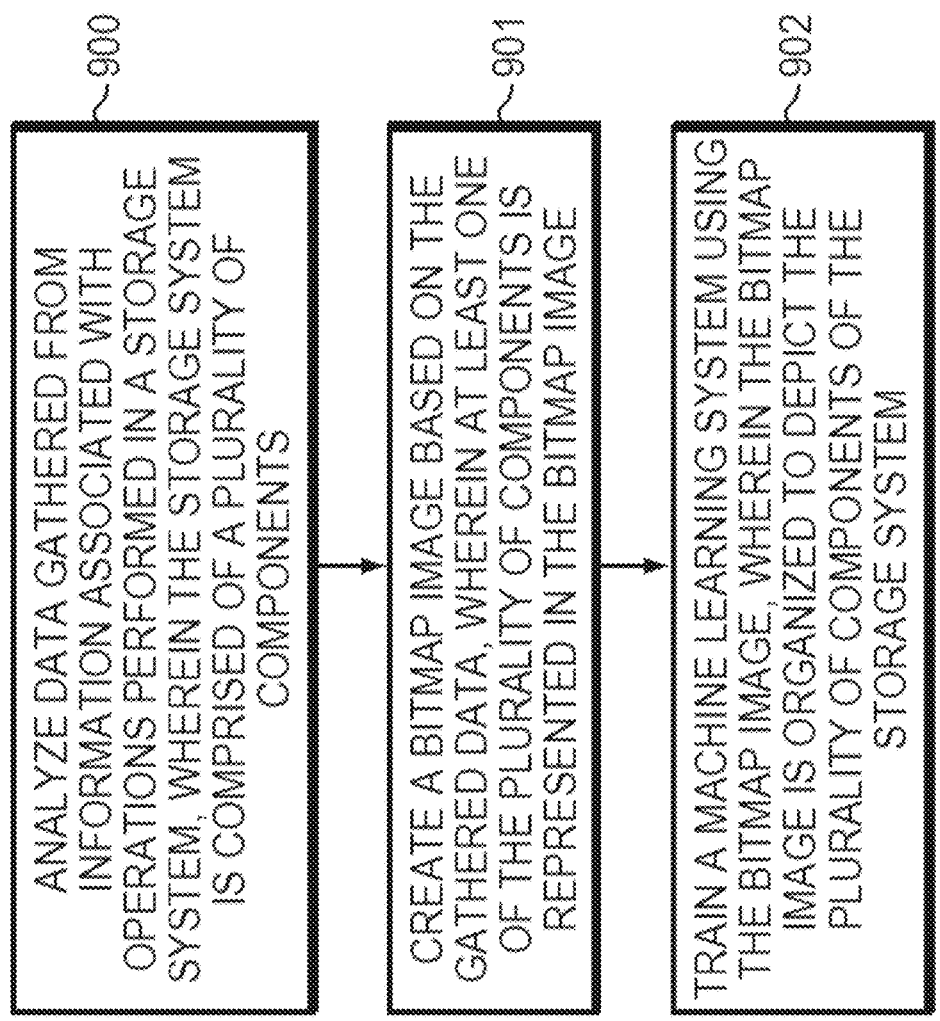
FIG. 9 is a flow diagram illustrating processes that may be used in connection with techniques disclosed herein.

Referring to FIG. 9, shown is a more detailed flow diagram illustrating analyzing a storage system using a machine learning system. With reference also to FIGS. 1-8, the method analyzes data gathered from information associated with operations performed in a storage system, where the storage system is comprised of a plurality of components (Step 900). In an example embodiment, the data gathered from information associated with operations performed in the storage system is gathered by using a cloud based management application. In another example embodiment, the information associated with the operations performed in the storage system includes at least one of event logs and statistics gathered from the plurality of components of the storage system upon detection of a malfunction in at least one component of the plurality of components. In an example embodiment, storage systems have advanced mechanisms for detecting malfunctions of software and hardware by collecting logs and statistics related to the operation of the storage system. For example, when a malfunction of a software module is detected by the storage system forensic tools, additional statistical data is collected. This results in a large amount of statistical data collected. In an example embodiment, the data is collected and stored in a cloud based environment. In an example embodiment, the method analyzes the data gathered, for example, by searching for keywords in the logs and statistics that indicate malfunctions, and/or faulty components. The method may determine the location of the malfunction, type of malfunction, value of the malfunction, severity of the malfunction, etc. In an example embodiment, the method creates a bitmap image based on the gathered data, where at least one of the plurality of components is represented in the bitmap image (Step 901). The bitmap image is the result of the analysis on the gathered data. In essence, the bitmap image is a visualization of the health of the storage system based on gathered data, for example, the logs and statistics.

In an example embodiment, the method trains a machine learning system using the bitmap image, where the bitmap image is organized to depict the plurality of components of the storage system (Step 902). In an example embodiment, the method trains a machine learning system to analyze, in a cloud based environment, the bitmap image to detect the difference between occurrence of at least one of malfunctions in the storage system and normal functioning of the storage system. In an example embodiment, the input to the machine learning system is the bitmap image created from the logs. In an example embodiment, the machine learning system is trained using data collected from different hardware platforms, and different versions of software, as well as using customer support historical data from reported malfunctions. In an example embodiment, bitmap objects representing components in the storage system are created from the data collected during the Quality Assurance testing performed for each platform, and release. The machine learning system is trained to learn normal versus faulty behavior in the storage system. In an example embodiment, errors may be intentionally included during the Quality Assurance testing to further train the machine learning system. In an example embodiment, the output of the machine learning system are bitmap objects that represent the hardware and software components of the storage system. The bitmap objects are rendered in a graphical user interface where customer service engineers, for example, can intuitively assess the health of a storage system. In an example embodiment, customer support engineers are trained to detect malfunctions in the storage system by inspecting the bitmap objects depicted within the graphical user interface instead of manually searching through the logs and statistics to detect the source of malfunctions in the storage system.

The bitmap objects are represented according to the "health" of each component. For example, a disk can be represented as a healthy disk, or a faulty disk, depending on the depiction of the bitmap object that represents the disk. For example, a healthy disk may be represented as a purple disk object. A faulty disk may be represented as a purple disk object with red identifiers, where the red identifiers indicate detected malfunctions associated with the disk. In an example embodiment, the position of, for example, red identifiers on a component in the storage system, may indicate where, within that component the malfunction occurred. In an example embodiment, the historical data from reported malfunctions are used to train the machine learning system to associate the malfunctions detected in the information gathered with the bitmap objects, and to further refine the output of the machine learning system to depict a bitmap object that indicates a healthy or faulty component depending on the data. In an example embodiment, the method creates a catalog of component images, and matches the images to a malfunction type and a bitmap object in the bitmap image. In an example embodiment, with each new release of a software or hardware components of a storage system, the machine learning system is retrained by adding all the newly reported malfunctions that were recorded since the previous release of such components.

In an example embodiment, the machine learning system detects a malfunction attributed to at least one component of the plurality of components depicted in the bitmap image by analyzing the bitmap image. In an example embodiment, the method detects a change between the bitmap image and a second bitmap image created from a different set of data (for example, a bitmap image created at an earlier point in time). In an example embodiment, the detected malfunctions are learned by the machine learning system as the machine learning system trains on a collection of bitmap images. In an example embodiment, the machine learning system learns to detect different malfunctions of different hardware and software components of a bitmap image using many hidden layers with each hidden layer increasing the complexity of the learned bitmap image features. For example, a first hidden layer detects a shape of a bitmap object. A second hidden layer detects different shades of a particular color, where the different shades each indicates a different faulty notification. Another hidden layer, for example, detects more critical malfunctions by detecting blocks made of multiple pixels. Yet another hidden layer detects more complex interactions between log objects, and/or detect complex related errors found in customer support historical data from reported malfunctions. In an example embodiment, the machine learning system identifies in the logs and statistics day and time of the log, system name, storage processor from which a log message was received, component from which a log message was received, user application and server running 10 from which the storage process message was received, severity of the log message, source of health error/type of log (for example, "System", "Audit", "User", etc.), sub-component from which the log message was received, etc. In another example embodiment, the method trains the machine learning system to detect at least one of a bitmap object shape, a bitmap object edge, a plurality of pixels, a color associated with at least one pixel in the bitmap image, and at least one interaction between the plurality of components in the storage system.

In an example embodiment, the method modifies a representation of at least one component of the plurality of components in a graphical user interface to indicate the detected malfunction. For example, when a disk failure occurs, the method changes a pixel in the bitmap image to a different color, for example, "red", to indicate a component failure. In an example embodiment, the RAID that comprises the faulty disk also turns a different color, for example, "amber", when more than two disks malfunction. In another example embodiment, the RAID that comprises the faulty disk will turn a different color, for example, "red", when a second disk fails during a rebuild of a disk. Thus, the customer support engineers can quickly identify from the bitmap image, a faulty component when the fault is detected by the machine learning system; a picture is worth a thousand words.

In an example embodiment, when the method creates the bitmap image based on the gathered data further, the method depicts each component of the plurality of components as a bitmap object in the bitmap image. Each bitmap object has a different shape and is associated with a different sized pixel based on an importance associated with the each component in the storage system. In an example embodiment, IO ports of each storage processor may be depicted as one size of pixels, but the management and communication ports that may create data loss if a storage processor fails are depicted with pixels larger than the pixel size used for the IO ports.

In an example embodiment, the method trains the machine learning system to analyze the bitmap image to detect the difference between occurrence of malfunctions in the storage system and/or normal functioning of the storage system. In an example embodiment, during the training of the machine learning system, each bitmap object represents a different area of the hardware and/or software components to make it easier and faster to detect when the bitmap object changes color and/or shape. FIG. 5 illustrates bitmap objects of a healthy storage system, while FIG. 6 illustrates bitmap objects of an unhealthy storage system, where the components in the storage system that have malfunctioned are depicted as red identifiers within those components. The depictions in FIG. 5 and FIG. 6, also facilitate identifying different components, for example, the disks versus the memory banks. These depictions make it easy for a customer service engineer to quickly identify a malfunction, quickly identify the location of the malfunction, and/or the severity of the malfunction.

There are several advantages to embodiments disclosed herein. The method provides a visual representation of the components in a storage system along with an indication of the health status associated with each component, identifying malfunctions within components, identifying the location of the malfunctions, and identifying a severity associated with the malfunction. The method discerns between changes in an application workload versus a hardware and/or software malfunction. The method drastically reduces the time required to detect and resolve malfunctions that occur in a storage system. The method incorporates previously detected malfunctions into machine learning system in order to identify such malfunctions efficiently in new releases of hardware or software components of a storage system, facilitating sharing acquired knowledge among customer service engineers. The method eliminates the need to interpret logs to identify malfunctions.

Described above are techniques that may be used to detect various states of health and malfunction with respect to components of a data storage system. Such techniques may use a trained first neural network to detect the various states of health and malfunction where the first neural network is provided an image of the various components. Each of the different components may be represented by an associated element of the image. The different elements of the image corresponding to components experiencing malfunctions, faults, failures and the like, may be populated with information denoting the particular detected malfunctions, faults, failures, and the like. For example, as discussed above, a detected fault of a particular component may be denoted by a shaded or colored element representing the component in the image. The shading and/or the particular color may denote the fault.

In this manner, the first neural network as described above may be trained to detect and recognize various faults or failures of different system components. It may be desirable to further detect smaller changes in system behavior that may provide an earlier indication of such potential failures, faults and malfunctions such as before the failure actually occurs or prior to the system or component otherwise reaching a critical state rendering the component or system unusable. Thus, in at least one application, the first neural network as described above may be trained to detect major faults or large state changes with respect to the system and its components. As such, described in following paragraphs are techniques that may be used to further improve upon the first neural network detection of the major faults or state changes by further providing for detection of smaller or incremental state changes. In one aspect, the smaller or incremental state changes may be characterized as one or more sub-steps, sub-phases or sub-states, or generally intermediate states, that are expected to progressively result in the major fault or state change detected by the first neural network. In at least one embodiment, the sub-states or progression of intermediate states may be characterized as incremental varying smaller degrees of severity of error, unhealthiness or fault. For example, such smaller sub-states or intermediates states may corresponding to low, medium and high levels of warning prior to the occurrence of the major fault or state change.

In at least one embodiment, the techniques in following paragraphs provide for obtaining a representation of the internal state of the first neural network after the first neural network has processed an input image denoting one of the smaller intermediates states or sub-states. The input image denoting the smaller intermediate state or sub-state does not cause the first neural network to detect the major fault or major state change. However, despite the first neural network not detecting the major fault, the internal state of the first neural network still experiences changes or differences denoting some degree of unhealthiness, error or fault in response to processing the input image denoting the smaller sub-state or intermediate state. The representation of the internal state of the first neural network is then provided as an input to a second neural network. Based on the representation of the internal state of the first neural network, the second neural network detects the smaller sub-state or intermediate state denoted by the input image even though the first neural network has not yet detected the major fault or state change. The representation of the internal state of the first neural network is analyzed by the second neural network whereby small variations or changes in the internal behavior of the first neural network nodes denotes the smaller sub-states. In at least one embodiment, the internal state of the first neural network may include the weights of the inputs to the nodes or neurons of the one or more hidden layers and the output layer of the first neural network. The internal state of the first neural network may be in the form of an image representing the values of the weights. The image representing the values of the weights of the internal state of the first neural network may be provided as the input to the second neural network. The image denoting the internal state of the first neural network may also be visually represented to a user.

Figure 10:
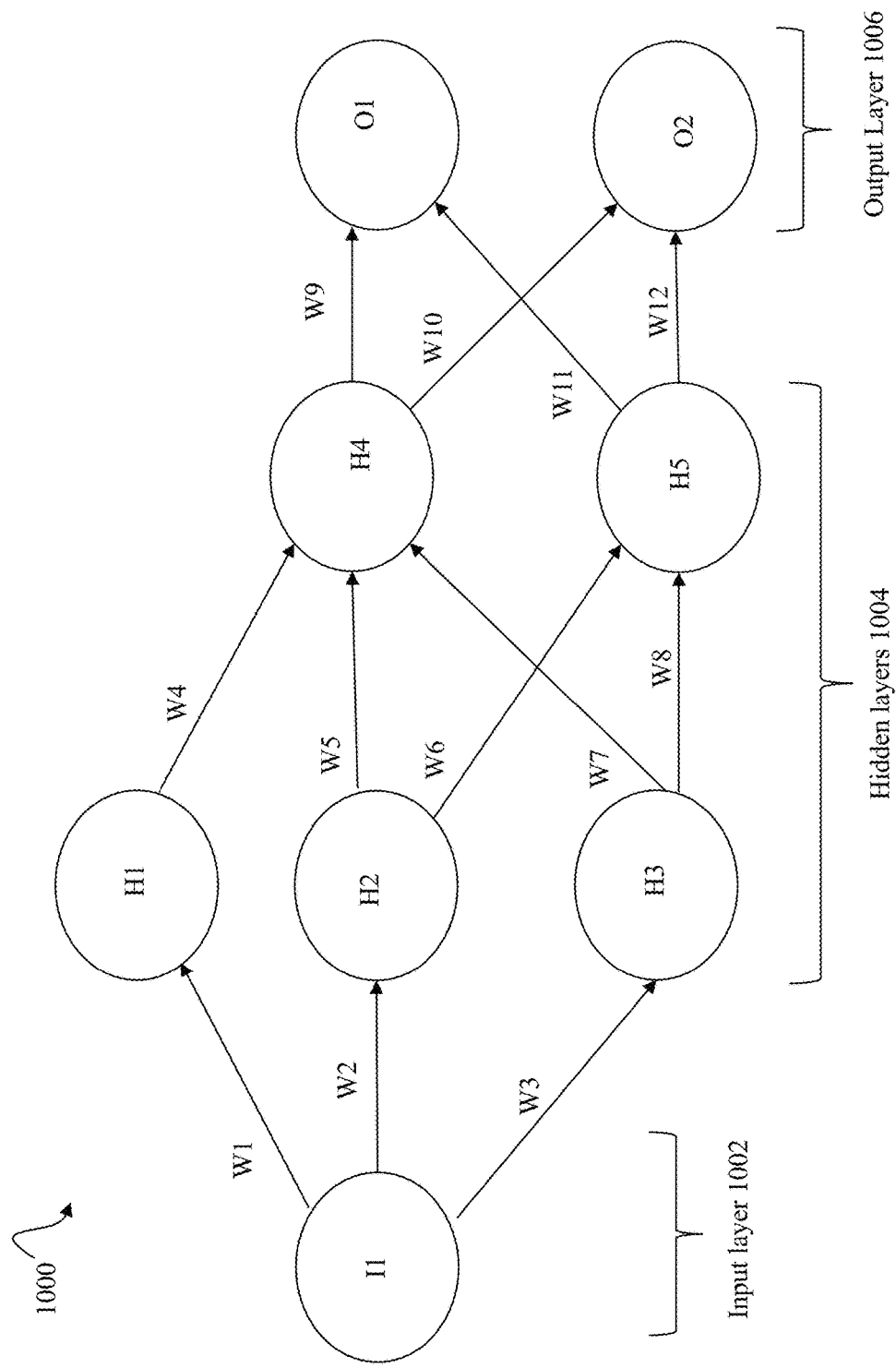
FIG. 10 is an example of a neural network that may be used in an embodiment in accordance with the techniques described herein.

Referring to FIG. 10, shown is an example of a neural network that may be used in an embodiment in accordance with the techniques herein. The example 1000 provides additional detail regarding the neural network described above, such as, for example, in connection with FIGS. 3, 4, 7 and 8 above. The example 1000 provides additional detail regarding a neural network that may be used as the first and/or second neural network in connection with the techniques described herein.

The example 1000 includes input layer 1002, hidden layers 1004 and output layer 1006. Consistent with other discussion herein, an input is provided to the input layer 1002 of the neural network 1000 where the input passes through multiple hidden layers 1004 and outputs a prediction, as denoted by the one or more output nodes of the output layer 1006. Each of the layers 1002, 1004 and 1006 includes one or more nodes also referred to as neurons. Each node is a different neuron. The example 1000 includes an input layer layer 1002 with a single input for purposes of simplifying the illustration. However generally each of the layers of 1002, 1004 and 1006 may include any number of nodes or neurons. Additionally, there may be one or more hidden layers 1004. In the example 1000, the input layer includes neuron I1; the first hidden layer includes nodes H1, H2 and H3; the second hidden layer includes nodes H4 and H5; and the output layer includes nodes O1 and O2.

Connections or synapses are shown between pairs of nodes. In the example 1000, each connection or synapse is denoted by an arrow from an output node or neuron of one layer to an input node or neuron of another layer. Each connection or synapse "i" also has an associated weight, denoted as Wi, "i", being a non-zero integer. In the neural network 1000, there are 12 connections or synapses between pairs of nodes where weights of the 12 connections are denoted as W1-W12, inclusively. The particular weight Wi associated with a particular connection from a first node to a second node denotes that the output of the first node is weighted when provided as an input to the second node.

In an embodiment in accordance with techniques herein with respect to the first neural network described herein, the weights W at a point in time denote an internal state of the neural network at the point in time. When the neural network is in training mode, as discussed in more detail elsewhere herein and an input is provided to the neural network, one or more of the weights W may be modified or adjusted as optimal values for the weights W are learned in order to accurately predict the outputs of layer 1006. Thus, the neural network of the example 1000 may be provided an input during training whereby one or more of the 12 weights W1-W12 may be adjusted in response to processing the input. In connection with techniques herein, when the first neural network discussed above is the neural network of FIG. 10, processing may capture or extract the internal state of the first neural network as denoted by the particular values of the 12 weights W1-W12 after the input has been processed. As discussed in more detail below, the input may be particularly selected, for example, to be one of the sub-states or intermediate states.

Figure 11:
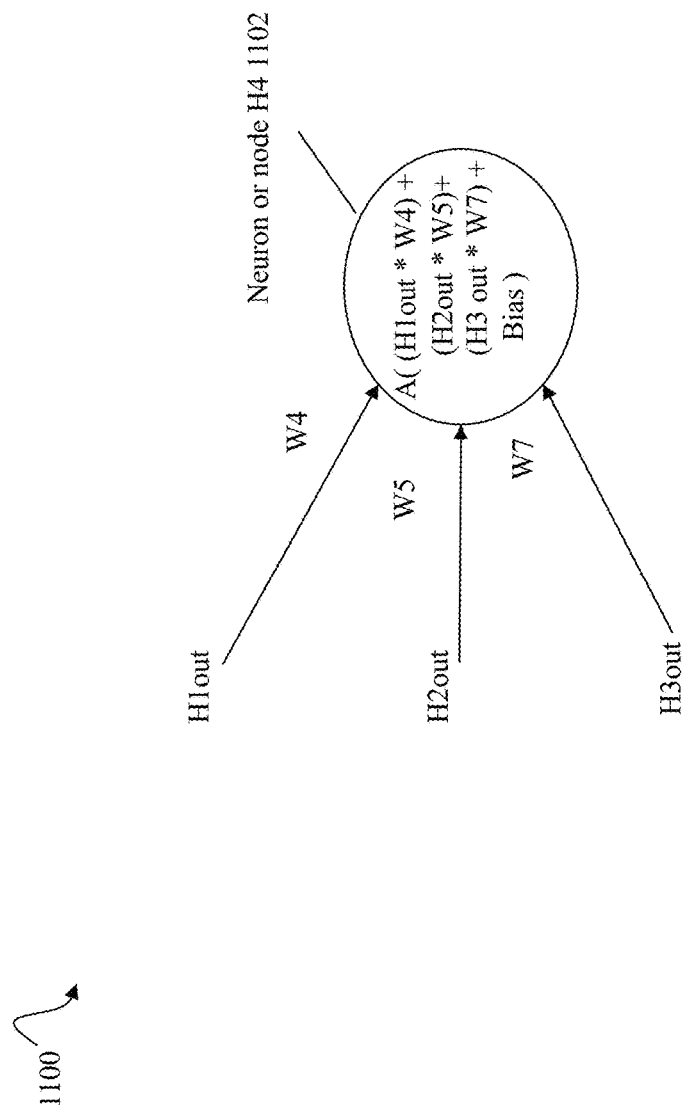
FIG. 11 illustrates a neuron of FIG. 10 in more detail.

Referring to FIG. 11, shown is an example illustrating in more detail a particular neuron of the network from FIG. 10 that may be used in an embodiment in accordance with the techniques herein. The example 1100 provides further detail about the single node or neuron H4 1102 from FIG. 10. However, other neurons of the hidden layers 1004 and output layer 1006 also have similar weighted inputs and activation functions as discussed below.

Each neuron in the layers 1004, 1006 combines one or more weighted inputs, applies an activation function A, and returns an output which is the output signal from the neuron to one or more other neurons. For example, neuron H4 1102 is in the second hidden layer of 1004 of FIG. 10 and has 3 inputs from 3 neurons H1, H2 and H3 of the first hidden layer of 1004. The output from neuron H1 is denoted as H1out, the output from neuron H2 is denoted as H2out and the output from neuron H3 is denoted as H3out. Each of the 3 outputs H1out, H2out and H3out are weighted, respectively, by corresponding synaptic weights W4, W5 and W7. The weight of a connection, such as W4, is applied to the output of one neuron (e.g., H1) that is an input to another neuron, such as H4 1102. In the neuron 1102, the activation function is denoted by the "A" which applies the activation function "A" to the sum of the weighted inputs to node H4. In the node H4 1102, the weighted sum of the inputs is (H1out*W4)+(H2out*W5)+(H3 out*W7). Additionally shown is a bias value, Bias, that may be added to the weighted sum of the inputs calculated at each node (except the input layer nodes) during the feed-forward phase.

When a neural network is trained, such as the first neural network discussed above, to recognize the major faults, the weights and bias values of the neurons are learned and may be adjusted during the training process in order to find optimal values for the weights and bias values of the neurons to enable accurate prediction of the desired outputs for particular corresponding inputs.

What will now be described is general processing that may be performed to obtain a final model of a machine learning system. In at least one embodiment, the model of the machine learning system may be a neural network as described herein. Generally, building the final neural network or model is obtained as a result of performing an overall process described below with reference to the FIG. 12. The processing described in connection with FIG. 12 may be performed in connection with training the first and the second neural network in an embodiment in accordance with the techniques herein.

As a first step 1202, the neural network structure or arrangement is determined based on parameters, sometimes referred to as hyper-parameters that define the neural network architecture. The hyper-parameters may include, for example, determining a number of hidden layers in the neural network, the number of neurons in each of the layers (e.g., input layer, hidden layers and output layer), determining the synapses or connections between neurons of the different layers, and selecting an activation function used by the neurons.

Once the step 1202 has completed, control proceeds to an initialization step 1204. The step 1204 may be performed prior to training the neural network using a training data set. The initialization processing of the step 1204 may include specifying initial values for a second set of neural network parameters that are tuned, adjusted or "learned" during training. For example, initial values may be specified for the weights applied to the synaptic connections or inputs to the neurons. Initialization may also provide initial bias values of the second set. Additionally, values may be specified for one or more other parameters affecting the neural network training. For example, one or more training parameters may be specified that affect the rate of convergence or learning rate.

Once the initialization processing of the step 1204 has completed, control proceeds to the step 1206. At the step 1206, the neural network training may be performed using the training data set. During training of the step 1206, the weights of the synapses or connections between neurons are tuned or modified with the general goal of minimizing a cost or loss function. During training, the bias values of the neurons may also be similarly tuned or adjusted. The neural network may be trained, for example, using a supervised learning method such as gradient descent or other suitable technique known in the art. The training data set may include sets of input data provided as input to the neural network. For each input vector or set of input data, such as a bitmap image described above, the training data set also includes a corresponding output data set or vector denoting the expected or correct output result that a properly trained neural network should output (for the corresponding input data). The current neural network model is run using the input data of the training data set and produces a result. The result generated by the neural network during the training is then compared to the expected output of the training dataset. Based on the result of the comparison and the specific learning algorithm being used, the parameters of the neural network model are adjusted. For example, as noted above, such adjustments may be made to the neural network weights and bias values. The model fitting can include both variable selection and parameter estimation.

Once the training step 1206 has completed, control proceeds to the step 1208. At the step 1208, validation processing may be performed. During validation, the weights and bias values are not being adjusted. Rather, validation processing is generally evaluating the predictive capabilities of the current neural network model using the weights and bias values resulting from the training. The validation processing of the step 1208 may include performing neural network validation using a second data set often referred to as the validation data set. The validation data set is different than the training data set and is used to provide an unbiased evaluation of the current neural network resulting from completion of the training using the training data set. The validation data set may be similar in structure and form to the training data set described above. The validation data set may include sets of input data provided as input to the neural network. For each input vector or set of input data, such as a bitmap image described above, the validation data set also includes a corresponding output data set or vector denoting the expected or correct output result that a properly trained neural network should output (for the corresponding input data). The current neural network model is run using the input data of the validation data set and produces a result. The result generated by the neural network during the validation is then compared to the expected output of the validation data set. The fitness or goodness of the current neural network model may be evaluated, for example, using an error function and the result of the comparison (e.g., of the result generated by the neural network during the validation to the expected output of the validation data set). For example, the error function may generate a measured error rate obtained based on the result of the comparison. If the measured error rate is not below a specified threshold, for example, the training and validation processing of the neural network may be repeated any one or more times as needed to obtain a trained neural network that meets the specified threshold or other criteria. Validation datasets may also be used for regularization by early stopping. For example, an embodiment may stop training the neural network when the error rate obtained using the validation dataset increases, as this is a sign of possibly overfitting to the training dataset. More generally, one or more stopping criteria may be specified to indicate when to stop training the neural network whereby the neural network may be considered the final neural network model.

Thus, as illustrated in the flowchart 1200, once validation processing of the step 1208 has completed, control proceeds to the step 1210 where a determination is made as to whether the neural network may be considered validated meeting any specified criteria such as noted above. If the step 1210 evaluates to no, control returns to the step 1206 where the processing of training and validating is again repeated. If the step 1206 evaluates to yes whereby the neural network has been successful validated, control proceeds to the step 1212.

In the step 1212, the final neural network model may be evaluated using a test dataset to provide an unbiased evaluation of a final neural network model. The test data set may be unique in comparison to the training and validation data sets. The test dataset is used to confirm the acceptable predictive capabilities of the final neural network model. The final neural network model may be evaluated using the test data set in a manner similar to that as described above with the validation data set whereby a resulting error rate may be obtained. In at least one embodiment, criteria may be specified where the error rate obtained with the test data set may be compared with the prior error rate obtained from the last evaluation of the neural network model with the validation data set. In at least one embodiment, the validity of the final neural network model may be confirmed if the error rate obtained with the test data set does not exceed the prior error rate obtained from the last evaluation of the neural network model with the validation data set by more than a specified threshold. If the validity of the final neural network model is not confirmed, one or more actions may be taken. The one or more actions may include, for example, repeating the training and validation as described above. The one or more actions may include further evaluating the neural network model to try an alternative neural network model structure, arrangement or architecture by modifying one or more of the hyper-parameters (e.g., return to the first step as described above).

Thus, once the step 1212 has completed, control proceeds to the step 1214 where a determination is made as to whether the neural network confirmation was successful. If the step 1214 evaluates to no, control may return to the step 1202 or the step 1206 depending on the particular action(s) taken, as discussed above. If the step 1214 evaluates to yes, control proceeds to the step 1216 where processing has successfully confirmed that the neural network is now a trained neural network.

Generally, any suitable technique and criteria may be used to train and evaluate a neural network model and obtain the data sets utilized in connection with processing of the flowchart 1200. Once the final neural network model has been generated as a result of training and confirmed (e.g., step 1216) as meeting any specified criteria used in connection with evaluation (e.g., criteria used with evaluating the neural network in connection with the validation processing and confirmation using the test data set), the final neural network may be characterized as a trained neural network having the particular weights and bias values selected as a result of such processing. The trained neural network may then be used to predict subsequent outputs based on specified inputs.

The trained neural network may be defined by its hyper-parameters denoting its structure or architecture as noted above. The trained neural network may also be defined by a first set parameters that are learned through the process described above. The first set of parameters may include the bias values and weights determined through the training, validation and confirmation processing of the neural network described above. Thus, at a first point in time the trained neural network with the first set of parameters may be used to predict outputs based on specified inputs.

Subsequent to the first point in time, the trained neural network may be further trained or retrained, for example, to recognize or predict additional or different outputs. Such retraining may be performed as described above using additional data sets. After such retraining at a second point in time whereby the resulting predictive performance of the neural network is again validated and confirmed meeting any specified criteria, the trained neural network may be defined by its hyper-parameters as well as an updated or revised set of parameters associated with learning to predict the additional or different outputs. The revised set of parameters at the second point in time may include an updated set of weights and bias values where one or more of these values may have been updated in comparison to those of the first set. Generally, the trained neural network may be subsequently retrained any number of times.

When the neural network is being trained or retrained, processing is performed to tune, adjust and select values for the weights and biases that optimize the ability of the neural network to predict outputs given particular inputs. Thus during training and retraining, one or more of the weights and bias values may be updated (e.g., in comparison to prior values or starting values of the weights and biases prior to training or retraining). Once a particular set of weights and bias values used with a neural network has been validated and confirmed as meeting any specified criteria, the neural network may be characterized as a trained neural network with the particular weights and bias values.

The trained neural network may be used in a non-training or non-learning mode where the particular weights and bias values are fixed and not adjusted. In this non-training or non-learning mode, the trained neural network is used to predict outputs based on specified inputs without further modifying any of its weights and bias values.

Figure 12:
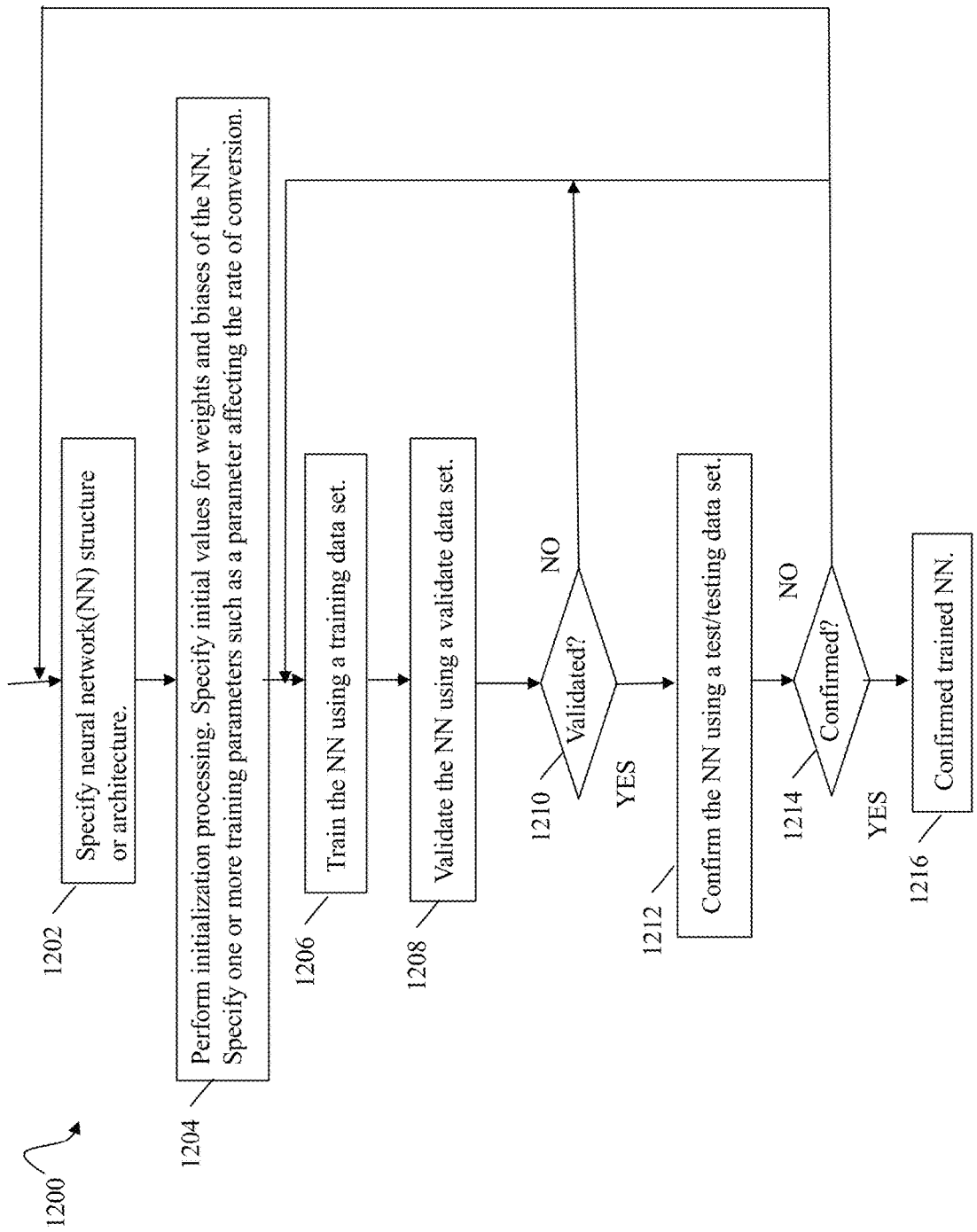
FIGS. 12, 19A, 19B and 20 are flowcharts of processing steps that may be performed in an embodiment in accordance with the techniques herein.
Figure 13:
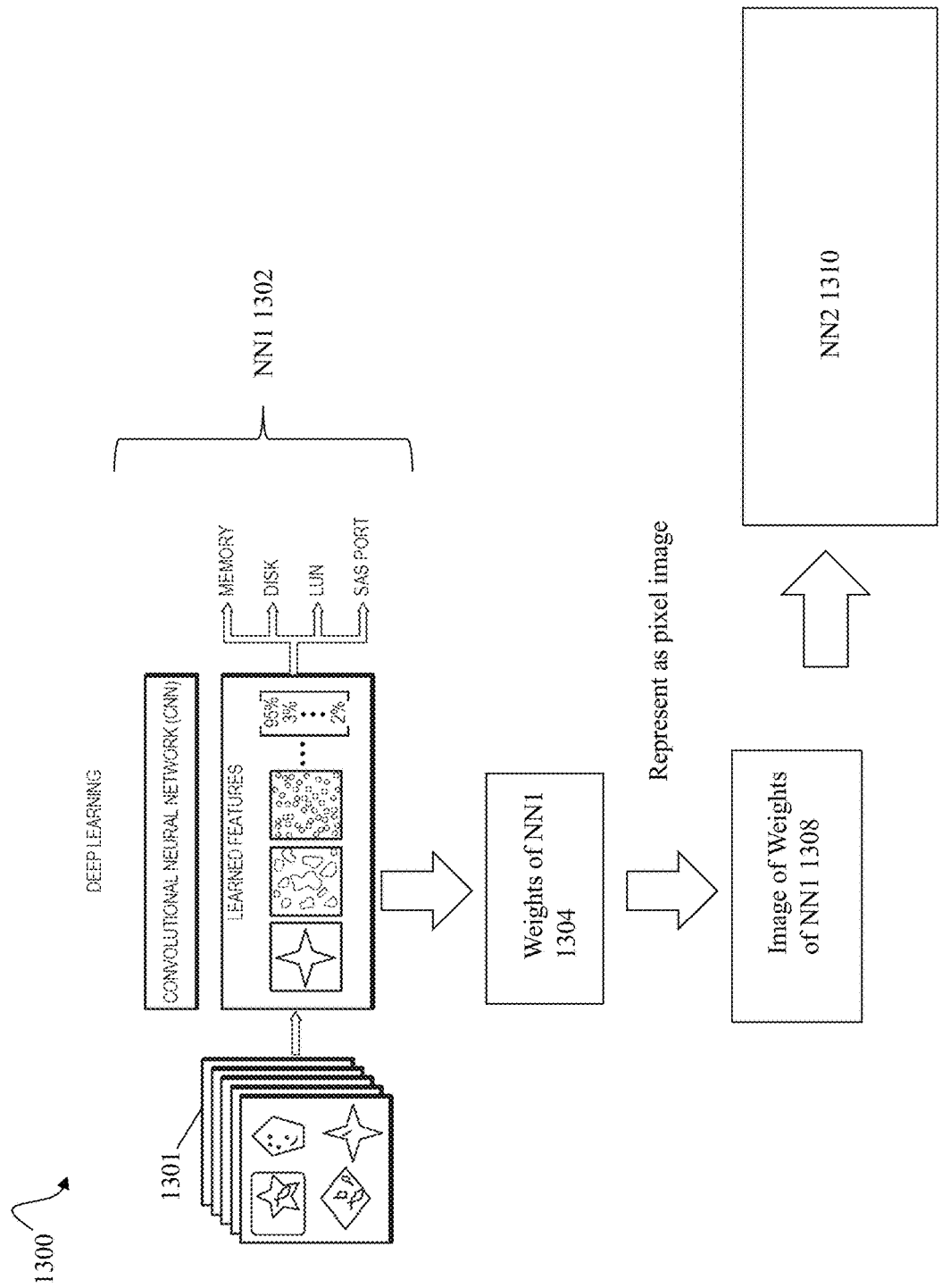
FIG. 13 illustrates data flow between components in an embodiment in accordance with the techniques herein.

Referring to FIG. 13, shown is an example illustrating components in an embodiment in accordance with the techniques herein. In the example 1300, the first neural network, NN1 1302, may be trained as described above to recognize major faults or malfunctions in the system. The NN1 1302 may be as described above, for example, in connection with the FIGS. 7 and 8. Subsequently, NN1 1302 may then be placed in training mode again. Generally, as noted elsewhere herein, when in training mode the NN1 1302 may be in a phase of processing where its weights and bias values are being adjusted and learned, such as in the training phase or step (e.g., step 1206 of FIG. 12) and validation phase or step (e.g., step 1208 of FIG. 12) While NN1 1302 is in training mode being trained, one or more various images 1301 may be provided as inputs to NN1 1302. In at least one embodiment, NN1 1302 may be in training mode during the training phase (e.g., step 1206 of FIG. 12) where at least some of the various images 1301 are included in a training data set and provided as inputs to NN1 1302. In at least one embodiment, NN1 1302 may be in training mode during the validation phase (e.g., step 1208 of FIG. 12) where at least some of the various images 1301 are included in a validation data set and provided as inputs to NN1 1302. The images 1301 may denote images of the system when in one of the sub-states or intermediates states progressing to the major failure or fault state recognized by NN1 1302. However, when the images 1301 are processed by the NN1 1302, the NN1 1302 does not detect the major failure or fault state. Techniques herein use the various internal states of the NN1 1302 as reflected by the weights 1304 of the NN1 after processing the images 1301 to denote various pre-failure states or finer distinct stages or steps progressing to the major fault or failure state. In at least one embodiment, at least some of the sets of weights 1304 of NN1 may be acquired during NN1 1302's training phase using a training data set (e.g., step 1206 of FIG. 12) that includes at least some of the images 1301. In at least one embodiment, at least some of the sets of weights 1304 of NN1 may be acquired after NN1 1302 has completed its training step using a training data set (e.g., step 1206 of FIG. 12) and during the subsequent validation step or phase (e.g., step 1208 of FIG. 12) using a validation data set that includes at least of the images 1301. Such pre-failure states, intermediate states or sub-states, are correlated to different internal states of the NN1 1302. Processing herein trains the second neural network, NN2 1310, to recognize the various pre-failure states, intermediate states or sub-states, based on the different internal states of the first NN, NN1 1302. In this manner, the second NN, NN2 1310, may be used to detect changes in behavior of the NN1 1302 to detect the various pre-failure states, intermediate states or sub-states, prior to the major failure or fault occurrence. Thus, NN2 1310 may detect the one or more of the pre-failure or intermediate states denoting, for example, different levels of warning states corresponding to a particular internal state of the NN1 1302.

With reference to FIG. 13, in at least one embodiment, the weights of NN1 1304 may be represented or converted to an image 1308 whereby the image 1308 may be provided as an input to the NN2 1310 to train the NN2 1310 to recognize the one or more pre-failure or intermediate states. In at least one embodiment, the NN1 1302 and the NN2 1310 may be convolutional neural networks (CNNs). In at least one embodiment, images 1308 provided as inputs to the NN2 1310 to train the NN2 1310 to recognize the one or more pre-failure or intermediate states may be bitmap images. Similarly, the inputs 1301 may also be bitmap images.

As known in the art, a bitmap is an array of bits that specifies the color of each pixel in a rectangular array of pixels. Each pixel may be represented by a number of bits. For color bitmap images, each of the colors R (red), G (green) and B (blue) may be represented by a portion of the bits of the pixel. For a black and white or greyscale bitmap, each pixel may take 1 byte or 8 bits of storage resulting in 256 different states. If these states are mapped onto a ramp of greys from black to white, the bitmap is referred to as a greyscale image. By convention 0 is normally black and 255 white. An embodiment in accordance with the techniques herein may use color or black and white or greyscale bitmaps.

Thus, NN1 1302 may be trained to detect when the system transitions into a resulting state, such as a major fault, failure or malfunction. The system may transition into an intermediate state prior to the resulting state. While the NN1 1302 is in a training mode to detect the intermediate state, the NN1 1302 may process inputs denoting the system in the intermediate state. Internal weights of the NN1 1302 may be adjusted in response to processing the inputs denoting the intermediate state. The internal weights 1304 of the NN1 1302 may be obtained, for example, during training and/or validation phases as part of processing performed to train the first neural network, NN1 1302, to detect the intermediate state. The internal weights 1304 may be used to train a second neural network, NN2 1310, to detect the intermediate state. In at least one embodiment, at least some of the internal weights 1304 may be obtained when NN1 1302 is characterized as being in a steady state where, while NN1 1302 is in the training mode, the internal weights are relatively constant and stable and thereby minimally adjusted (e.g., within some specified tolerance or threshold) while in training mode (e.g., during the training and validation phases) as different inputs denoting the intermediate state are provided to the NN1 1302. In at least one embodiment, the weights 1304 may be converted or represented as images 1308 provided as inputs to the NN2 1310 to train the NN2 1310 to detect the intermediate state.

Following paragraphs refer to a particular example in which the major fault, failure or malfunction may be related to a physical storage device or drive (PD). However, the techniques herein may be more generally applied to any major fault or failure state that has one or more sub-states or intermediate states that may be progressively be detected prior to the major fault or failure state. The PD may be a flash drive that is determined as unusable and taken offline and out of use when the number of unusable cells in the PD reaches a threshold level, such as 70%. The NN1 1302 may be trained to detect this level of unusability as the major failure with respect to a PD. However, it may be desirable to detect other threshold levels of unusable cells of the PD prior to the PD reaching the threshold level of 70% of unusable cells.

As known in the art, flash storage media, such as flash PDs, comprise cells used to store data. Over time, individual cells of the flash PD fail whereby such cells can no longer be written to store data. Over the lifetime of the flash PD, the number of unusable cells increases as more and more cells of the PD experience this wear out and become unusable. Thus, the total number of unusable cells in a flash PD is one way in which the usability of the flash PD may be evaluated. At some point in time when the threshold level of unusable cells is reached, such as 70% of all the PDs cells, the flash PD may be considered to be in a major fault or failure state of unusable and taken offline. When in such a state and as more cells of the PD fail, writes to the flash PD may take longer amounts of time since good or usable cells must be located. Prior to locating a good usable cell of the PD when writing data, processing may traverse other cells which are determined to be unusable and not able to store the requested write data.

Figure 14:
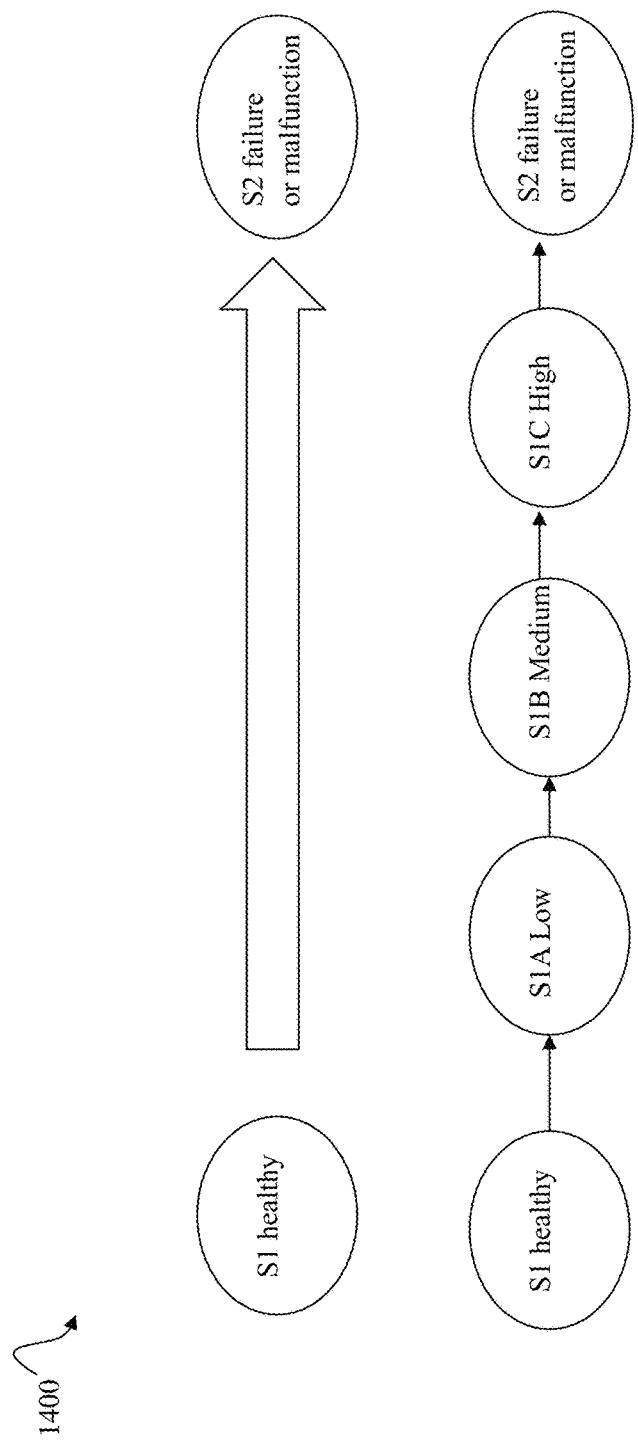
FIG. 14 illustrates intermediates states detected in an embodiment in accordance with the techniques herein.

Referring to FIG. 14, shown is an example 1400 illustrating the various intermediate states that may occur prior to a major failure or malfunction. In the example 1400, S1 denotes a healthy component, such as healthy flash PD and S2 may denote the major fault or malfunction state, such as when the flash PD reaches a maximum threshold number of unusable cells, such as 70% of all its cells are unusable. The NN1 1302 may be trained to detect the occurrence of state S2. However, the NN1 1302 may not be trained to detect intermediate states S1A low, S1B medium and S1C high each of which occur, in sequence, prior to reaching the S2 state. Thus, the foregoing sequence of intermediate states S1A, S1B and S1C may denote an increasing progression in smaller increments of unusable cells in the flash PD. In connection with the techniques herein, the NN2 1310 may be trained to detect and recognize the intermediate states S1A, S1B and S1C based on the internal state of the weights of the NN1 1302. In the following example, state S1A with respect to a flash PD may be detected when the number of unusable cells in the PD reaches 20%. State S1B with respect to a flash PD may be detected when the number of unusable cells in the PD reaches approximately 33%. State S1C with respect to a flash PD may be detected when the number of unusable cells in the PD reaches 50%.

In one aspect, the system as well as the affected component, such as the flash PD, may be characterized as transitioning between the various states of FIG. 15. For example, the PD may transition from the state 51 to the state S1A, transition from the state S1A to the state S1B, transition from the state S1B to the state S1C and then transition from the state S1C to the state S2. In some instances for certain detected states and components, it may be possible to perform a remedial or corrective action to attempt to transition the component from one of the states, such as S1A, S1B or S1C to a healthier state, such as S1 before the component further continues to progress toward S2. In some cases, such as with worn out or unusable cells of a flash PD, it may not be possible return the flash PD to a state with more usable cells. In such a case, the action taken may be to migrate or copy data from the flash PD to another PD prior to the PD reaching the state S2. More detail regarding possible such actions that may be taken is described elsewhere herein.

What will now be described are various examples of the images 1301 that may be provided to the NN1 1302 to denote the various intermediate states S1A, S1B and S1C for use with the techniques herein. The examples of the images 1301 in following figures are simplified to include only a reduced number of components of the system for simplicity of illustration.

Figure 15A:
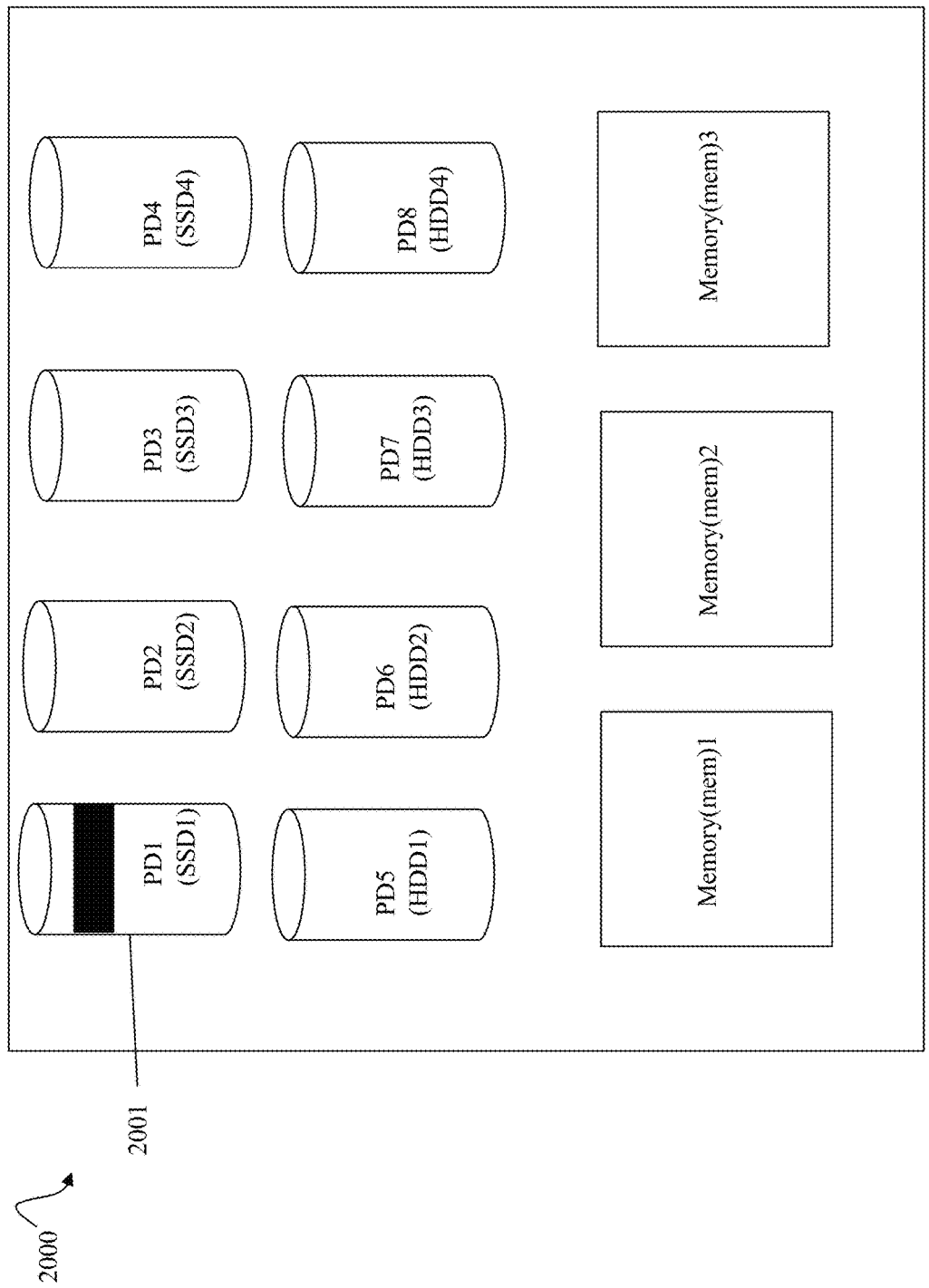
FIGS. 15A-15E are images denoting a first intermediate state that may be used in an embodiment in accordance with the techniques herein.

FIGS. 15A-15E may be included in the images 1301 and denote the first intermediate state S1A for a single flash PD, PD1. Referring to FIG. 15A, the example 2000 is an image of 8 PDs where PDs 1-4 are flash PDs, or more generally, solid state storage (SSD) devices providing non-volatile backend storage. PDs5-8 may be rotating disk drives, or more generally, hard disk drives (HDDs) providing non-volatile backend storage. Also included in the example 2000 are 3 memory banks or modules (e.g., DRAM storage) within the data storage system providing volatile storage such as may be used for global memory and caching. Each of the FIGS. 15A-E, 16A-E and 17A-E including the same components with different blackened or bolded areas of the PD 1 to denote varying degrees and number of unusable cells in the PD 1. In these figures, PD1 may be shaded by a certain overall percentage to denote the approximate percentage of unusable cells of the PD1 in each of the figures.

In the example 2000 of the FIG. 15A, element 2001 shows a first way in which PD 1 may be annotated with about 10% black shading to denote approximately 10% of the cells of the PD1 as unusable.

Figure 15B:
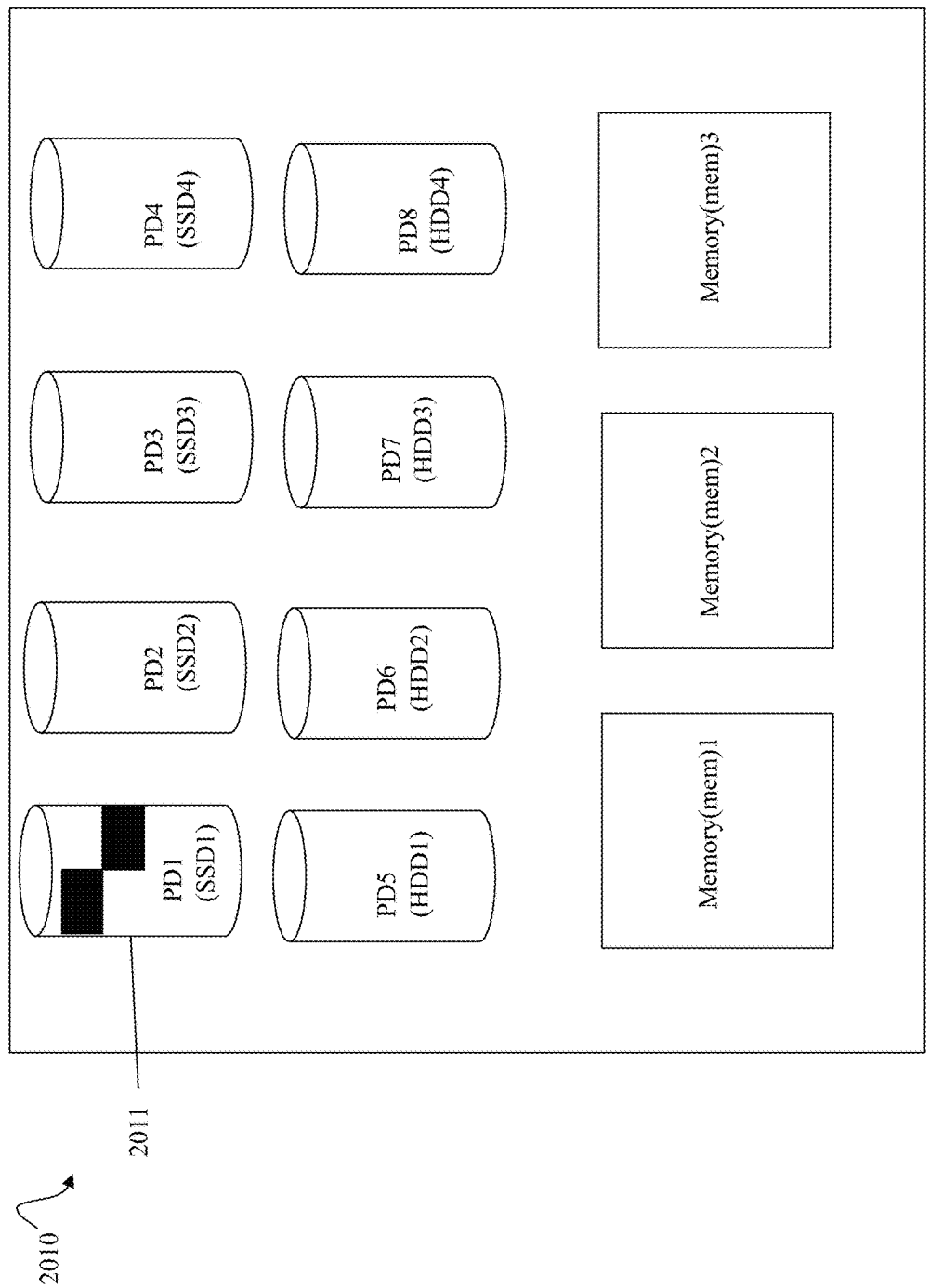

In the example 2010 of the FIG. 15B, element 2011 shows a second way in which PD 1 may be annotated with about 10% black shading to denote approximately 10% of the cells of the PD1 as unusable.

Figure 15C:
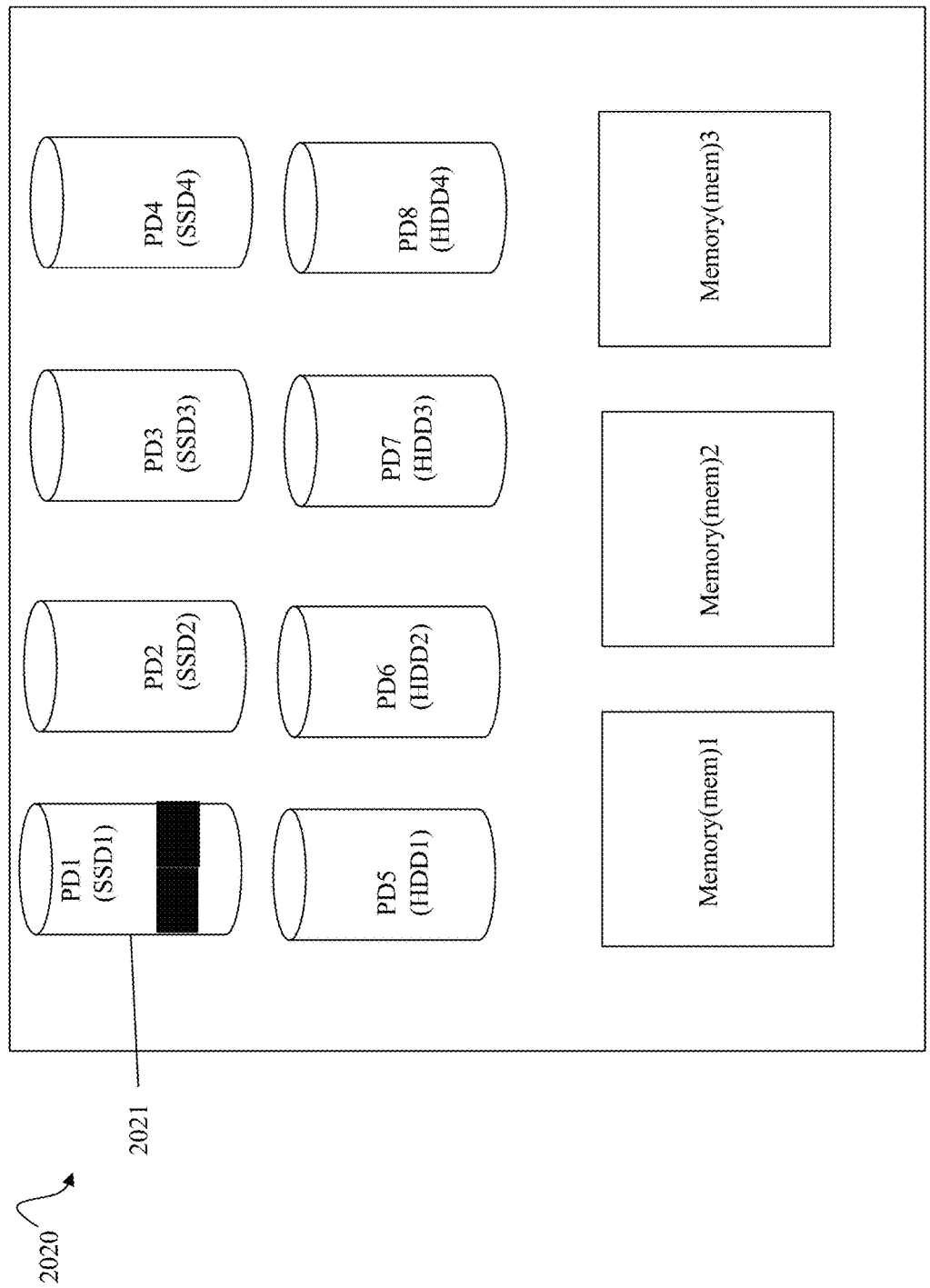

In the example 2020 of the FIG. 15C, element 2021 shows a third way in which PD 1 may be annotated with about 10% black shading to denote approximately 10% of the cells of the PD1 as unusable.

Figure 15D:
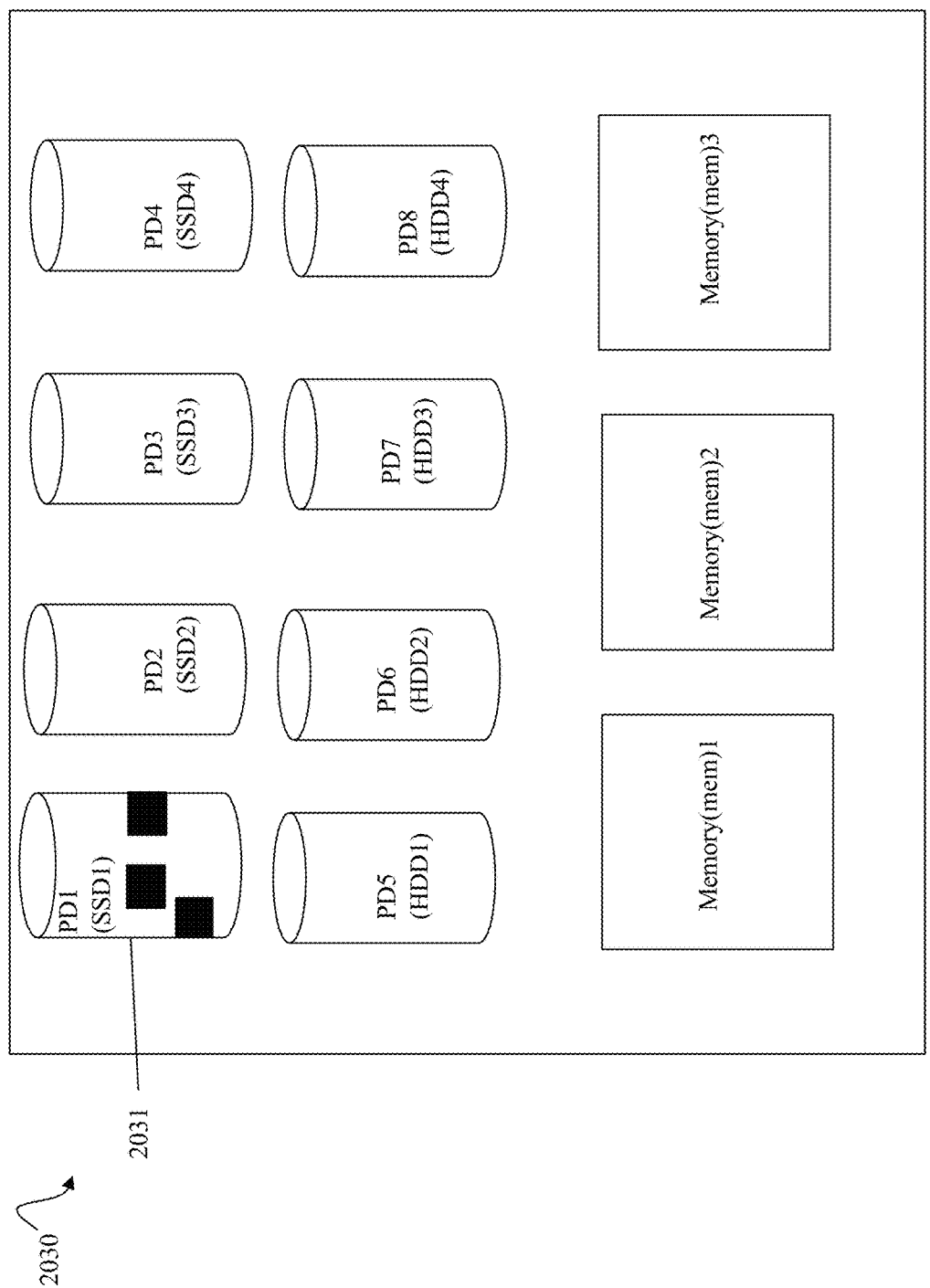

In the example 2030 of the FIG. 15D, element 2031 shows a fourth way in which PD 1 may be annotated with about 10% black shading to denote approximately 10% of the cells of the PD1 as unusable.

Figure 15E:
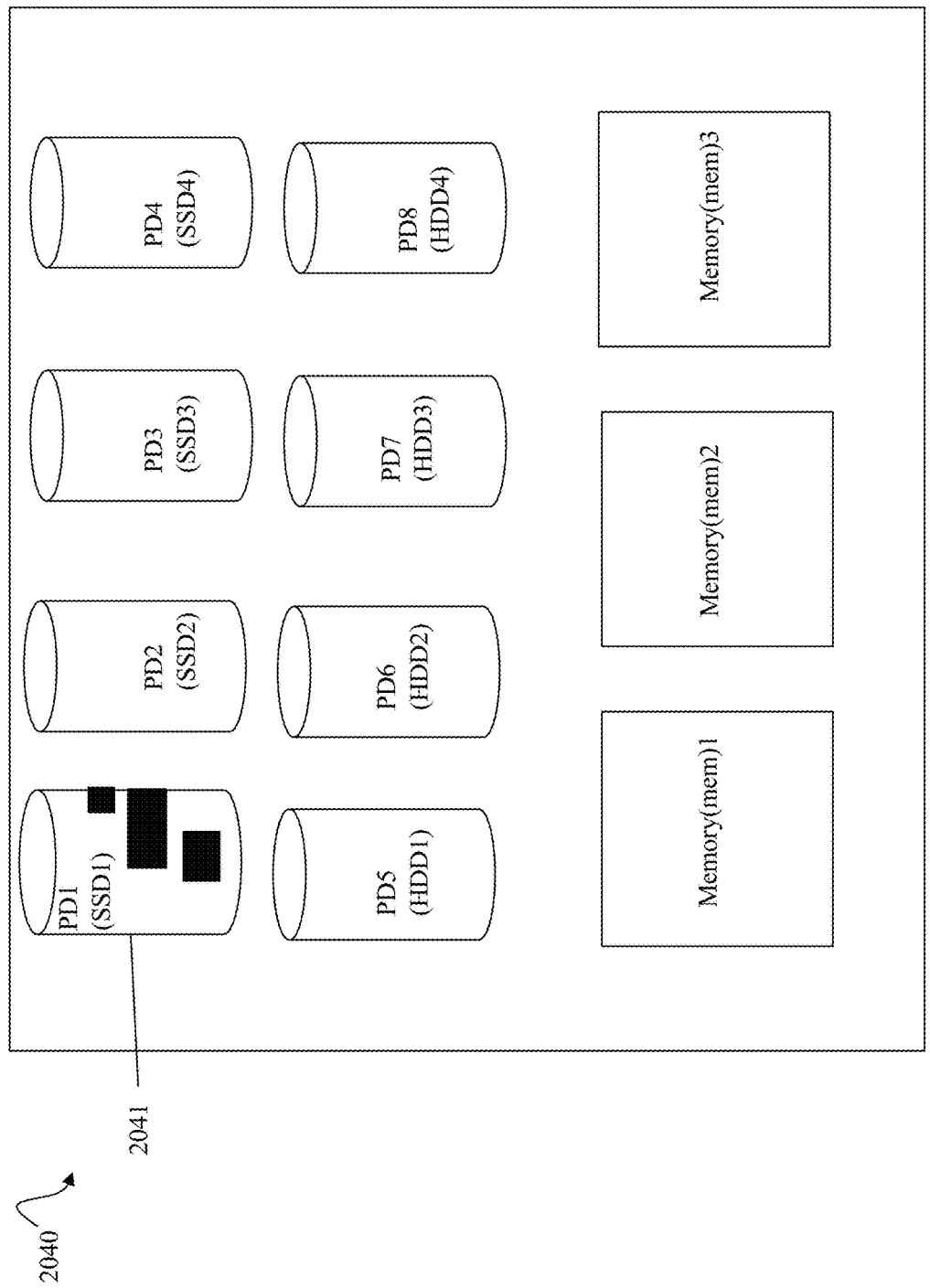

In the example 2040 of the FIG. 15E, element 2041 shows a fifth way in which PD 1 may be annotated with about 10% black shading to denote approximately 10% of the cells of the PD1 as unusable.

FIGS. 16A-16E may be included in the images 1301 and denote the second intermediate state S1B for the single flash PD, PD1.

Figure 16A:
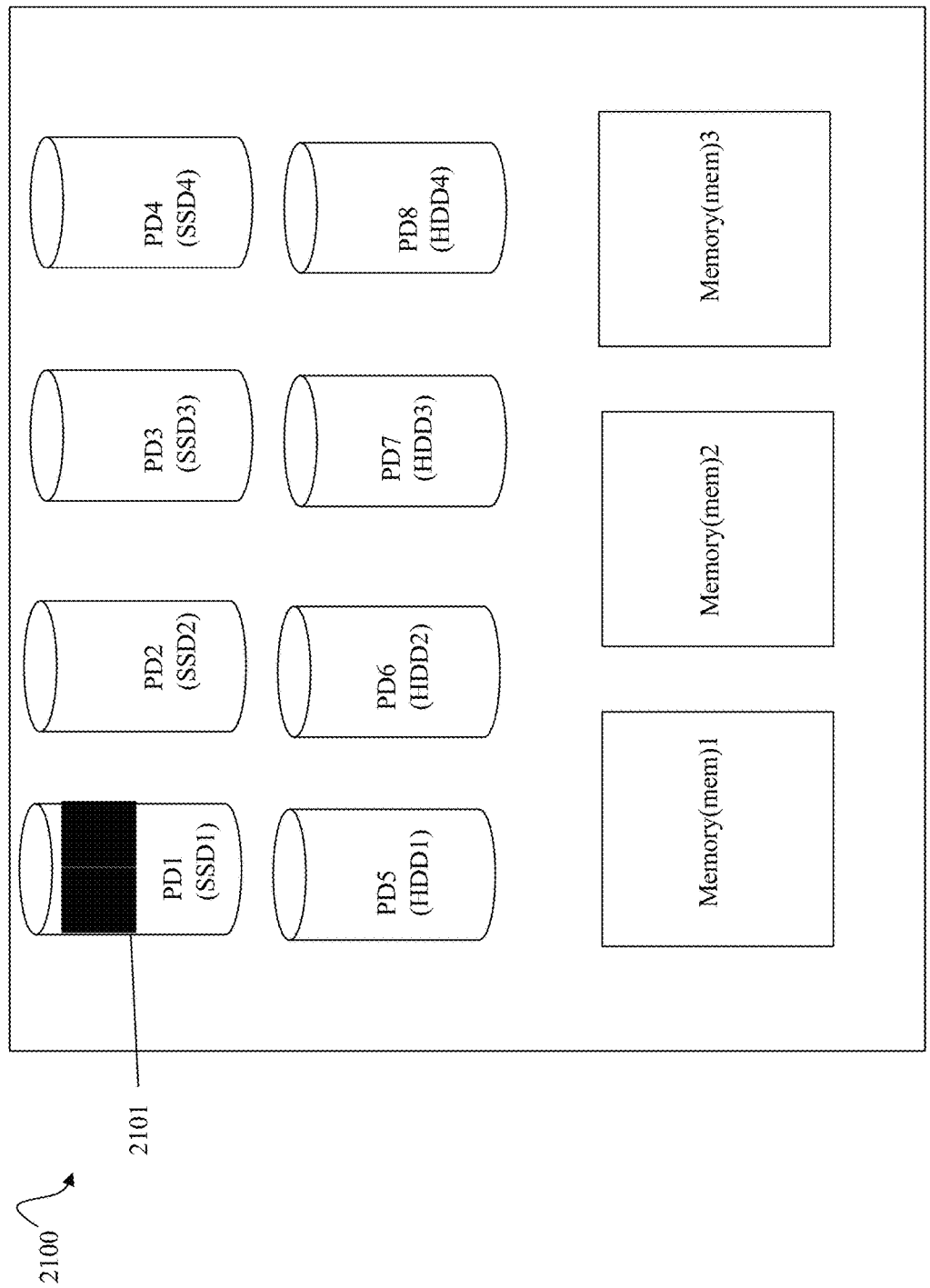
FIGS. 16A-16E are images denoting a second intermediate state that may be used in an embodiment in accordance with the techniques herein.

In the example 2100 of the FIG. 16A, element 2101 shows a first way in which PD 1 may be annotated with about 33% black shading to denote approximately 33% of the cells of the PD1 as unusable.

Figure 16B:
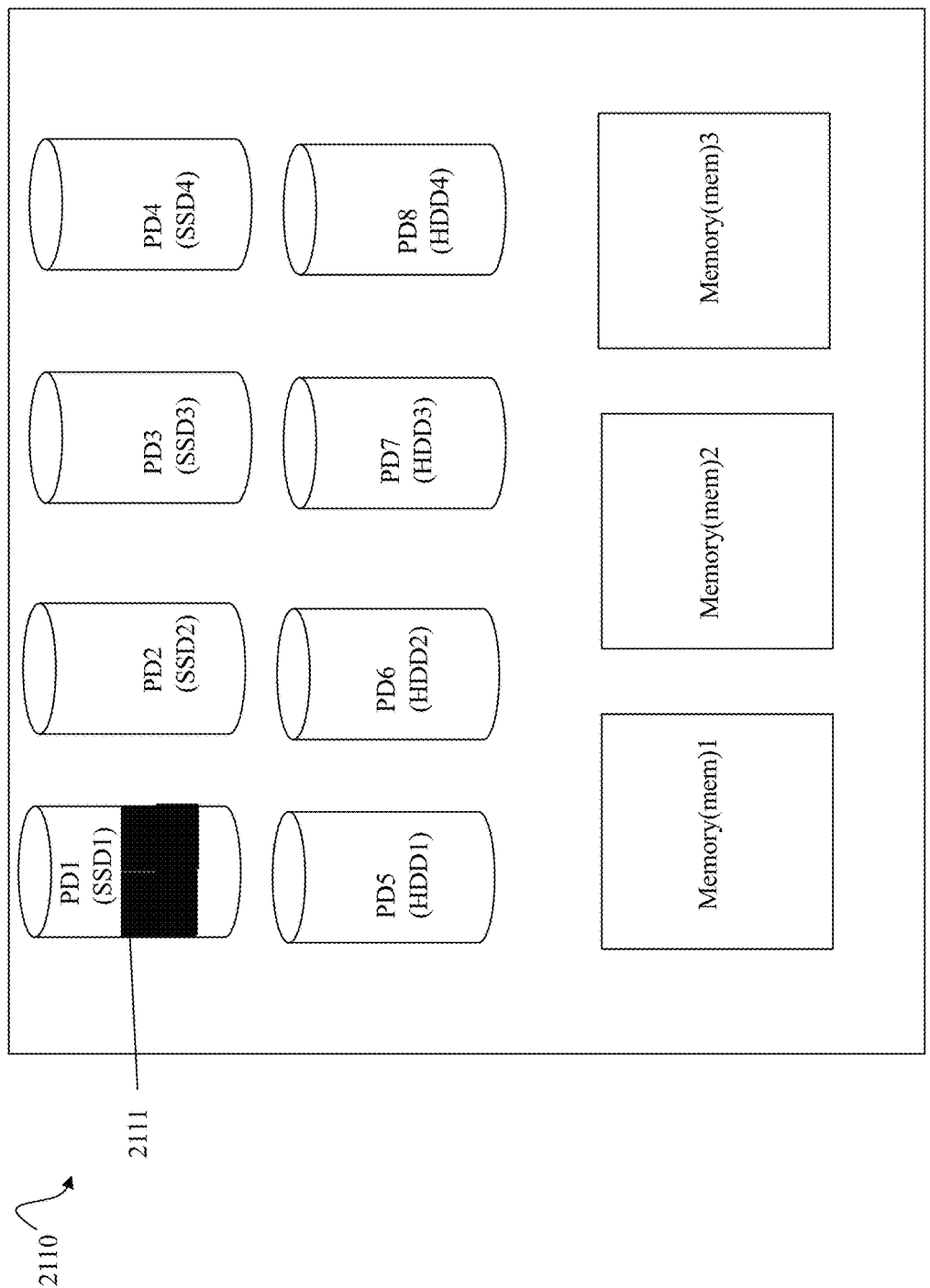

In the example 2110 of the FIG. 16B, element 2111 shows a second way in which PD 1 may be annotated with about 33% black shading to denote approximately 33% of the cells of the PD1 as unusable.

Figure 16C:
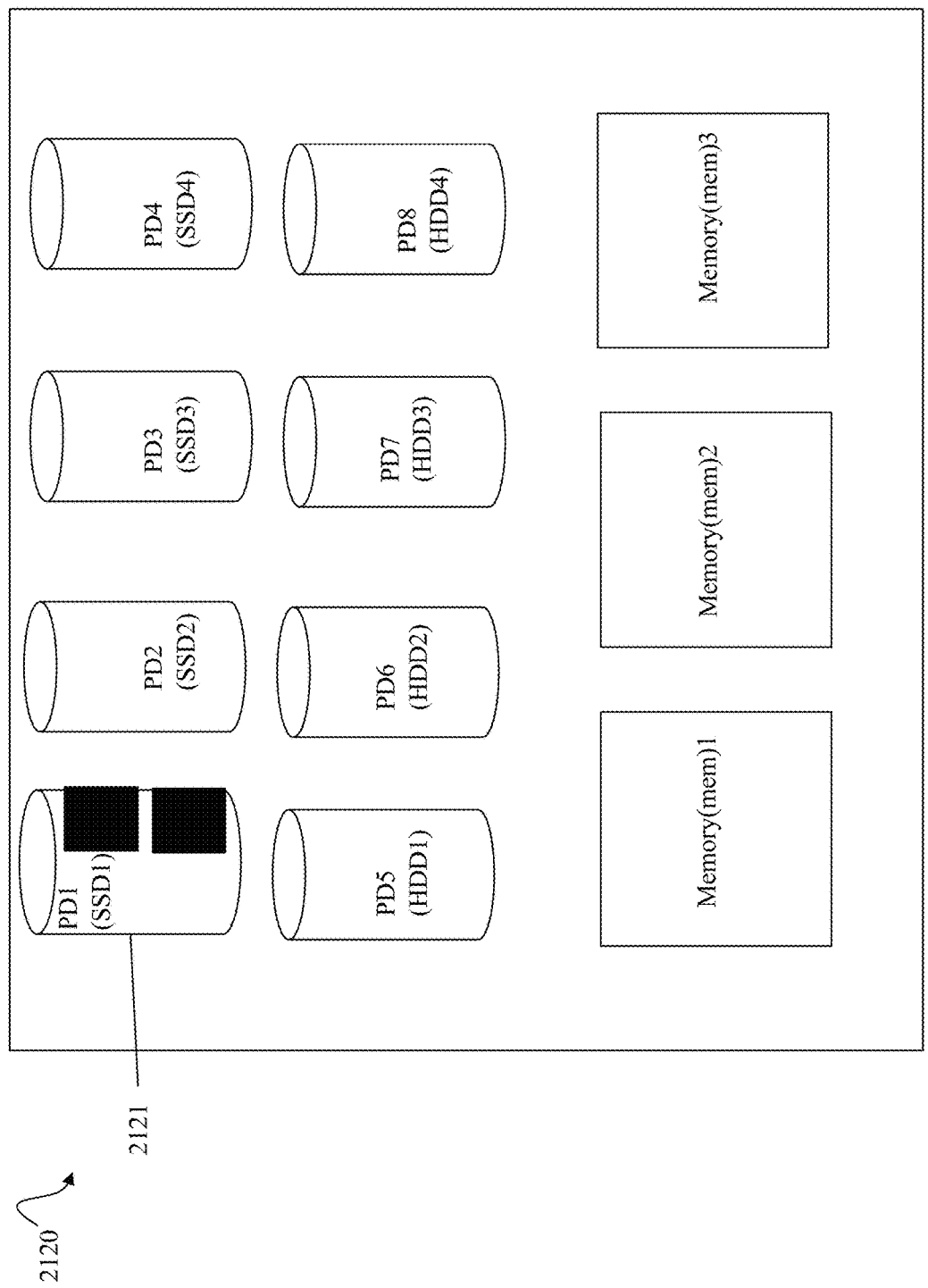

In the example 2120 of the FIG. 16C, element 2121 shows a third way in which PD 1 may be annotated with about 33% black shading to denote approximately 33% of the cells of the PD1 as unusable.

Figure 16D:
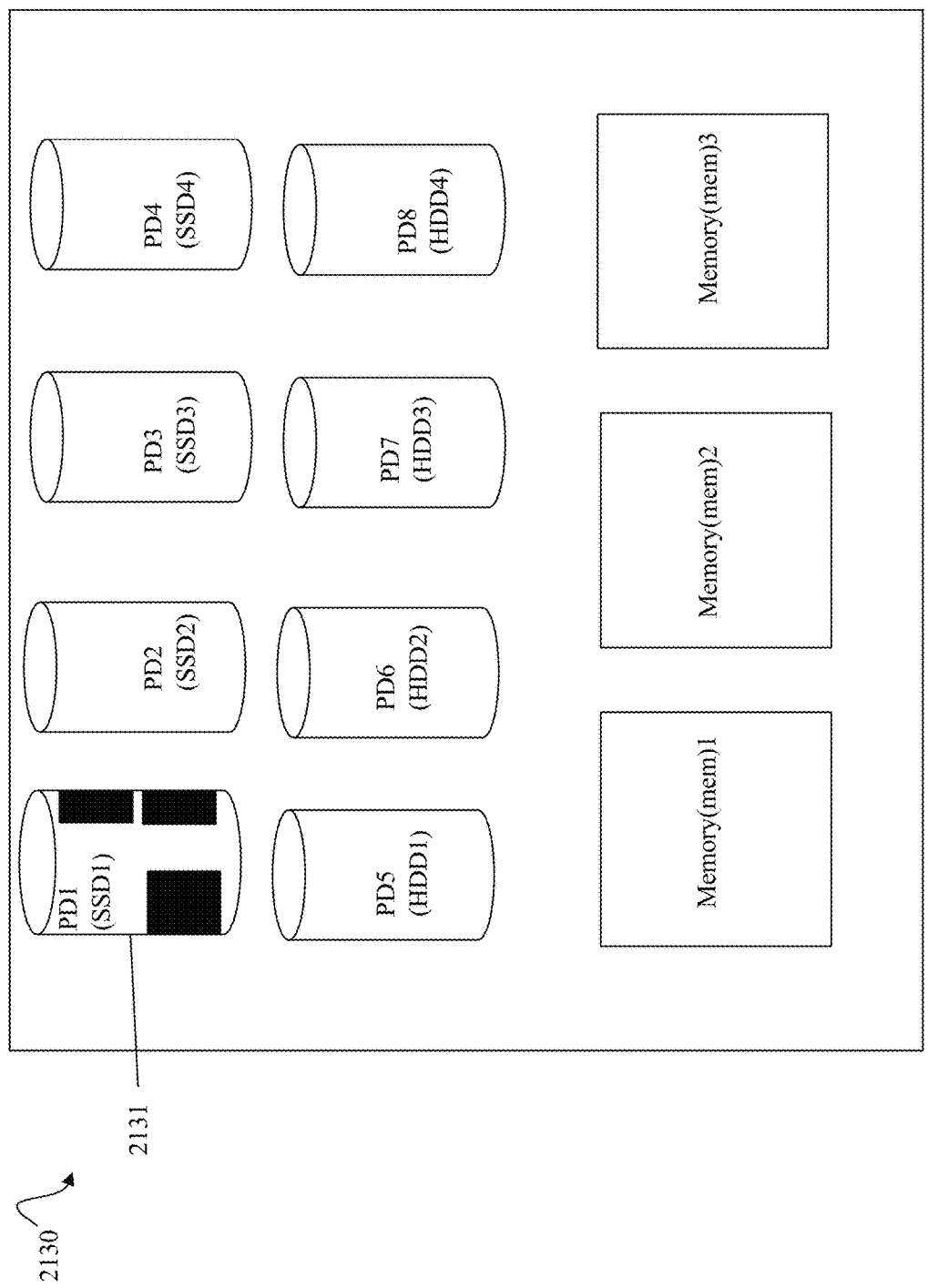
Figure 16E:
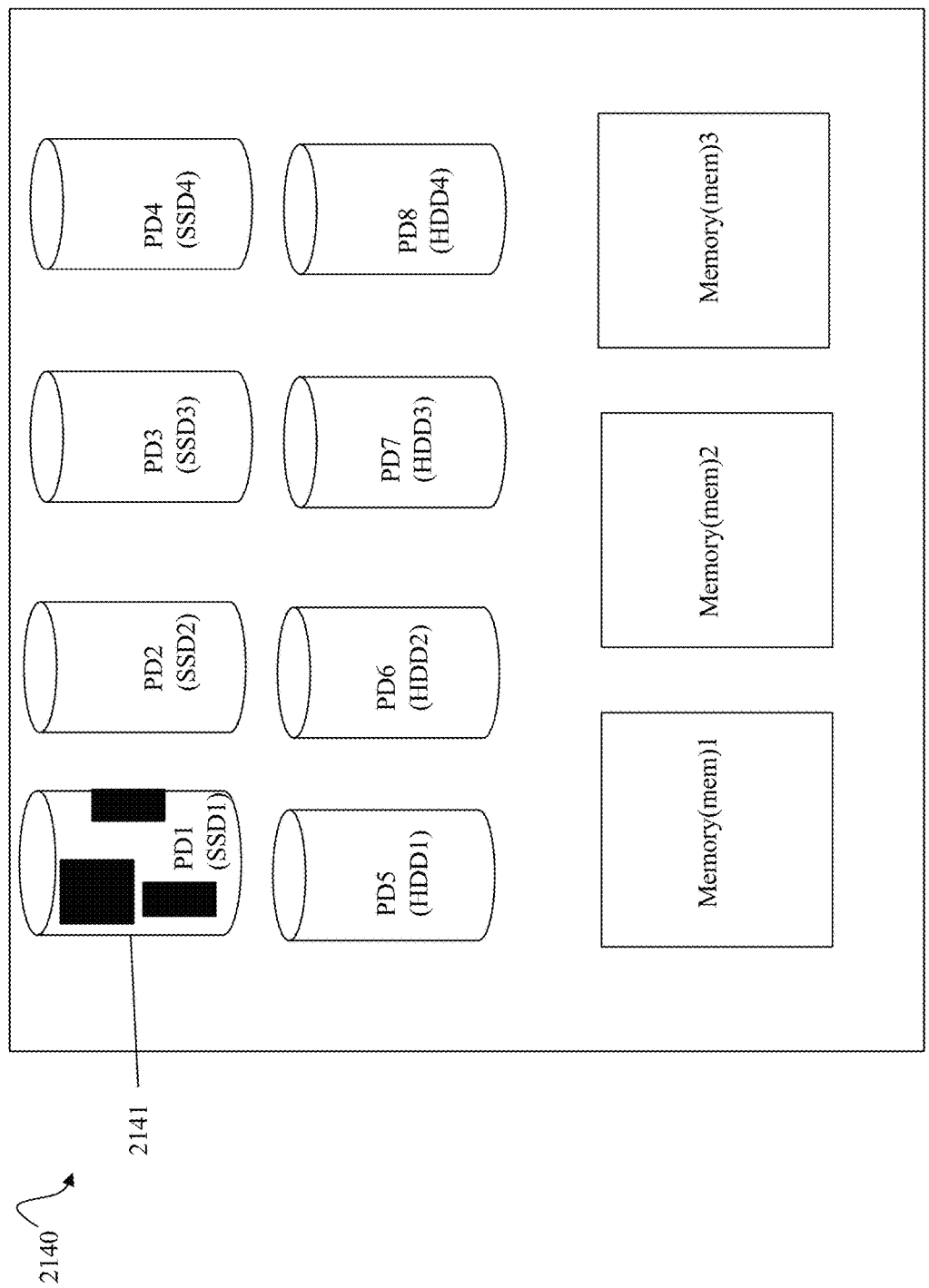

In the example 2130 of the FIG. 16D, element 2131 shows a fourth way in which PD 1 may be annotated with about 33% black shading to denote approximately 33% of the cells of the PD1 as unusable.

In the example 2140 of the FIG. 16D, element 214 shows a fifth way in which PD 1 may be annotated with about 33% black shading to denote approximately 33% of the cells of the PD1 as unusable.

FIGS. 17A-17E may be included in the images 1301 and denote the third intermediate state S1C for the single flash PD, PD1.

Figure 17A:
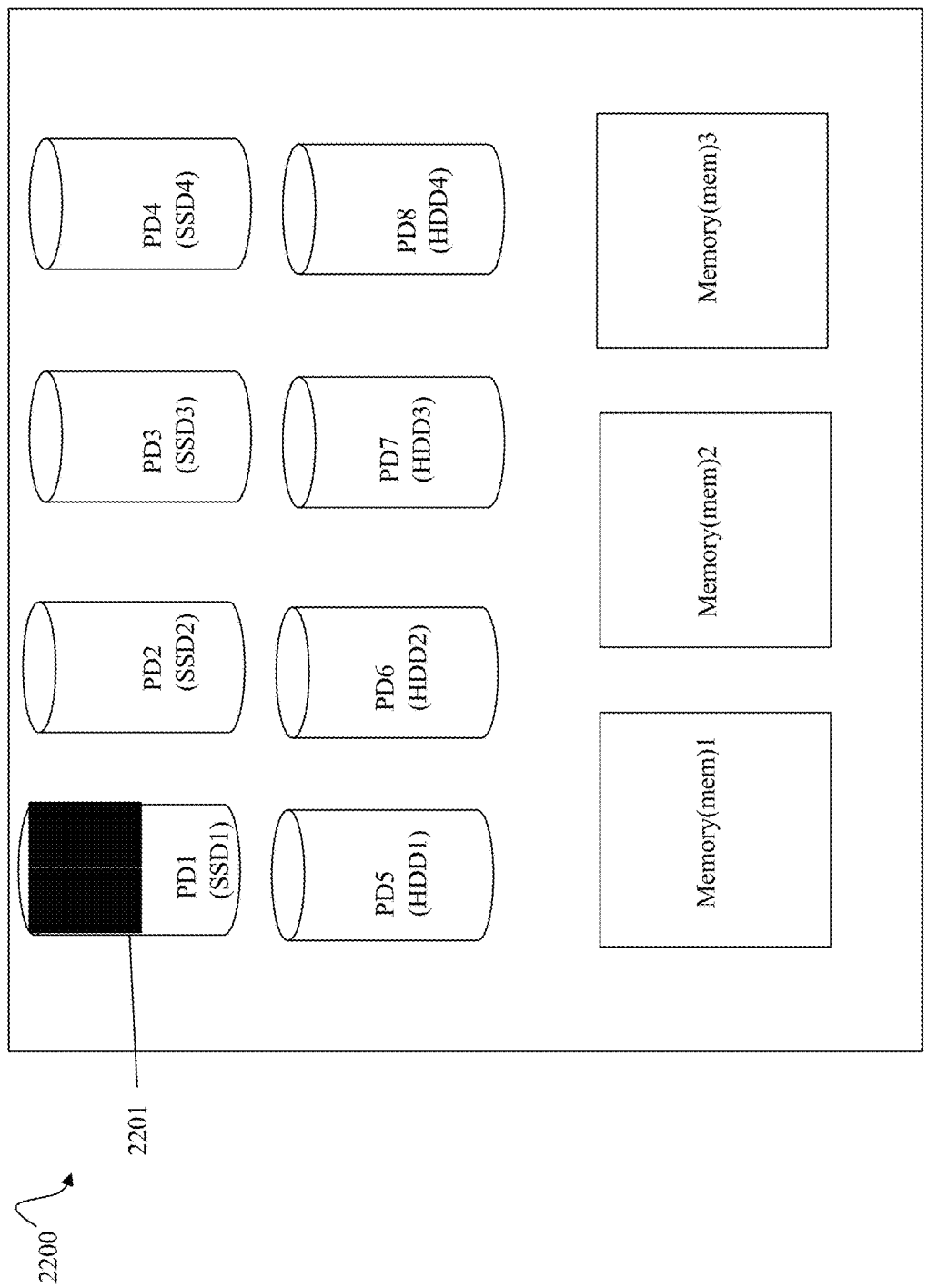
FIGS. 17A-17E are images denoting a third intermediate state that may be used in an embodiment in accordance with the techniques herein.

In the example 2200 of the FIG. 17A, element 2201 shows a first way in which PD 1 may be annotated with about 50% black shading to denote approximately 50% of the cells of the PD1 as unusable.

Figure 17B:
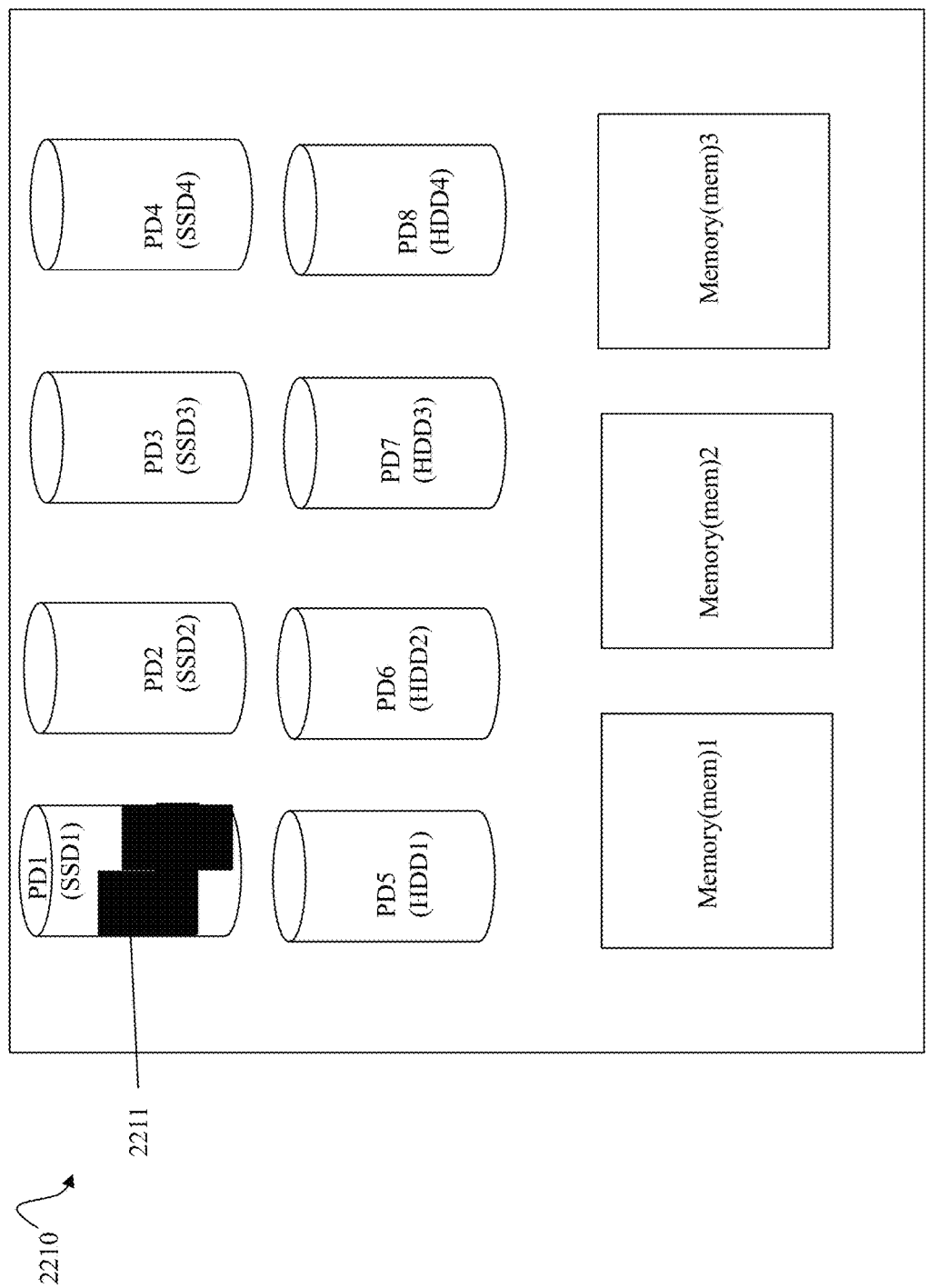

In the example 2210 of the FIG. 17B, element 2211 shows a second way in which PD 1 may be annotated with about 50% black shading to denote approximately 50% of the cells of the PD1 as unusable.

Figure 17C:
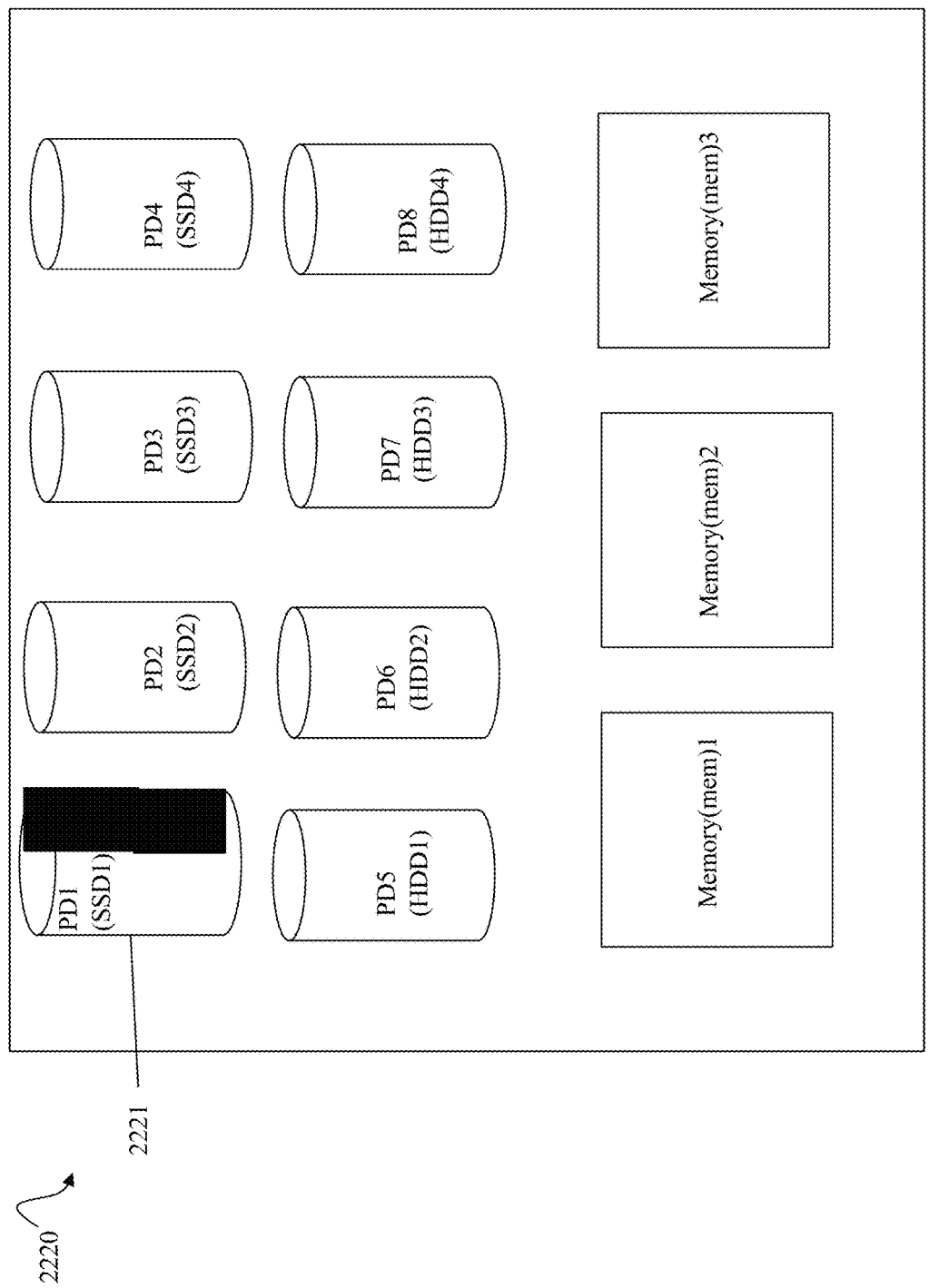

In the example 2220 of the FIG. 17C, element 2221 shows a third way in which PD 1 may be annotated with about 50% black shading to denote approximately 50% of the cells of the PD1 as unusable.

Figure 17D:
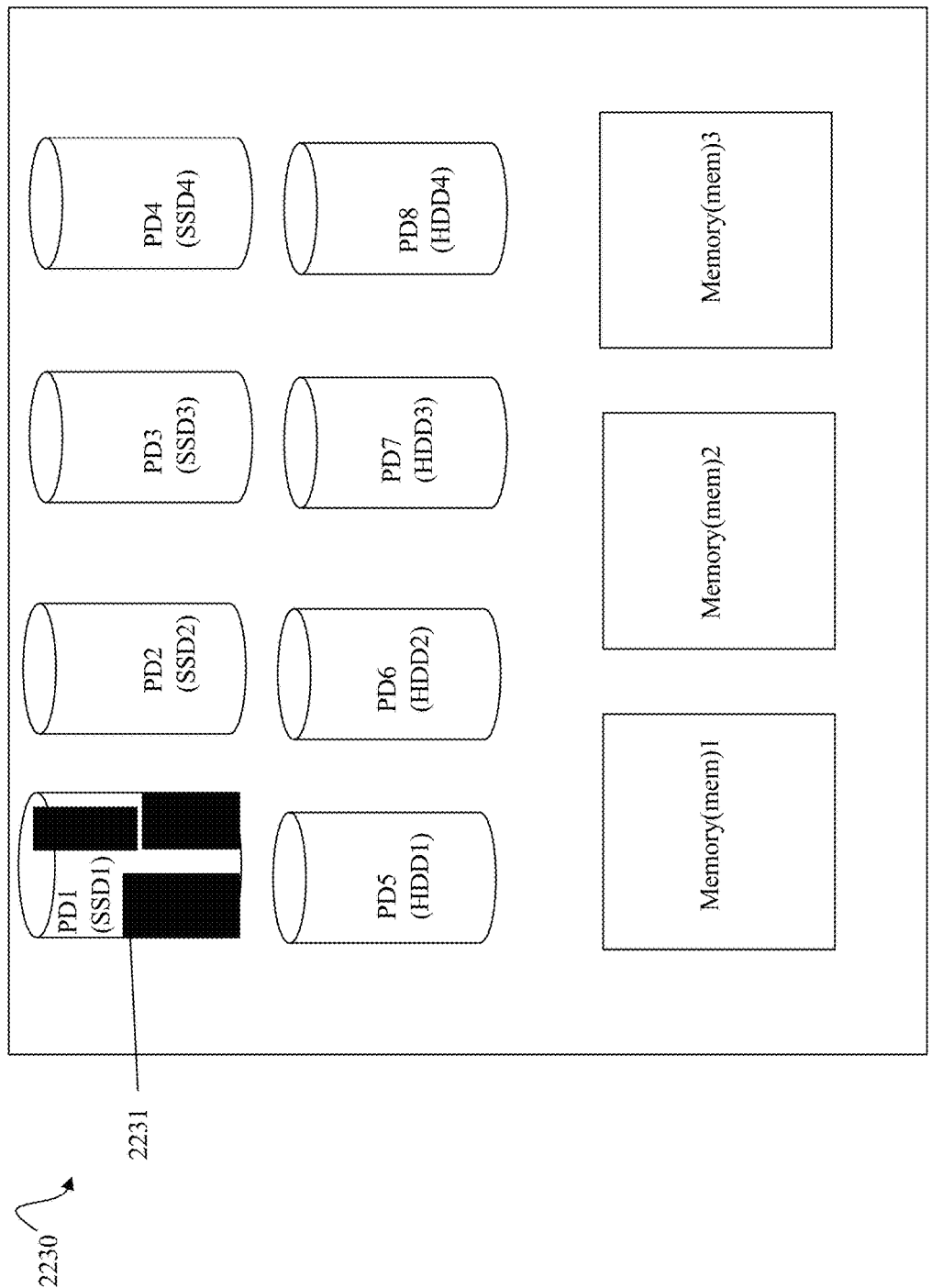

In the example 2230 of the FIG. 17D, element 2231 shows a fourth way in which PD 1 may be annotated with about 50% black shading to denote approximately 50% of the cells of the PD1 as unusable.

Figure 17E:
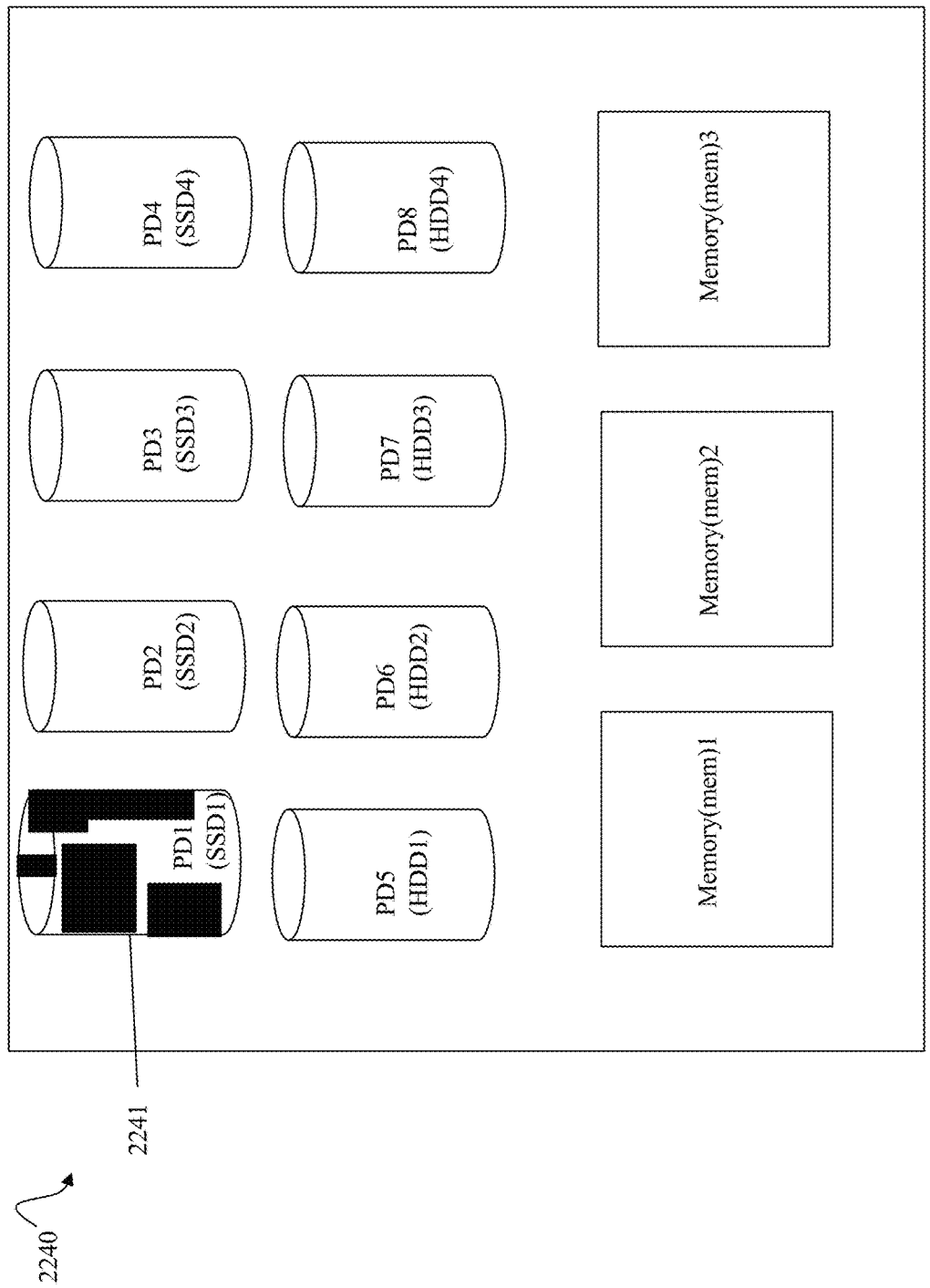

In the example 2240 of the FIG. 17E, element 2241 shows a fifth way in which PD 1 may be annotated with about 50% black shading to denote approximately 50% of the cells of the PD1 as unusable.

With reference back to the FIG. 13, the NN1 1302 has been trained to detect or recognize the major fault or state when 70% of the cells of the PD1 are unusable. However, NN1 1302 does not recognize or detect any of the 3 intermediate states S1A, S1B and S1C. NN1 1302 may be placed in training mode whereby its weights may be adjusted as fed additional images 1301 such as the images of the FIG. 15A-E. Thus, NN1 1302 may be in training mode but providing images of FIGS. 15A-E denoting the intermediate state S1A does not result in any output of NN1 1302 detecting the state S1A (since NN1 1302 has not yet completed training so as to be able to detect the state S1A). However, the internal state of the weights of NN1 1302 after processing each of the images of the FIGS. 15A-15E corresponding to the state S1A may be adjusted or modified. After each of the images of the FIGS. 15A-E is processed by the NN1 1302 and its weights accordingly adjusted as part of ongoing training to detect S1A, its internal state of weights may be captured and stored in a different image 1308 that may then be used to train NN1 1310 to recognize or detect the state S1A based on the weights of the NN1 1302. In at least one embodiment, the weights may be acquired while NN1 1302 is in its training mode, or more generally in a phase or step, such as step 1206 of FIG. 12 or step 1208 of FIG. 12, where its weights and bias values are adjusted subsequent to processing the images of FIG. 15A-15E.

Once images of the FIGS. 15A-E have been processed by the NN1 1302 when in training mode and corresponding images 1308 of the weights of NN1 1302 have been obtained, NN1 1302 may be reset or reinitialized. Such resetting or reinitializing NN1 1302 may include reinitializing the weights and bias values of NN1 1302 to be as they were prior to processing any of the images of FIGS. 15A-E. After such reinitialization of the NN1 1302, NN1 1302 may be placed in training mode whereby its weights may be adjusted as fed additional images 1301 such as the images of the FIG. 16A-E denoting the second intermediate state S1B. Thus, NN1 1302 may be in training mode but providing images of FIGS. 16A-E denoting the intermediate state S1B does not result in any output of NN1 1302 detecting the state S1B (since NN1 1302 has not yet completed training so as to be able to detect the state S1B). However, the internal state of the weights of NN1 1302 after processing each of the images of the FIGS. 16A-16E corresponding to the state S1B may be adjusted or modified. After each of the images of the FIGS. 16A-E is processed by the NN1 1302 and its weights accordingly adjusted as part of ongoing training to detect S1B, its internal state of weights may be captured and stored in a different image 1308 that may then be used to train NN1 1310 to recognize or detect the state S1B based on the weights of the NN1 1302. In at least one embodiment, the weights may be acquired while NN1 1302 is in its training mode, or more generally in a phase or step, such as step 1206 of FIG. 12 or step 1208 of FIG. 12, where its weights and bias values are adjusted subsequent to processing the images of FIG. 16A-16E.

Once images of the FIGS. 16A-E have been processed by the NN1 1302 when in training mode and corresponding images 1308 of the weights of NN1 1302 have been obtained, NN1 1302 may be reset or reinitialized. Such resetting or reinitializing NN1 1302 may include reinitializing the weights and bias values of NN1 1302 to be as they were prior to processing any of the images of FIGS. 15A-E. After such reinitialization of the NN1 1302, NN1 1302 may be placed in training mode whereby its weights may be adjusted as fed additional images 1301 such as the images of the FIG. 17A-E denoting the third intermediate state S1C. Thus, NN1 1302 may be in training mode but providing images of FIGS. 17A-E denoting the intermediate state S1C does not result in any output of NN1 1302 detecting the state S1C (since NN1 1302 has not yet completed training so as to be able to detect the state S1C). However, the internal state of the weights of NN1 1302 after processing each of the images of the FIGS. 17A-17E corresponding to the state S1C may be adjusted or modified. After each of the images of the FIGS. 17A-E is processed by the NN1 1302 and its weights accordingly adjusted as part of ongoing training to detect S1C, its internal state of weights may be captured and stored in a different image 1308 that may then be used to train NN1 1310 to recognize or detect the state S1C based on the weights of the NN1 1302. In at least one embodiment, the weights may be acquired while NN1 1302 is in its training mode, or more generally in a phase or step, such as step 1206 of FIG. 12 or step 1208 of FIG. 12, where its weights and bias values are adjusted subsequent to processing the images of FIG. 17A-17E.

Referring to FIG. 18A, shown is an example illustrating a matrix of weights of the NN1 1302 that may be obtained to denote the internal state of the NN1 1302 in an embodiment in accordance with the techniques herein. The example 1550 provides additional detail regarding the element 1304 of the FIG. 13. Generally, the example 1550 forms a matrix of the weights for inputs to the neurons of the hidden layers and the output layer of the NN1 1302. For example one instance of the matrix 1550 may be obtained after each of the images of FIGS. 15A-E, 16A-E and 17A-E is processed by the NN1 1302 when in training mode. In this manner, 15 matrices such as generally illustrated in the FIG. 18A may be obtained and used as input to train the NN2 1310 to recognize the intermediate states S1A, S1B and S1C. Generally, more images are fed into the NN1 1302 to obtain additional weight matrices in order to generate sufficient data to train the NN2 1310.

The matrix of 1550 generally includes a different weight in each cell or entry. The matrix is two dimensional and includes a number of columns equal to the number of hidden layer in the NN1 1302, plus 1, to account for the output layer weights. For example, if the NN1 1302 includes 10 hidden layers, each matrix includes 11 columns. Each matrix of weights also includes a number of row that may be calculated as follows:

rows=(max number of neurons in any layer*max number of weights/inputs to any neuron of any layer)

where
rows denotes the number of rows in the matrix;
"max number of neurons in any layer" denotes the maximum number of neurons in any of the hidden layers and output layer of the NN1 1302; and
"max number of weights/inputs to any neuron of any layer" denotes the maximum number of weights or inputs to any neuron in any of the hidden layers and the output layer of the NN1 1302.

It should be noted that a neural network, such as NN1 1302, may have any number of hidden layers, may have any number of neurons in each layer, and each neuron may have any number of inputs depending on the particular connections between different neurons of different layers. Thus, the column and row dimensions of the matrix are based on the maximum number of neurons in any layer and the maximum number of inputs to any single neuron in the NN1 1302. An entry of the matrix may be accessed using a column identifier, Col ID, and a row identifier, Row ID, where the Col ID identifies one of the hidden layers or the output layer, and where the Row ID identifies the particular neuron and the particular weight of the neuron. Thus each column of the matrix 1550 includes the weights for a single one of the hidden layers or the output layer. Since the matrix includes dimensions based on the maximum number of neurons in a layer and the maximum number of inputs or weights to any neuron, entries of the matrix may be zero for example, if a particular layer has less than the maximum number of neurons and if a particular neuron has less than the maximum number of weights or inputs. In one aspect the matrix 1550 may be viewed as a concatenation of the weights of the different hidden and output layers of the NN1 1302.

To further illustrated, reference is made back to the FIG. 10 where the maximum number of nodes in any hidden layer or the output layer is 3 and where the maximum number of weights or inputs to any neuron is 3. For the neural network of FIG. 10 assuming such a neural network is implemented as NN1 1302, the matrix of weights has 3 columns (e.g., 2 hidden layers and 1 output layer), and 9 rows (e.g., maximum of 3 neurons in any layer and maximum of 3 weights or inputs for any neuron). In such a case, the matrix cell or entry [1,1] (for a 1-based array notation may include the weight W4 for neuron H1. The matrix cell or entry [1,2] and [1,3] may both be zero since neuron H1 does not have a second and third weight or inputs. The matrix cell or entry [1,4] may include the weight W5 for the neuron H2. The matrix cell or entry [1,5] may include the weight W6 for the neuron H2. The matrix cell or entry [1,6] may be zero since the neuron H2 does not have a third weight or input. In a similar manner, each weight of the neural network of FIG. 10 may be mapped or translated to a particular entry or cell of the matrix where the column denotes one of the hidden layers or the output layer, and where the row is determined based on the particular neuron and the particular weight of the neuron. In at least one embodiment, the neurons may be placed in a sequential ordering based on the hidden and output layers such as H1, H2, H3, H4, H5, O1 and O2, where each layer has a corresponding integer in the sequence beginning with 1 (e.g., H1 is mapped to 1, H2 is mapped to 2, H3 is mapped to 3, . . . O2 is mapped to 7). If the maximum number of inputs to any neuron is 3, and there are at most 3 neurons in each layer, all weights for the first neuron of a layer may be located in rows 1-3, all weights for the second neuron of a layer may be located in rows 4-6, and the weights for the third neuron of a layer may be located in rows 7-9.

As described elsewhere herein, each instance of the matrix 1550 for a set of weights of the NN1 1302 may be represented or converted to an image such as a bitmap image that may be visually displayed to a user. In at least one embodiment, each weight may be represented by a single pixel in a corresponding bitmap image representing the matrix 1550. The coloring and intensity of the pixel may be determined using the weight value. For example, in at least one embodiment, each of the weights may be normalized and mapped to an integer in the range 0-255, inclusively, where the value of the weight denotes a greyscale value of the pixel for the weight.

Figure 18B:
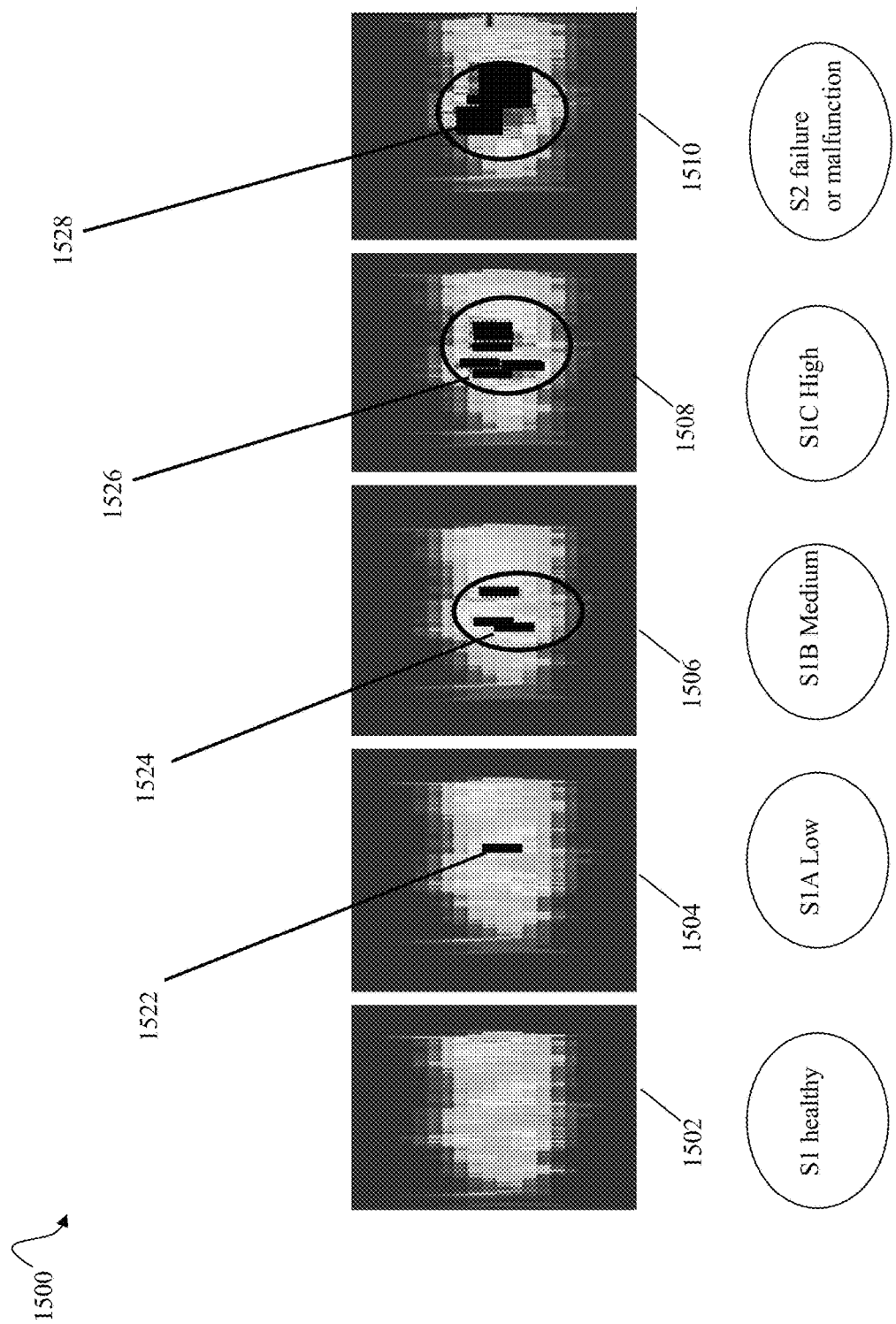
FIG. 18B illustrates images of matrices of weights denoting the internal state of a neural network in an embodiment in accordance with the techniques herein.

Referring to FIG. 18B, shown is an example illustrating images of the weights of the NN1 1302 corresponding to different states in an embodiment in accordance with the techniques herein. The example 1500 includes the image 1502 of the weights of the NN1 1302 when in the healthy state S1. The image 1504 is an image of the weights of the NN1 1302 when in the first intermediate state S1A low. The image 1506 is an image of the weights of the NN1 1302 when in the second intermediate state S1B medium. The image 1508 is an image of the weights of the NN1 1302 when in the third intermediate state S1C high. The image 1510 is an image of the weights of the NN1 1302 when in the S2 major failure or malfunction state.

As can be seen in the image 1504, element 1522 denotes a particular area of the image that has changed in intensity when the NN1 1302 is trained with the images 1301 illustrating the first intermediate state S1A such as in FIGS. 15A-E. Thus, although the NN1 1302 does not detect S1A, its internal state of weights represented as the image 1504 indicates a change from that as illustrated in the image 1502.

As can be seen in the image 1506, element 1524 denotes a particular area of the image that has changed in intensity when the NN1 1302 is trained with the images 1301 illustrating the second intermediate state S1B such as in FIGS. 16A-E. Thus, although the NN1 1302 does not detect S1B, its internal state of weights represented as the image 1506 indicates a change from that as illustrated in the images 1502 and 1504.

As can be seen in the image 1508, element 1526 denotes a particular area of the image that has changed in intensity when the NN1 1302 is trained with the images 1301 illustrating the third intermediate state S1C such as in FIGS. 17A-E. Thus, although the NN1 1302 does not detect S1C, its internal state of weights represented as the image 1508 indicates a change from that as illustrated in the images 1502, 1504 and 1506.

As can be seen in the image 1510, element 1528 denotes a particular area of the image that has changed in intensity when the NN1 1302 has detected the major fault, failure or malfunction as denoted by the state S2. Thus, the internal state of weights of the NN1 1302 represented as the image 1510 indicates a change from that as illustrated in the images 1502, 1504, 1506 and 1508.

It should be noted that although not explicitly described in processing herein, matrices and corresponding images for the weights of the states S1 and S2 may be captured and displayed for reference purposes to a user such as illustrated in the FIG. 18B.

It should be noted that foregoing is one particular example of the particular component and intermediate states that may be detecting using the techniques herein. More generally, the techniques may be used with any component included in the images or bitmaps 1301 of the system. For example, the system may be a data storage system and the bitmaps 1301 may include hardware and software components and different physical and logical storage entities as described above such as in connection with FIGS. 5 and 6. In at least one embodiment, the images of 1301 may be annotated to generally indicate one or more types or factors affecting the health or deterioration of the health of the components or entities. For example, rather than indicate the percentage of unusable cells for a flash PD, the images 1301 denoting the intermediate states may denote other factors such as measured or observed write latency, an average write rate or write data transfer rate (e.g., such as megabytes (MBs) written per second). It is expected, for example, that the write latency will increase and the write rate or write data transfer rate observed will decrease as the number of unusable cells in the flash PD increases. In at least one embodiment, the images 1301 may be populated with indicators denoting the foregoing factors or write latency and write data transfer rate and the NN2 1310 may be trained to detect the states S1A, S1B and S1C based on such multiple complex factors.

For simplicity of illustration, examples of FIGS. 15A-E, 16A-E and 17A-E used as the images 1301 only included dark black shading to denote a particular component's deficiency or level of unusable cells. More generally, as discussed elsewhere herein, any suitable shading, intensity, coloring or other annotation may be made to the images 1301 to denote various levels degradation, health, errors, and the like, for the different components having objects in the images 1301.

It should be noted that once an intermediate state such as one of S1A, S1B or S1C has been detected, an embodiment in accordance with the techniques herein may then take a responsive action. The responsive action taken may vary, of course, with the particular severity and component of the intermediate state detected. The responsive action may, for example, attempt to correct or remediate the current state of the component in efforts to return the component to a healthier state. The responsive action may include a reset or reinitialization of the component, for example, if the component is a hardware component. If the component is a software component, such as the operating system, the responsive action may include a reloading the operating system into memory and/or rebooting the system. If the component is a software component such as a file system with file corruption or other file system errors, the responsive action may include running a utility, such as fsck (file system consistency check) to detect file system errors and inconsistencies and repair any detected inconsistencies. As known in the art, fsck is a tool for checking the consistency of a file system in UNIX® operating systems, such as Linux, macOS, and FreeBSD. A similar command, CHKDSK exists in Microsoft® Windows® operating systems. If the component is a hardware component, such as the PD1 of FIG. 15A, that is progressing toward further failure or unusability, a responsive action may include migrating or copying data from the PD1 to a second healthier physical device. The foregoing action of migrating or copying may be completed prior to the expected or estimated time at which the first physical device is expected to progress to the failure or unusable state.

What will now be described are flowcharts summarizing processing described above.

Figure 19A:
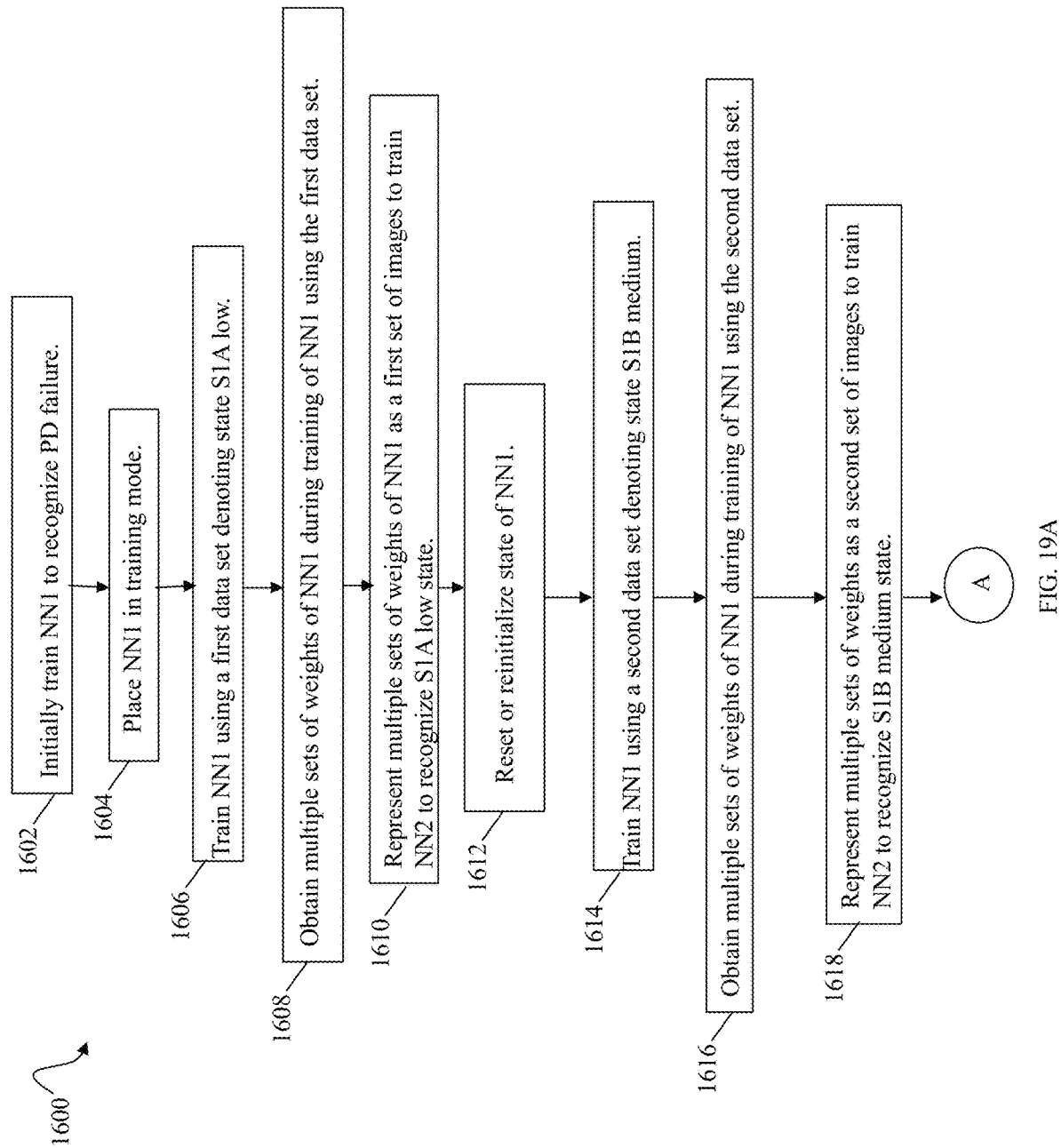
Figure 19B:
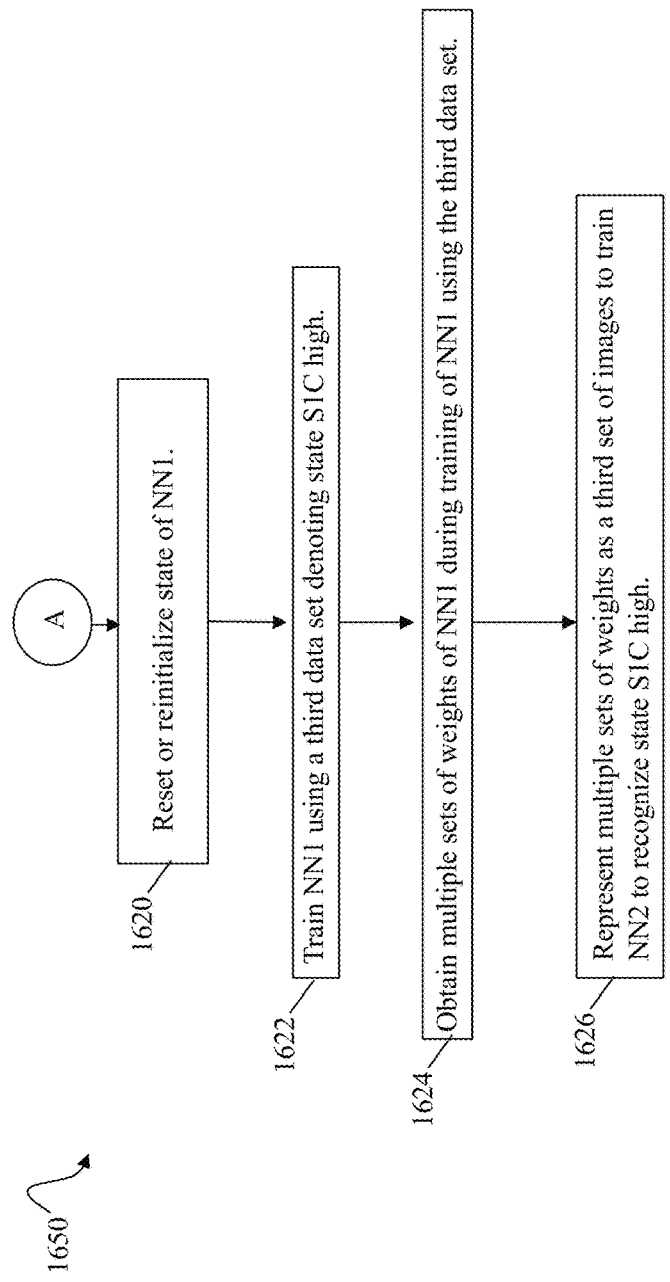

Referring to FIGS. 19A-19B, shown are processing steps that may be performed in an embodiment in accordance with the techniques herein. The flowcharts 1600, 1650 outline processing steps that may be performed in an embodiment using techniques herein to obtain data used to train NN2 1310 to recognize or detect the intermediate states S1A, S1B and SIC. It is straightforward to further adapt processing of FIGS. 19A-19B and as described herein for use with obtaining data used to train NN2 1310 to detecting any suitable number of one or more intermediate states with respect to any fault or failure and any component of the system.

At the step 1602, NN1 1302 may be initially trained to recognize a PD major failure or malfunction state, such as state S2 described herein. The internal state of NN1 may be characterized by a set of weights and bias values determined as result of such training in step 1602. The set of weights and bias values may also be used in subsequent steps to reinitialize or reset NN1 to its state at a first point in time corresponding to the step 1602.

From the step 1602, control proceeds to the step 1604. At the step 1604, NN1 is placed in training mode whereby the weights may be adjusted during subsequent training in attempts to further train NN1 to recognize the intermediate state S1A. From the step 1604, control proceeds to the step 1606. At the step 1606, NN1 is trained using a first data set denoting the state S1A. the first data set may include, for example, images as described in connection with FIGS. 15A-E. From the step 1606, control proceeds to the step 1608. At the step 1608, processing is performed to obtain multiple sets or matrices of weights of NN1 during training in step 1606 using the first data set. In at least one embodiment, at least some of the images of the first data set may be included in a training data set and at least some of the multiple sets or matrices of weights may be acquired while performing the training phase or step (e.g., 1206 of FIG. 12) using the training data set to recognize the state S1A. In at least one embodiment, at least some of the images of the first data set may be included in a validation data set and at least some of the multiple sets or matrices of weights may be acquired while performing the validation phase or step (e.g., 1208 of FIG. 12) using the validation data set with respect to validation performed for recognizing the state S1A. From the step 1608, control proceeds to the step 1610. At the step 1610, processing is performed to represent the multiple sets or matrices of weights of NN1 as a first set of images to train NN1 to recognized the state S1A. From the step 1610, control proceeds to the step 1612.

At the step 1612, NN1 is reset or reinitialized to its state from the step 1602 at the first point in time. Such reinitialization may be performed by resetting the weights and bias values, or generally, the internal state of the NN1, to be as it was at the first point in time at step 1602 after the initial training was completed. From the step 1612, control proceeds to the step 1614. At the step 1614, processing is performed to train NN1 using a second data set denoting the state S1B. From the step 1614, control proceeds to the step 1616. At the step 1616, processing is performed to obtain multiple sets or matrices of weights of NN1 during training in step 1614 using the second data set. In at least one embodiment, at least some of the images of the second data set may be included in a training data set and at least some of the multiple sets or matrices of weights may be acquired while performing the training phase or step (e.g., 1206 of FIG. 12) using the training data set to recognize the state S1B. In at least one embodiment, at least some of the images of the second data set may be included in a validation data set and at least some of the multiple sets or matrices of weights may be acquired while performing the validation phase or step (e.g., 1208 of FIG. 12) using the validation data set with respect to validation performed for recognizing the state S1B. From the step 1616, control proceeds to the step 1618. At the step 1618, processing is performed to represent the multiple sets or matrices of weights of NN1 (from step 1616) as a second set of images to train NN1 to recognized the state S1B. From the step 1618, control proceeds to the step 1620.

At the step 1620, NN1 is reset or reinitialized to its state from the step 1602 at the first point in time. Such reinitialization may be performed by resetting the weights and bias values, or generally, the internal state of the NN1, to be as it was at the first point in time at step 1602 after the initial training was completed. From the step 1620, control proceeds to the step 1622. At the step 1622, processing is performed to train NN1 using a third data set denoting the state S1C. From the step 1622, control proceeds to the step 1624. At the step 1624, processing is performed to obtain multiple sets or matrices of weights of NN1 during training in the step 1622 using the third data set. In at least one embodiment, at least some of the images of the third data set may be included in a training data set and at least some of the multiple sets or matrices of weights may be acquired while performing the training phase or step (e.g., 1206 of FIG. 12) using the training data set to recognize the state S1C. In at least one embodiment, at least some of the images of the third data set may be included in a validation data set and at least some of the multiple sets or matrices of weights may be acquired while performing the validation phase or step (e.g., 1208 of FIG. 12) using the validation data set with respect to validation performed for recognizing the state S1C. From the step 1624, control proceeds to the step 1626. At the step 1626, processing is performed to represent the multiple sets or matrices of weights of NN1 (from step 1624) as a third set of images to train NN1 to recognized the state S1C.

Figure 20:
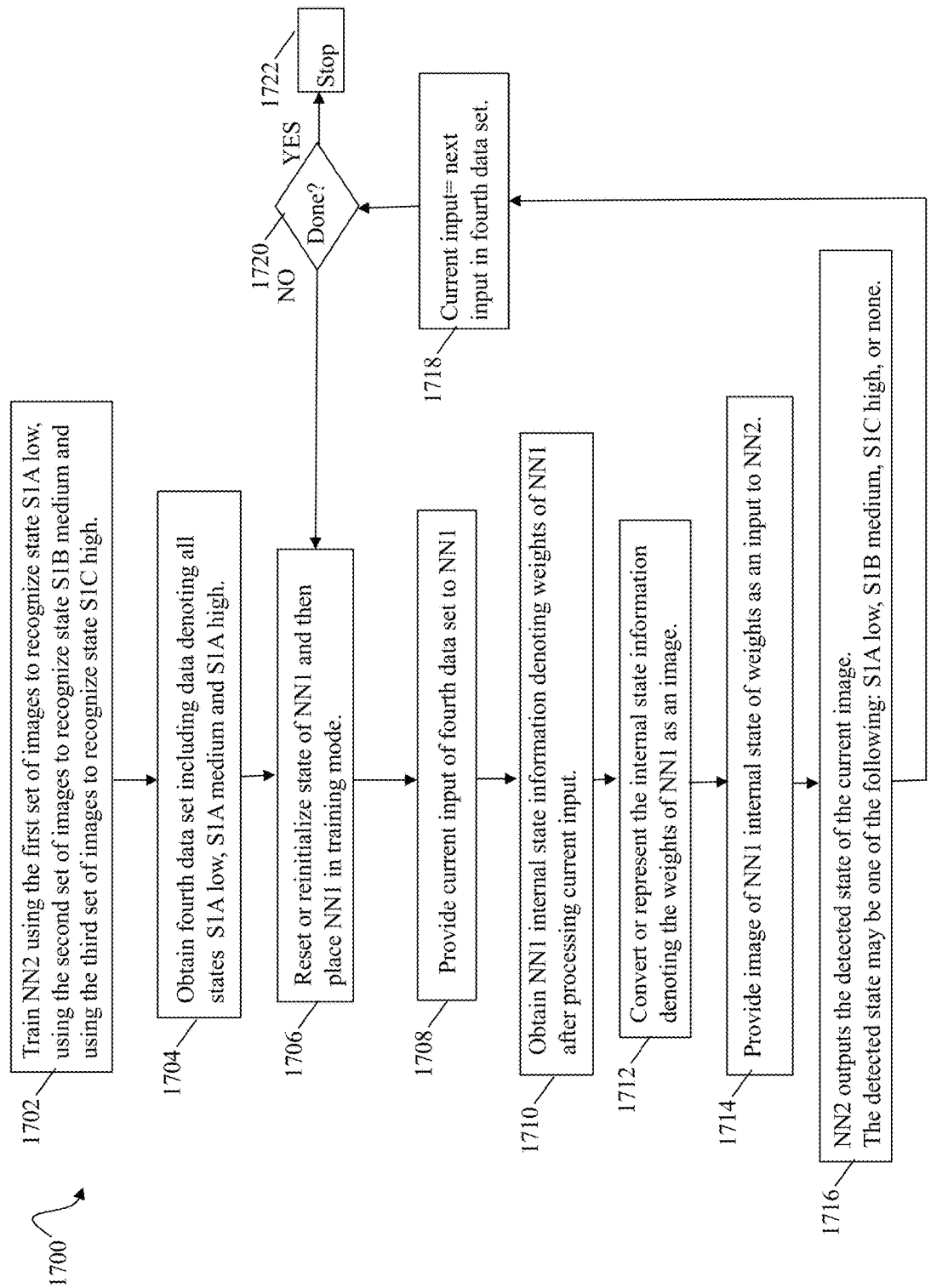

Referring to FIG. 20, shown is another flowchart 1700 of processing steps that may be performed in an embodiment in accordance with the techniques herein. The steps of the flowchart 1700 outline processing performed to train the NN2 1310 to detect the intermediate states S1A, S1B and S1C using the 3 set of images obtained from processing of FIGS. 19A and 19B. Subsequently, processing is performed then use the trained NN2 to now detect and recognize input images of a fourth data set denoting different ones of the intermediate states S1A, S1B and S1C.

At the step 1702, NN2 1310 is trained using the first set of images of the weights (from step 1610) to recognize the state S1A, using the second set of images of the weights (from the step 1618) to recognize the state S1B, and using the third set of images of the weights (from the step 1626) to recognize the state S1C. From the step 1702, control proceeds to the step 1704. At the step 1704, processing is performed to obtain a fourth data set including data denoting all the states S1A, S1B and S1C. From the step 1704, control proceeds to the step 1706. At the step 1706, processing is performed to reset or reinitialize NN1 back to the state at the first point in time as in step 1602 (e.g., reinitialize weights and bias values of NN1 to be as prior to any training to recognize states S1A, S1B and S1C). The step 1706 also includes placing NN1 into training mode whereby its weights and bias values may be adjusted. From the step 1706, control proceeds to the step 1708 to provide a current input image of the fourth data set to NN1 whereby NN1 is trained using the current input image. After NN1's weights are adjusted, in step 1710, processing is performed to obtain NN1's internal state information denoting the weights of NN1 after processing the current input image. From the step 1710, control proceeds to the step 1712. At the step 1712, processing is performed to convert or represent NN1's internal state information of weights (captured in step 1710) as an image. From the step 1712, control proceeds to the step 1714. At the step 1714, the image of NN1's internal state information of the weights is provided as an input into NN2. From the step 1714, control proceeds to the step 1716 where NN2 outputs a detected state of the current image. The detected state may be one of the following: S1A, S1B, S1C or none, wherein none indicates none of the 3 intermediate states has been detected. From the step 1716, control proceeds to the step 1718 where the current input is advanced to the next input image in the fourth data set. From the step 1718, control proceeds to the step 1720. At the step 1720, a determination is made as to whether all input images of the fourth data set have been processed. If the step 1720 evaluates to no, control proceeds to the step 1706 to continue with the next input image of the fourth data set. If the step 1720 evaluates to yes, control proceeds to the step 7022 where processing stops.

In connection with the techniques described above, a NN may be trained using data sets that correspond to a first point in time or first time period for which task boundaries are known. Thus, the NN may have a high degree of confidence regarding its ability to accurately predict an output given one or more inputs within the particular task boundaries. Generally, a task boundary may be known and reflected in the data sets used for training the NN. For example, the NN may be trained to predict I/O performance metrics or data reduction metrics when the data sets used in training correspond to I/Os issued by a first set of applications during a first time period. However, over time, the I/Os patterns or profiles of I/O workloads for I/Os issued by the first set of applications may change, the type of data used by the applications may change, and/or the set of applications issuing the I/Os may change. For example, during the first time period, the first set of applications executing on a host may use video data or audio data and the first set of applications may issue I/Os to logical devices including such video data or audio data. At a second later point in time, the host may be reconfigured to replace the first set of applications with a new second set of applications that include database applications and transactional applications. The I/O patterns and profiles of the second set of applications may be very different from the first set of applications. Additionally, the characteristics of the data accessed by the second set of applications may also be very different from the characteristics of the data accessed by the first set of applications. For example, the video data accessed by the first set of applications may have a large amount of redundant data thereby having a high compression ratio and/or data deduplication ratio. In contrast, the data accessed by the second set of applications may have a much lower amount of redundant data. As a result, the NN initially trained using the data sets corresponding to the first time period for the first set of applications may experience a high rate of faulty, incorrect output predictions when the NN predicts outputs for various corresponding new inputs obtained during execution of the second set of applications. In one aspect, newly acquired data sets corresponding to those obtained in connection with executing the second set of applications may have different task boundaries that were previously unknown during training and testing of the NN. A task boundary that is unknown or undefined during training of the NN is an example of a condition that is characteristic of many real world applications using NNs.

As a result, a system may employ a process of continual learning or continuous learning (CL) in connection with the NN, or more generally, a machine learning system used. CL may be generally characterized as the ability of a model to learn continually from a stream of data. In practice, this means supporting the ability of a model to autonomously learn and adapt over time as new data sets (e.g., including inputs and observed outputs) are available. With CL, the machine learning system such as the NN may be continuously retrained using newly available data based on new activity. In connection with the example above in a system using CL, the NN may be retrained in a continuous and ongoing manner using newly acquired data sets, such as using the second data sets obtained in connection with I/Os issued by the second set of applications. In connection with CL, the NN's continuous retraining may result in the NN learning the differences between the newly acquired data sets (not used previously to train the NN) and the prior data sets (used previously to train the NN). CL for scenarios with task boundaries that are unknown or undefined during training and testing of the NN may also be referred to as task agnostic CL.

Figure 21:
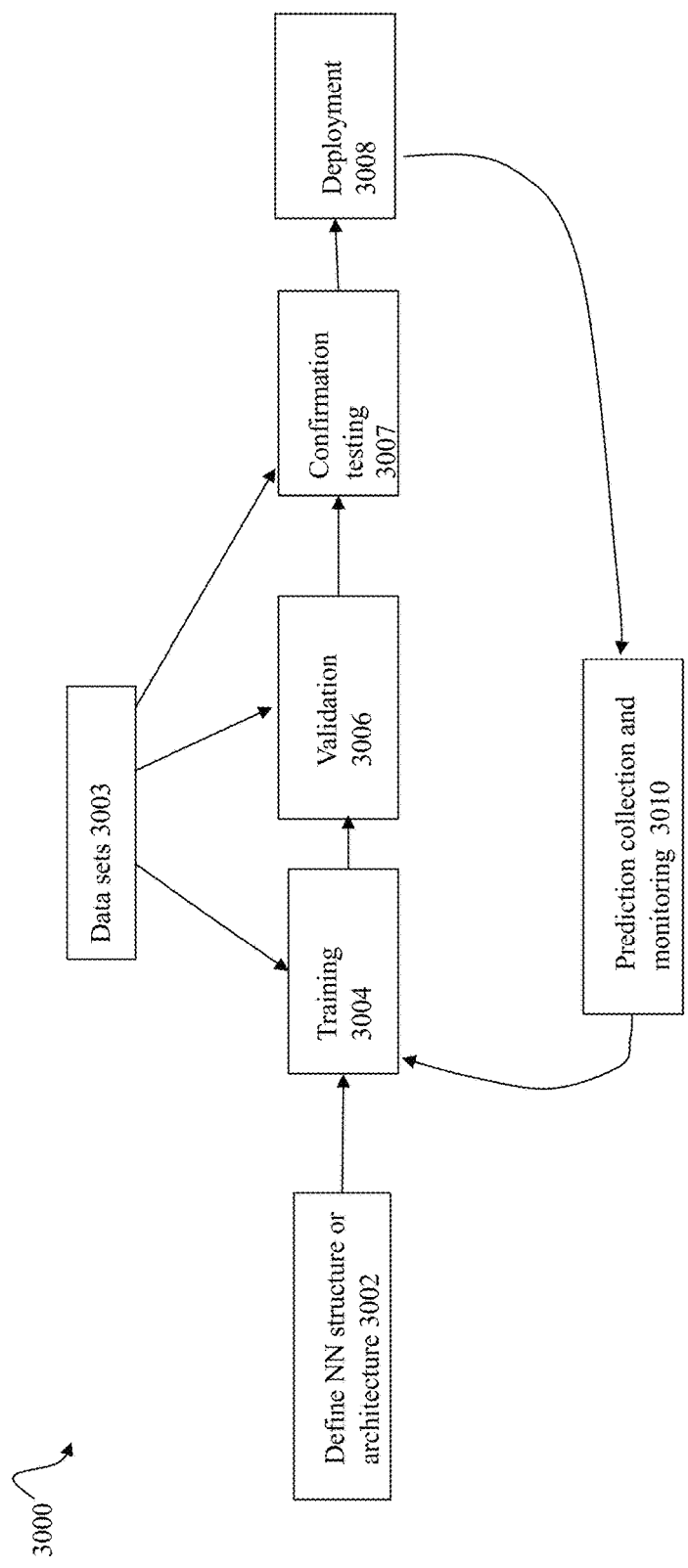
FIGS. 21, 24, 26 and 27 are examples of processing steps that may be performed in an embodiment in accordance with the techniques herein.

Referring to FIG. 21, shown is an example 3000 outlining processing that may be performed in connection with a system implementing CL of a NN in an embodiment in accordance with the techniques herein. At the step 3002, the NN structure or architecture may be defined as described elsewhere herein. From the step 3002, processing proceeds to the step 3004 where processing is performed to train the NN defined in the step 3002. From the step 3004, processing proceeds to the step 3006 where the NN is validated. From the step 3006, processing proceeds to the step 3007 where the NN may be further confirmed using a test data set. Element 3003 may denote the data sets used in the training, validation and confirmation testing of the NN. Various techniques that may be used in training and validating the NN are generally described elsewhere herein (e.g., FIG. 12 processing) and also known in the art. Following the step 3007 once the NN has been trained, validated and tested, or more generally qualified as ready for production use, the NN may be deployed in the step 3008. The deployment 3008 may include using the qualified NN to make predictions for one or more outputs in a production setting, such as at a customer site.

Once deployed in the step 3008, the results and behavior of the NN may be monitored in the step 3010. In the step 3010, the predicted results or outputs of the NN may be collected and compared to actual observed outputs. An ongoing error rate, successful prediction rate or confidence level with respect to differences between the actual observed outputs and the predicted outputs of the NN may be determined. At various points in time, the NN may be retrained by processing proceeding to the step 3004. For example, processing may proceed from the step 3010 to the step 3004 responsive to a defined period of time elapsing in order to retrain the NN using the most recent data sets. If the confidence level or successful prediction rate drops to a very low level (e.g., below a confidence level threshold) indicating that there is an unacceptably high error rate, processing may proceed from the step 3010 to the step 3004 to retrain the NN. It may be that the NN needs to be retrained in the step 3004 using the new recently acquired data sets not previously used in connection prior iterations of training the NN. For example, the NN may be initially trained using the first data sets corresponding to the first set of applications described above. At a later point in time, the NN may be deployed and provide erroneous predicted outputs for input data corresponding to the second set of new applications. The erroneous predicted outputs may result in the confidence level falling below a desired percentage and trigger processing to proceed from the step 3011 to the step 3004 where the NN may be retrained using newly acquired data sets corresponding to the second set of new applications. Generally, any suitable metric or metrics may be used to express the confidence level of the predictions based on the error rate of the predicted outputs of the NN. For example in at least one embodiment the confidence level may be based on a cumulative or collective error rate based on the percentage of correctly predicted outputs.

FIG. 21 generally outlines a continuous iterative process by which the NN may be retrained in an ongoing manner. When performing training such as in the step 3004, the weights and possibly bias values associated with nodes of the NN may be adjusted to facilitate the relearning of the NN to correctly predict outputs based on the newly acquired data sets corresponding to changing conditions in the system.

As mentioned elsewhere herein and known in the art, a cost or loss function may be used with the NN in determining iterative values for adjusted weights of the NN.

Figure 22:
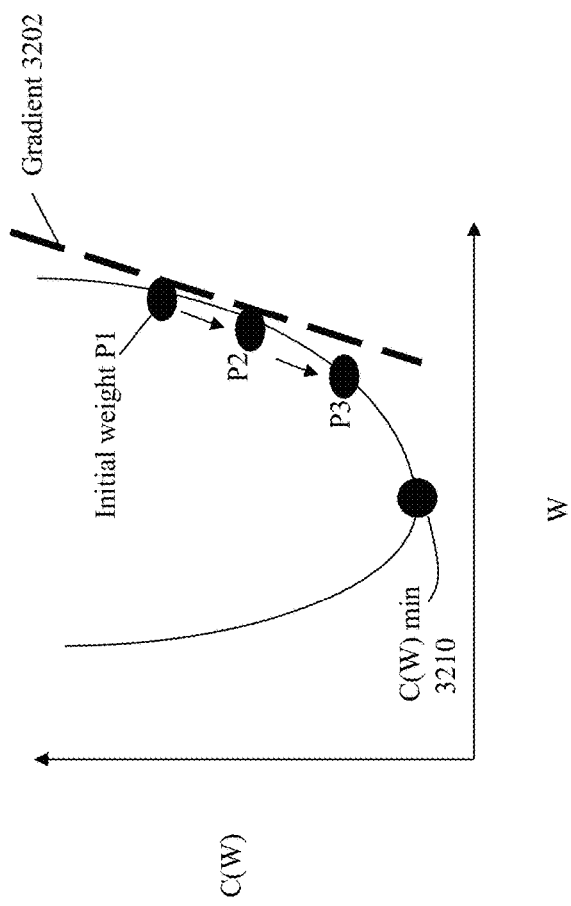
FIGS. 22 and 23 are graphical illustrations of cost or loss functions that may be used in embodiments in accordance with the techniques herein.

Referring to FIG. 22, shown is an example illustrating use of a cost or loss function C in connection with an embodiment in accordance with the techniques herein to determine adjusted weights. The example 3200 graphically illustrates different values for a weight W on the X axis and corresponding cost or loss function values, C(W), on the Y axis. The curve may generally denote the cost function C(W) for the various corresponding values for the weight W. C(W) min 3210 may denote the global minimum for the cost function in this example. In this example, C(W)3210 denotes the lowest point on the cost function and is the optimal or global minima where the rate of change of the function is zero. The objective may be to determine the value for the weight W which results in obtaining C(W)min, or at least sufficiently close to CW(min) (e.g., within a specified tolerance). P1, P2 and P3 may denote points 3 values of the cost function corresponding to 3 sequentially selected values—W1, W2, W3—for the weight W during 3 processing iterations of training when the NN is in training or learning mode and the weights may be adjusted based on corresponding values of the cost function using an automated training algorithm. Thus, C(W1)=P1, C(W2)=P2 and C(W3)=P3. The weights may be adjusted or updated after each next data set is processed during training.

Using the first weight W1 as the initial weight, processing may determine a corresponding value of the cost function P1. Subsequently, the first weight W1 may be adjusted to the second weight W2 having a corresponding value of the cost function P2. In at least one embodiment using a gradient descent technique in connection with learning and training the NN, the dashed line 3202 may denote the gradient or derivative of the cost function C. The gradient 3202 denotes the slope or rate of change of the cost function C for generally the right hand portion of the cost function for points to the right of 3210. The gradient 3202 may be used to perform an assessment in connection with achieving C(W) min 3210. The negative slope or gradient with respect to the change from P1 and P2 indicates that processing by decreasing the value from W1 to W2 was good in that it resulted in a movement closer to determining an optimal value for W to achieve C(W)min 3210, but without overshooting C(W)min 3210. If the slope or gradient is positive, it means that the revised value of the weight Wr resulted in a corresponding cost function C(Wr) point that overshot the goal of C(W) min 3210. In this latter case where C(Wr) overshot C(W) min 3210, C(Wr) would be located on the upslope portion of the curve which, in the FIG. 22 is the portion of the curve to the left of C(W) min 3210. In such a case, the value for W may be decreased in a subsequent processing iteration.

In the example 3200, the slope or gradient corresponding to the change in P1 to P2 is negative so processing may further decrease the value for the weight to W3 having a corresponding value of the cost function P3. The negative slope or gradient with respect to the change denoted from P2 and P3 indicates that processing by decreasing the value from W2 to W3 was good in that it resulted in a movement closer to determining an optimal value for W to achieve C(W)min 3210. So again, the next value for the weight W may be selected.

In this manner, the processing performed to determine values for the weights may be characterized as an optimization problem that seeks to select optimal values for the weights with the goal of achieving a minimum value, such as the minima 3210, for the cost function.

FIG. 22 illustrates a simple example of a cost or loss function. The cost or loss function used may be more complex and may actually have multiple maxima and minima such as illustrated in the FIG. 23. The example 3220 illustrates a graph with a curve of another cost function. The graph of 3220 illustrates the different values of the cost function C(W) on the Y axis for various corresponding values of the weight W on the X axis. In this example, the cost function is more complex than as illustrated in the FIG. 21. The points A1, A2, A3 and A4 denote local maxima of the cost function. The points B1, B2, B3 and B4 denote local minima of the cost function. B4 may or may not be the global minima of the cost function since other values for W not included in the graph may correspond to lower minimum values of the cost function than those denoted by B1-B4. Additionally, processing performed to iteratively select and adjust the weights during training may not ever locate the global minima or smallest of all local minima possible for the cost function C.

Figure 23:
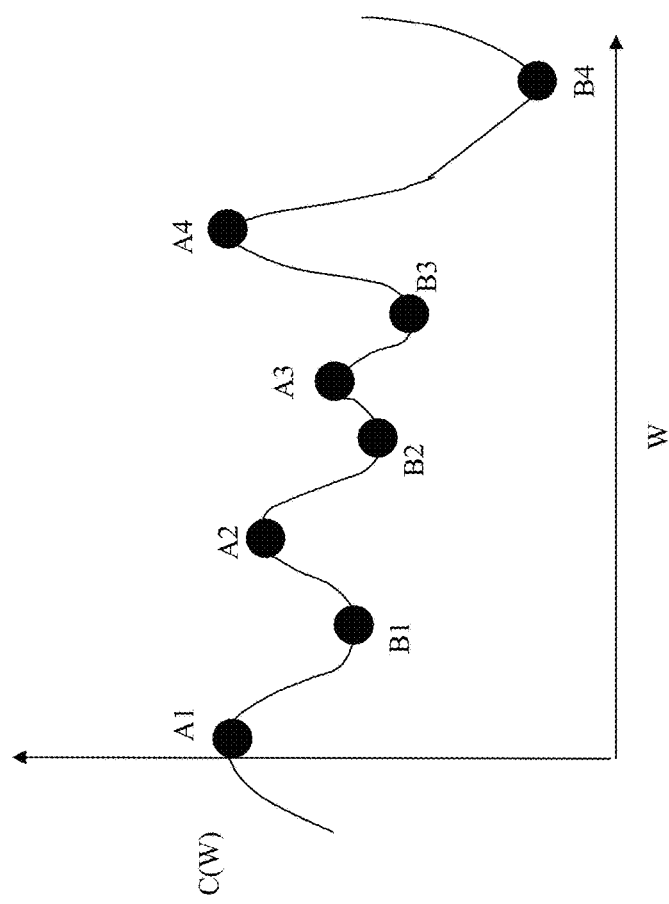

With reference to CL, consider the particular example of FIG. 23 discussed above when retraining the NN in connection the newly acquired data sets corresponding to the second set of new applications. For purposes of illustration, assume B4 denotes the global minima of the cost function used. The NN may be initially trained using first data sets corresponding to the first set of applications described above. During this initial training, weights may have tuned values determined using the first data sets and the training processing may have selected such weight values by converging to the global maxima B4. Subsequently, the initially trained NN may deployed and used in connection with predicting outputs for the second set of new applications. The predicted outputs at this point may be highly erroneous and result in retraining of the NN (e.g., processing transitions from the step 3010 to the step 3004) using newly acquired data sets corresponding to the second set of new applications. During the retraining, the training algorithm may be stuck or trapped at a local minima such as point B1 of the FIG. 23 where the NN currently has a high error rate of predictions. The confidence level achieved with the retrained NN may be below an acceptable threshold level. In such a case, the retraining algorithm's processing may not be able to progress to selecting other values for the weights in connection with achieving the global minima B4 for which the predicted outputs are accurate, the error prediction rate is low and the confidence level exceeds the specified minimum threshold. As a variation, even if the training and retraining algorithm is capable of selecting weights that achieve the global maxima B4, there is no guarantee that the NN can be retrained in a reasonable amount of time to achieve this because the convergence process may be exceedingly long.

In at least one embodiment in accordance with the techniques herein, a forgetting factor may be defined as an action perform to facilitate the NN "forgetting" old weight values as may be determined automatically as part of the training algorithm. In this manner, the NN may then be retrained in order to learn new weight values suitable for use in optimization in connection with the new or recently acquired data sets that may, prior to such retraining, have caused the NN to have an unacceptably low error prediction rate. For example, as discussed in more detail elsewhere herein, a forgetting factor may include any suitable action associated with generally reconfiguring the NN prior to retraining where the reconfigured NN is then retrained. The reconfiguration of the NN may include implementing one or more forgetting factors such as, for example, resetting particular weights to 0, adding or removing nodes from one or more hidden layers of the NN, and the like.

Described in the following paragraphs are techniques that may be used in connection processing performed when retraining the NN. The NN may have been initially trained, validated, tested and deployed for use. Subsequently, retraining of the NN may be performed. In at least one embodiment, the retraining of the NN may be performed responsive to determining the NN obtains a higher than desirable error rate in its predicted values resulting in a confidence level of the predictions falling below a minimum confidence level. As such, retraining of the NN may be performed.

In connection with retraining the NN, one or more trigger conditions may be defined. Upon the occurrence of any one or more of the trigger conditions being detected during retraining, the NN may be reconfigured and then further retrained using the revised reconfigured NN. In at least one embodiment, the trigger conditions may include a first trigger condition of determining that the measured confidence level or percentage of correct predictions is less than a minimum threshold for at least a minimum amount of time. The minimum amount of time may denote a continuous amount of time during which the measured confidence level or percentage of correct predictions is less than the minimum threshold level. The foregoing first trigger condition provides for avoiding excessive use of time in connection with retraining as may result when the retraining is stuck at a local minima of the cost function or as may result when convergence during the retraining is taking too long.

In at least one embodiment, the trigger conditions may include determining whether one or more of the weights of the NN have changed by more than a threshold amount. If so, it may be determined that the new data sets used to retrain the NN are quite different from the prior data sets used to train the NN. In this case, the NN may be reconfigured rather than have the retraining continue using the current NN having weights that may be automatically and iteratively modified based on the training algorithm. In at least one embodiment, the weights of the NN may be monitored during training. The NN currently being retrained may be a first NN. The weights of the first NN may be monitored using a second NN. The second NN may be trained to identify each of the weights of the first NN having a change or delta in weight value that exceeds a specified weight threshold. In at least one embodiment, the weights may include the weights applied to outputs of nodes of one or more hidden layers of the first NN. In at least one embodiment, the second NN may output a list of weights of the first NN having a corresponding change in weight exceeding the specified threshold level. The second NN may detect or monitor the change in weight for each weight of the first NN with respect to two consecutive sets of weights provided as inputs to the second NN. In at least one embodiment, the weights of NN1 may be represented as an image that is input to the second NN. In at least one embodiment, the second NN may also output the current weights of the first NN.

Responsive to detecting that one or more of the threshold conditions have occurred, one or more actions may be taken to reconfigure the first NN undergoing retraining. In at least one embodiment, the one or more actions may include any one or more of: adding a node to the first NN, removing a node from the first NN, adjusting one or more weights of nodes of the first NN, removing a hidden layer from the first NN, and adding a new hidden layer to the first NN.

In at least one embodiment, if the change in weight of a first weight of the first NN exceeds the specified weight threshold as may be detected using the second NN, a new node may be added to the first NN. In at least one embodiment, the first weight may be on a first connection from a first node to a second node so that the first weight is applied to the output of the first node. The first node may be included in a hidden layer of the first NN and the new node may be added to the same hidden layer including the first node. The new node may have connections to at least some of the same nodes as the first node. The new node may have connections to at least some of the same nodes providing or propagating inputs to the first node. The new node may have connections to at least some of the same nodes to which the first node provides or propagates its output to.

In at least one embodiment, if the change in weight of a first weight of the first NN exceeds the specified weight threshold as may be detected using the second NN, the first weight may be reset or reinitialized to a new value. The new value may be a largest or maximum possible weight value. The first node's weight may then be subsequently modified in subsequent retraining performed for the first NN. In subsequent retraining, the first weight may be further modified as a result of the training algorithm. However, resetting its value to the new value may accelerate the retraining process to determine newly adjusted values for weights of the first NN that achieve an acceptable successful prediction rate or confidence level.

In at least one embodiment, if a current value of a weight of the first NN is a non-zero value that is less than a specified minimum value, the weight may be reset to 0. In subsequent retraining, the weight may be further modified as a result of the training algorithm. However, resetting its value to zero may accelerate the retraining process to determine newly adjusted values for weights of the first NN that achieve an acceptable successful prediction rate or confidence level.

In at least one embodiment, if a current value of a weight of the first NN is a non-zero value that is larger than a specified value, the weight may be reset to a maximum allowable weight value. In subsequent retraining, the weight may be further modified as a result of the training algorithm. However, resetting its value to the maximum allowable value may accelerate the retraining process to determine newly adjusted values for weights of the first NN that achieve an acceptable successful prediction rate or confidence level.

If a set of one or more weights of the first NN have been set to zero during retraining using the training algorithm such that a particular one of the nodes of the first NN outputs a value of 0 (thereby denoting that the output of the particular node is not used in connection with determining the outputs of the first NN1), then the one or more actions may include removing the particular node from the first NN. In at least one embodiment, removal of the particular node may be accomplished by redefining the structure or architecture of the first NN. Alternatively, in at least one embodiment, removal of the particular node may be effectively accomplished by having the set of one or more weights remain fixed and unmodified at zero through subsequent retraining of the first NN.

In at least one embodiment, the first NN and the second NN may be CNNs.

In at least one embodiment in connection with retraining the first NN after reconfiguration, the reconfigured first NN may be trained generally using new or recently acquired data sets representative of current I/O patterns and characteristics. The data sets used in retraining the reconfigured first NN may also include the particular data set(s) known to cause the first NN (prior to reconfiguration) to fail or achieve an unacceptably high error prediction rate. In this manner, the reconfigured first NN may be retrained using training data sets that include the particular data sets that triggered the retraining and reconfiguration of the first NN.

The foregoing and other aspects of the techniques herein are described in more detail in following paragraphs.

Figure 24:
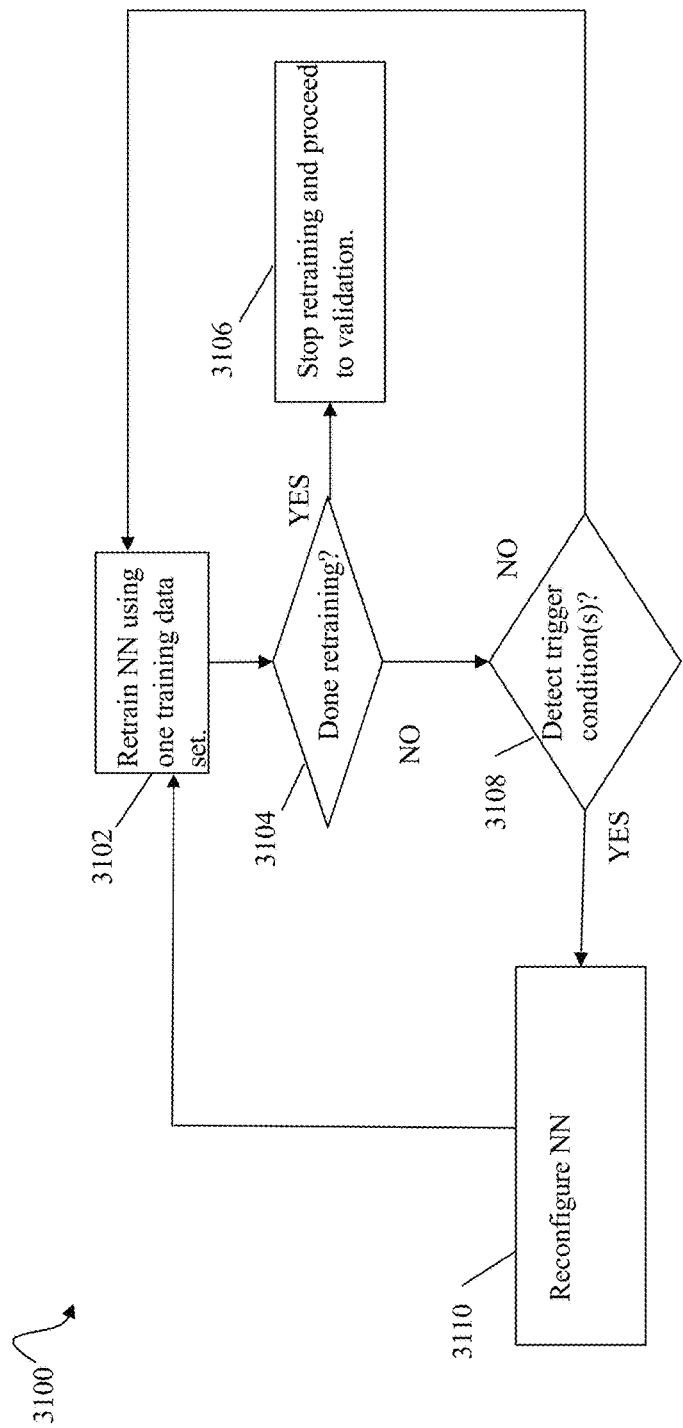

Referring to FIG. 24, shown is a flowchart 3100 of processing steps that may be performed in an embodiment in accordance with the techniques herein. The steps of FIG. 24 may be performed in connection with the training step 3004 of the FIG. 21 when retraining the first NN. At the step 3102, the first NN may be retrained using one training data set of inputs and corresponding expected outputs. Generally, consistent with other discussion herein, retraining may include performing the same processing as in prior training but using different data sets than those used in the prior training of the first NN. In this example, the data sets used in the retraining may include newly acquired or more recently acquired data sets. As described herein, the processing of FIG. 24 may be performed responsive to processing performed in the step 3010 of FIG. 21 that determines the first NN has a confidence level or successful prediction rate below a specified threshold. For example, the first NN may have a successful prediction rate or confidence level that falls to 20% that is well below a specified minimum confidence level or successful predication rate of 90%. As another example, the processing of FIG. 24 may be performed responsive to determining that a specified amount of time has elapsed since the prior retraining iteration.

In at least one embodiment, the retraining of the first NN in the step 3102 may proceed with updating or adjusting the weights of the nodes of the first NN for a single iteration using a single training data set. From the step 3102, control proceeds to the step 3104 to determine whether retraining of the first NN is complete. As known in the art and as also described herein, training/retraining may be complete when the first NN has achieved a measured confidence level or successful prediction rate that exceeds a specified threshold.

If the step 3104 evaluates to yes, control proceeds to the step 3106 where the retraining stops and processing proceeds to validation, such as described in the step 3006 of the FIG. 21 or the step 1208 of FIG. 12. As generally illustrated in connection with FIG. 21, new data sets similar to those used in the retraining 3102 may also be used in connection with performing validation processing 3006 and confirmation testing 3007. In other words, previously the first NN was trained with a training data set in 3004, validated using a validation data set in 3006 and confirmed using a testing data set in 3007 where such data sets may also be based on old data sets such as obtained in connection with I/Os issued from the first set of applications as discussed above. Now the training data set denoting the newly acquired data set is based on newer data sets obtained in connection with I/Os issued from a second set of new applications as also discussed above. In a similar manner, the data sets used in connection with performing steps 3006 and 3007 with the retrained first NN may also be based on newly acquired data sets obtained in connection with I/Os issued from the second set of new applications.

If the step 3104 evaluates to no, control proceeds to the step 3108. At the step 3108, a determination is made as to whether one or more of the trigger conditions are detected as having occurred. The one or more trigger conditions and examples of how such conditions may be detected are described in more detail elsewhere herein. For example, as described elsewhere herein, a second NN may be used in connection with detecting one of the trigger conditions. The second NN may identify each weight of the first NN having a change in value that exceeds a threshold. A trigger condition may specify that step 3108 evaluates to yes responsive to determining that one or more nodes of the first NN have an associated change in weight value exceeding the threshold. As another example, a trigger condition may be specified that the step 3108 evaluates to yes responsive to determining that the confidence level or successful prediction rate has remained below a specified threshold, such as 90%, for at least a specified amount of time. This latter condition may be included to handle the possibility that the current training algorithm is trapped or stuck at a local minima where additional training iterations of the step 1302 have failed to adequately increase the confidence level or successful prediction rate.

Responsive to the step 3108 evaluating to no, control proceeds to the step 3102 with the next automatic adjustment or update of the weights of the nodes of the first NN for a next iteration of the retraining. If the step 3108 evaluates to yes, control proceeds to the step 3110. At the step 3110, one or more actions may be taken to reconfigure the first NN. Examples of the one or more actions may include performing one or more of: removing a node from the first NN, adding a new node to the first NN, removing a hidden layer from the first NN, and adding a new hidden layer to the first NN. The one or more actions of the step 3110 may also include reinitializing one or more weights of nodes of the first NN. The one or more actions that may be performed in connection with reconfiguring the first NN in the step 3110 are described in more detail elsewhere herein. From the step 3110, processing returns to the step 3102 where retraining continues but using the reconfigured first NN.

In one aspect, the one or more trigger conditions at the step 3108 may be characterized as determining when the first NN is reconfigured to "forget" what was previously learned in connection with old data sets used to previously train the first NN.

In connection with an example described in following paragraphs, assume that the first NN, NNA, is in learning or training mode having its weights adjusted based on training performed using new data sets not previously used in connection with training NNA. However, at this point, also assume that the step 3104 has evaluated to no. For example, assume that NNA has a current confidence level or successful prediction rate of 20%. As a result, processing proceeds to the step 3108 where a determination is made as to whether one or more trigger conditions have occurred.

In at least one embodiment, the one or more trigger conditions may include a first condition that specifies that if the current confidence level or successful prediction rate for a continuous amount of time is below a specified threshold, the step 3108 evaluates to yes. In such an embodiment, the retraining process may be given a chance to improve and attempt to achieve the acceptable specified threshold level of confidence or successful prediction rate by allowing the retraining algorithm to automatically adjust the weights of NNA. However, at some point, the typical learning or training process performed by the algorithm may fail to result in achieving an adequate level of successful prediction or confidence within a reasonable amount of time as denoted by the continuous amount of time specified. If the first condition occurs, it may indicate that the retraining is stuck at a local minima based on the new data sets currently in use for retraining.

In at least one embodiment, the one or more trigger conditions may include a second condition that specifies that if one or more of the weight of NNA experience a change in value, where the change exceeds a specified threshold, the step 3108 evaluates to yes. The second condition occurring may indicate that the new data set used in retraining NNA is not similar to the old data set used to previously train the NN. The large change in value for a weight of NNA may indicate that the processing performed by the retraining may be using a new local minima based on the new data set rather than the prior minima used in connection with training using the old prior data set. As such, the training process may get stuck at the local minima, may take an unacceptably long time to achieve convergence to an acceptable minima, may fail to locate a global minima, and the like. Therefore, the reconfiguration of NNA may be performed to expedite processing to retrain NNA using the newly acquired data sets.

In at least one embodiment, if any one of the foregoing or other trigger conditions occurs, processing may be performed in the step 3110 to reconfigure NNA to facilitate NNA forgetting the old training data set previously used to train NNA. Such processing to reconfigure NNA in the step 3110 may also facilitate and possible accelerate retraining NNA to accurately predict outputs based on the new data set current used in retraining, where the new data set may not have been previously used in training NNA.

What will now be described in more detail is processing that may be performed in at least one embodiment in connection with determining whether any weight of NN A has an associated change in value exceeding a specified threshold. In at least one embodiment, a second NN, NNB, may be trained to identify each weight of NNA having a change in value that exceeds the specified threshold.

Figure 25:
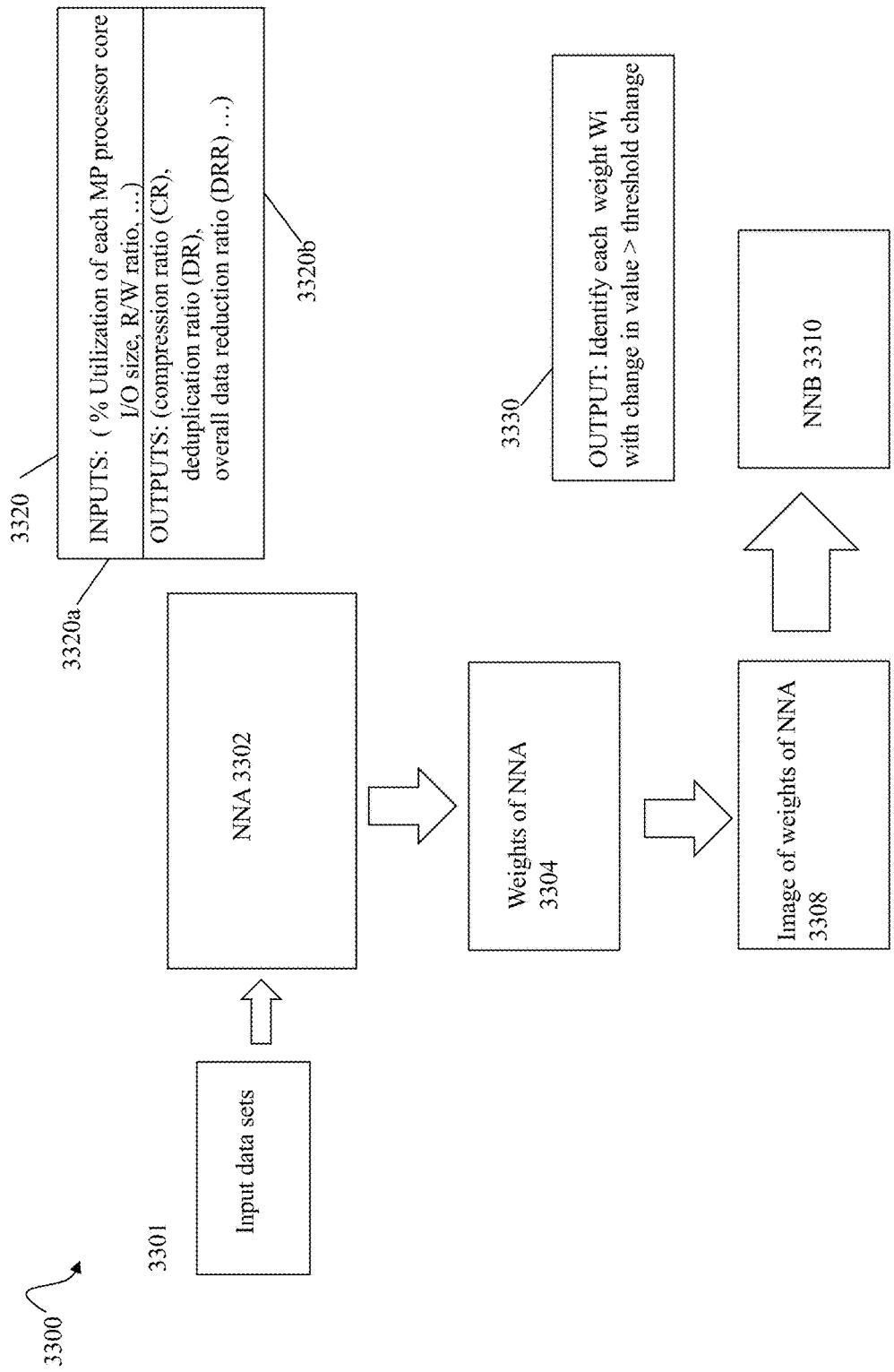
FIG. 25 is an example illustrating use of two neural networks in an embodiment in accordance with the techniques herein.

With reference to FIG. 25, shown is an example illustrating use of NNB in an embodiment in accordance with the techniques herein. The example 3300 illustrates use of NNB in connection with identifying weights of NNA, where each weight identified has a change value that exceeds a specified threshold. In this example, NNA and NNB are CNNs such as described elsewhere herein and known in the art. In at least one embodiment, NNA and NNB may as described, for example, in connection with FIGS. 10 and 11.

In this example, assume that training data sets used for retraining NNA include inputs and outputs as denoted by 3320. Element 3320a indicates that the inputs include the % (percent) utilization of each multiprocessor (MP) core of the data storage system, an I/O size, a R/W (read/write) ratio, and possibly other inputs. In at least one embodiment, the data storage system may include a number of cores where each core may include multiple CPUs. For example, if the system includes 20 cores, then the input vector of 3320a includes 20% utilization values, one for each of the 20 MP cores. The I/O size may denote the size of the data payload of each read and write operation expressed in terms of a number of storage units, such as bytes. The R/W ratio may denote a ratio regarding the number of read operations with respect to the number of write operations on the data storage system. Put another way, the R/W ratio denotes a mixture of the read and write operations as observed in the data storage system based on I/Os processed, such as from the applications on the hosts.

Element 3320b indicates that the outputs may include a compression ratio (CR), a deduplication ratio (DR), an overall data reduction ratio (DRR) and possibly other outputs. Compression and data deduplication are well known techniques used to achieve data reduction. Data deduplication eliminates redundant copies of data and reduces storage overhead. Data deduplication techniques ensure that only one unique instance of data is retained on storage media. Redundant data blocks are replaced with a pointer or reference to the unique data copy. CR may denote a ratio of the size of the original uncompressed data with respect to the size of the compressed form of the data. DR may denote a ratio of the original data without deduplication processing with respect to the size of the data after deduplication processing. DRR may denote a combination or overall ratio in data reduction based on both DR and CR. DRR may denote a ratio of the size of the original data prior to performing data reduction with respect to the size of the reduced form of the data after performing data reduction (e.g., based on CR and DR combined).

At this point in processing in connection with this example, assume that NNA 3302 has been previously trained using data sets having inputs and outputs as denoted by 3320 where the prior training data sets are based on a first set of applications as described above. The first set of applications may issue I/Os to sets of video data stored on logical devices of the data storage system. The sets of video data may have a high compression ratio. Now assume that new data sets are obtained in connection with I/Os issued by a second set of applications that replace the first set of applications on a host as discussed above. The second set of applications may include, for example, database applications issuing the I/Os during the time period when the new data sets are obtained. The new data sets also have inputs and outputs as denoted by 3320. However, the new data sets previously caused NNA 3302 to achieve a very low successful prediction rate or confidence level, such as 20%, when predicting corresponding outputs as denoted by 3320b, whereby retraining was triggered (e.g., causing a transfer from step 3010 to the step 3004 in FIG. 21). As a result, processing is now being performed to retrain NNA 3302 using the new data sets. In this example, element 3301 may denote the new data sets used to retrain NNA 3302.

In at least one embodiment, NNB 3310 may be used in connection with identifying weights of NNA having changes in value that exceed a threshold amount. In at least one embodiment, the changes in weights may be determined with respect to weights output from nodes of the hidden layers of NNA 3302.

In at least one embodiment, after each iteration of the step 3102 retraining NNA 3302 where the weights of the nodes of NNA 3302 are adjusted, the values of the weights may be captured and output, as denoted by element 3304. The weights 3304 may be converted to an image 3308 and the image 3308 may be provided as input to NNB 3310. The foregoing may be performed as described in more detail elsewhere herein, for example, such as in connection with reference to the FIG. 13. Instances of the weights 3304 may be converted to images, such as pixel images. In at least one embodiment, the images may be bitmap images. For example, each set of the weights 3304 may be converted to an image 3308 such as illustrated and described in connection with the FIG. 18A. The foregoing of capturing and outputting a set of the current weights 3304 for the nodes of NNA may be repeated to obtain multiple instances of 3308 for multiple sequential successive iterations of retraining NNA 3302 where each such iteration performs processing to adjust or update the weights of the nodes of NNA 3302.

The multiple images 3308 may be used to train NNB 3310 to determine the change or delta for each weight between successive iterations. For example, NNB 3310 may be trained to determine the difference or change in value for each of the weights of NNA 3302 for successive iterations of processing performed (e.g., in the step 3102) to adjust the weights of nodes of NNA 3302. In at least one embodiment, NNB 3310 may take as inputs a first image of weights of NNA and a second image of weights NNA. The first image may denote a first of weights of the nodes of NNA at a first point in time and the second image may denote a second set weights of the nodes of NNA at a second point in time subsequent to the first point in time. The first set of weights may be captured after adjusting (e.g., in the step 3102 of FIG. 24) the weights of the nodes of NNA for iteration K (K being an integer >0). The second set of weights may be captured after adjusting (e.g., in the step 3102 of FIG. 24) the weights of the nodes of NNA for iteration K+1. For each node, NNB 3310 may determine the difference or change in value for each of the weights with respect to the first and second images. For example, a first value of weight Wi in the first image may be subtracted from a second value of the weight Wi in the second image to determine the difference or change with respect to weight Wi. NNB 3310 may also determine whether the difference or change in value for each weight exceeds a threshold. If the change in value of a weight exceeds a threshold, NNB 3310 may generate an output identifying the particular weight of NNA 3302 having the weight change that exceeds the threshold. In at least one embodiment, NNB 3310 may also output the amount of the detected change in weight.

In at least one embodiment, NNB 3310 may also output other weight information regarding weights of NNA 3302. The information may identify which weights of NNA 3302 have a current value of 0. The current weights of NNA 3302 may denote the result of performing the most recent iteration to adjust the weights for NNA as part of retraining. The current weights may be included, for example, in the most recent one of the images 3308 processed by NNB 3310. As a variation, NNB 3310 may output current values for all the weights of NNA in the latest or most recent iteration of weight adjustments made to NNA as part of retraining. Other processing may then be performed to extract any desired information regarding the current weights of NNA. Such other processing may, for example, determine which weights have a current value of 0, or more generally below a specified minimum threshold.

Continuing with the example, assume that one or more weights of NNA 3302 are each determined to have a corresponding change in value that exceeds a threshold. Responsive to the change in value of a weight of NNA exceeding the threshold, NNA may be reconfigured as in the step 3110.

In at least one embodiment, reconfiguration of NNA may include removing nodes of hidden layers of NNA that output no value due to the particular weights=0 assigned to connections to the node. For example, retraining performed in the step 3102 of NN A may have assigned values of 0 to weights of all connections out of a particular node. For example with reference to the FIG. 10 and the node H2, assigned zero values to weights W5 and W6 effectively removes H2 from the NN by not allowing the output of H2 to further propagate forward in the NN. In this case, the reconfigured NNA may also remove the particular node already effectively removed due to the weight values of 0 on all connections out of the particular node. In such an embodiment, subsequent retraining performed in the step 3102 using the reconfigured NNA may not be allowed to modify any zero value weight applied to an output of the removed node. In a similar manner, zero valued weights applied to all inputs of a node may also effectively remove the node by having the node output a zero value. For example, with reference to FIG. 11, assigning fixed values of zero to W4, W5 and W7 also effectively removes node H4 from the NN.

In at least one embodiment, reconfiguration of NNA may include adding a new node to a hidden layer. In at least one embodiment, a first weight having a change in value that exceeds the specified threshold may be identified by NNB. The first weight may be on a connection from a first node to a second node where the first weight is applied to the output of the first node. The first node may be included in a hidden layer of NNA. The new node may be added to the same hidden layer also including the first node. The new node may have connections to at least some of the same nodes as the first node. The new node may have connections to at least some of the same nodes providing or propagating inputs to the first node. The new node may have connections to at least some of the same nodes to which the first node provides or propagates its output to.

In at least one embodiment, reconfiguration of NNA may include preforming processing so that one or more weights of NNA may have their weights reset or reinitialized. For example, the current value of a weight of NNA (as determined automatically by retraining in the step 3102) may be a non-zero value that is below a specified minimum. In the reconfigured NNA, the weight may be reset to 0. Subsequent retraining using the reconfigured NNA may be allowed to modify the value of the weight. However, at the start of retraining using the reconfigured NNA, the value of the weight may be reset to 0. As another example, a weight having a current value above a specified threshold may be reset in the reconfigured NNA to the largest or maximum possible weight value. Subsequent retraining may be allowed to modify the value of the weight in the reconfigured NNA. However, at the start of retraining of the reconfigured NNA, the value of the weight may be reset to the largest or maximum possible weight value.

Generally, a node may be removed or deleted from NNA in connection with reconfiguration in any suitable manner. In at least one embodiment, a node may be effectively removed from a hidden layer of the reconfigured NNA by setting one or more weights=0 to cause the node's output to be 0. In such a case, the weights set=0 to force the node's output to be 0 are not adjusted or modified during retraining of the reconfigured NNA. In other words, the node's output remains fixed as 0 during retraining effectively removing or deactivating the node from the hidden layer. For example, NNA may be defined initially with 20 nodes in a hidden layer. A node in the hidden layer be removed by fixing one or more weights to 0 to force the output of the node to be 0 on all outgoing connections from the node. Retraining is not allowed to modify the weights currently forcing the node to output zero. As a variation, NNA may have its structure redefined to include only 19 nodes in the hidden layer. In the latter case, the hidden layer structure may be redefined from 20 to 19 nodes.

A node may be added to NNA in connection with reconfiguration in any suitable manner. In at least one embodiment, assume that a node has been effectively removed as described above by having one or more weights set to 0 which force the output of the node to be 0 on all connections. Such one or more weights may be fixed and not further adjusted or modified during retraining. Thus, the node has effectively been deactivated. The currently inactive or deactivated node may be reactivated and effectively added to the hidden layer by allowing the one or more weights to be adjusted to non-zero values during retraining. As a variation, NNA may have its structure redefined to increase the number of nodes in the hidden layer. For example, assume that prior to adding the new node the structure includes only 19 nodes in the hidden layer. After adding the node, the structure may be redefined from 19 to 20 nodes in the hidden layer.

In at least one embodiment, reconfiguration of NNA may include removing a hidden layer of one or more nodes and/or adding a hidden layer of one or more nodes. Consistent with discussion above, a layer may be added or removed in any suitable manner such as using the techniques described above.

Figure 26:
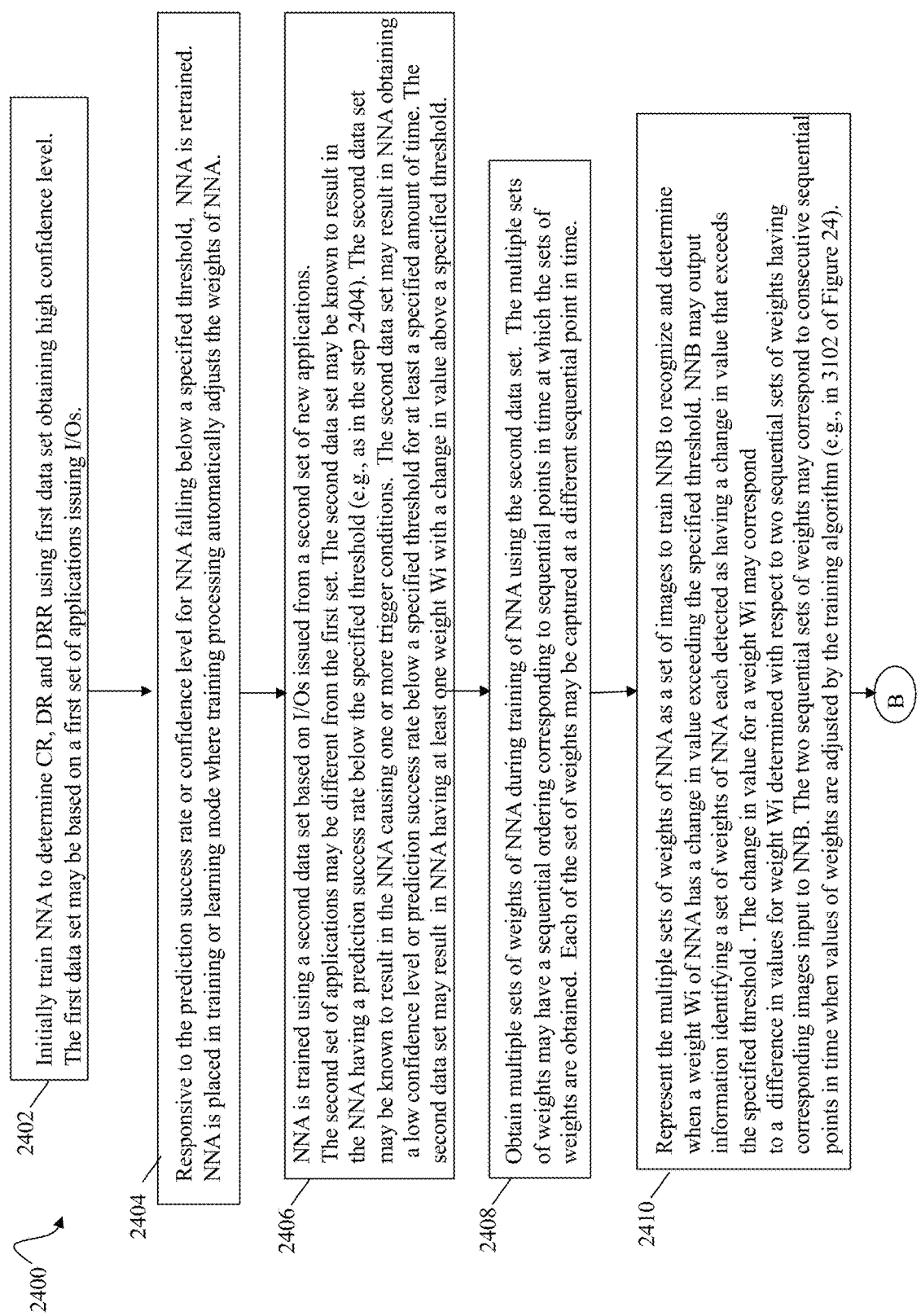
Figure 27:
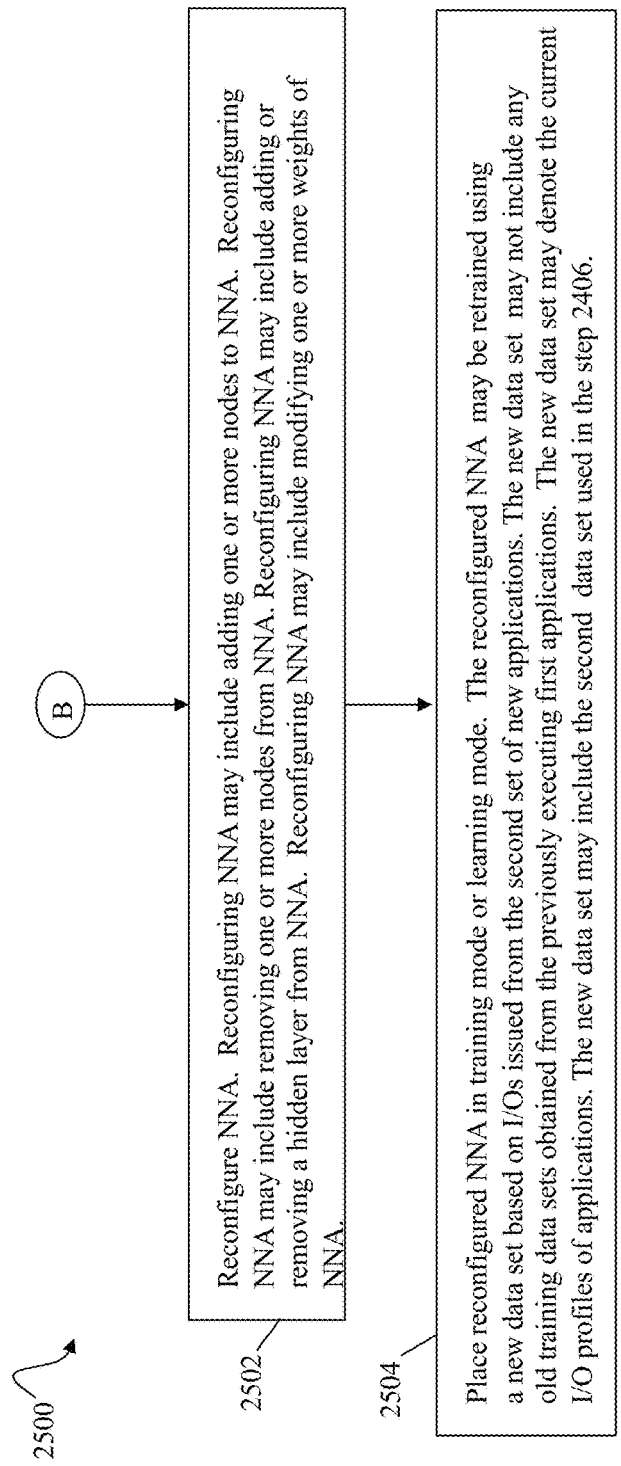

Referring to FIGS. 26 and 27, shown is a flowchart of processing steps that may be performed in an embodiment in accordance with the techniques herein. The step of 2400 and 2500 summarize processing described above.

At the step 2402, processing may be performed to initially train NNA to determine CR, DR and DRR using a first data set obtaining high confidence level. The first data set may be based on a first set of applications issuing I/Os. From the step 2402, control proceeds to the step 2404.

At the step 2404, responsive to the prediction success rate or confidence level for NNA falling below a specified threshold, NNA is retrained. NNA may be placed in training or learning mode where subsequent training processing automatically adjusts the weights of NNA. From the step 2404, control proceeds to the step 2406.

In the step 2406, processing may be performed to train NNA using a second data set based on I/Os issued from a second set of new applications. The second set of applications may be different from the first set of applications. The second data set may be known to cause the NNA to have the prediction success rate below the specified threshold (e.g., as in the step 2404). The second data set may be known to result in the NNA causing one or more trigger conditions. The second data set may result in NNA obtaining the low confidence level or prediction success rate below the specified threshold for at least a specified amount of time. The second data set may result in NNA having at least one weight Wi with a change in value that exceeds a specified threshold amount of change. From the step 2406, control proceeds to the step 2408.

At the step 2408, processing may include obtaining multiple sets of weights of NNA during the training of NNA using the second data set (e.g., as in the step 2406). The multiple sets of weights may have a sequential ordering corresponding to sequential points in time at which the sets of weights are obtained. Each of the set of weights may be captured at a different sequential point in time at which the weights of NNA may have been automatically adjusted by an iteration of the training/retraining algorithm. From the step 2408, control proceeds to the step 2410.

At the step 2410, processing may be performed to represent the multiple sets of weights of NNA as a set of images to train NNB to recognize and determine when a weight of NNA has a change in value above the specified threshold. NNB may output information identifying a set of weights of NNA each detected as having a change in value that exceeds the specified threshold. The change in weight for a weight Wi may correspond to a difference in weight Wi determined with respect to two sequential sets of weights having corresponding images input to NNB. The two sequential sets of weights may correspond to consecutive sequential points in time at which values for Wi are automatically adjusted by the training/retraining algorithm. From the step 2410, control proceeds to the step 2502.

At the step 2502, processing may be performed to reconfigure NNA. Reconfiguring NNA in the step 2502 may include adding one or more nodes to NNA. Reconfiguring NNA in the step 2502 may include removing one or more nodes from NNA. Reconfiguring NNA in the step 2502 may include adding or removing a hidden layer from NNA. Reconfiguring NNA in the step 2502 may include modifying one or more weights of NNA. In at least one embodiment, the step 2502 may use information output by NNB. For example, in at least one embodiment, the step 2502 may use the information output by NNB in the step 2410 regarding the weights of NNA have an associated change in value that exceeds a specified threshold. From the step 2502, control proceeds to the step 2504.

In the step 2504, the reconfigured NNA is placed in training mode or learning mode. The reconfigured NNA may be retrained using a new data set based on I/Os issued from the second set of new applications. The new data set may not include any old training data sets obtained from the previously executing first applications. The new data set may denote the current I/O profiles of applications. The new data set may include the second data set used in the step 2406.

Figure 28:
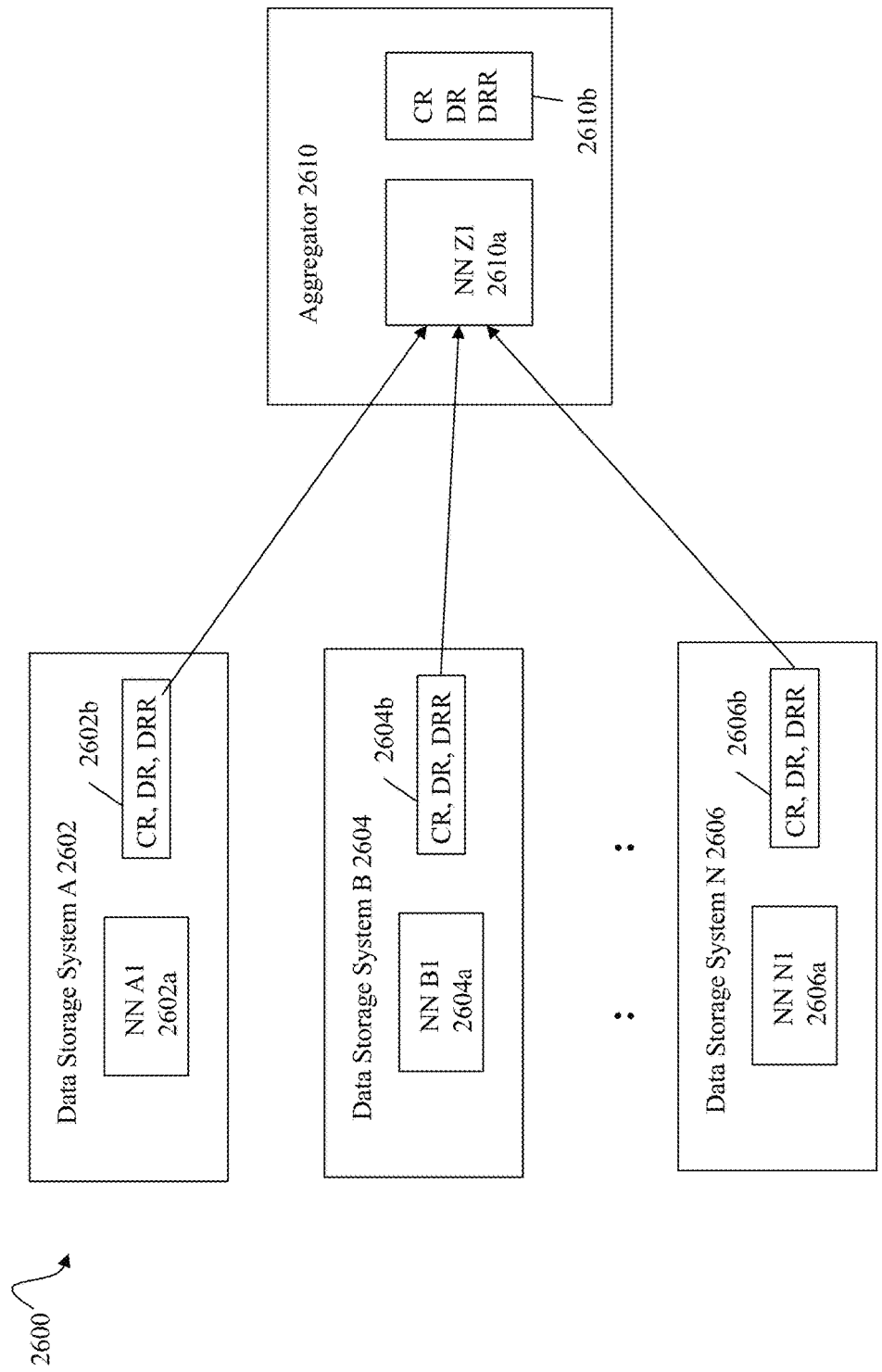
FIG. 28 is an example illustrating a group of data storage systems and an aggregator that may be included in an embodiment in accordance with the techniques herein.

In at least one embodiment, NNA 3302 may denote a NN used on a single data storage system. In at least some configurations, a SAN may include multiple data storage systems each having their own instance of NNA 3302. For example, FIG. 28 illustrates multiple data storage systems that may be included in an embodiment in accordance with the techniques herein.

The example 2600 includes aggregator 2610 and also includes N data storage systems, such as data storage system 2602, 2604 and 2606. Each of the N data storage systems may include an instance of a NN, such as NNA 3302. Data storage system A 2602 includes NN A1 2602a that predicts outputs 2602b for the system 2602. The outputs 2602b include CR, DR and CRR, such as described in connection with NNA 3302 and various items of 3320b in FIG. 25. NNA1 2602a may be an instance of NNA 3302 as described in connection with FIG. 25. Data storage system B 2604 includes NN B1 2604a that predicts outputs 2604b for the system 2604. The outputs 2604b include CR, DR and CRR, such as described in connection with NNA 3302 and various items of 3320b in FIG. 25. NNB1 2604a may be an instance of NNA 3302 as described in connection with FIG. 25. Data storage system N 2606 includes NN N1 2606a that predicts outputs 2606b for the system 2606. The outputs 2606b include CR, DR and CRR, such as described in connection with NNA 3302 and various items of 3320b in FIG. 25. NNN1 2606a may be an instance of NNA 3302 as described in connection with FIG. 25.

The aggregator 2610 may be a server having its own NN, NN Z1 2610a used to gather and present a collective prediction 2610b for all N data storage systems. For example, each of the N data storage systems may provide their respective predictive outputs 2602b, 2604b, 2606b as inputs to the NN Z1 2610a. NNZ1 2610a may then output predicted values 2610b for the entire SAN or set of N data storage systems 2602, 2604, . . . 2606.

In at least one embodiment, when one of the data storage systems, such as 2602, has a prediction success rate or confidence level below a specified threshold, such as below 90%, the data storage system 2602 may not provide its predicted outputs, such as 2602b, to the aggregator 2610. In such an embodiment, the system 2602 may perform processing as described herein in connection with FIGS. 24, 25, 26 and 27 to retrain NN A1 2602a. Until NN A1 2602a achieves a prediction success rate or confidence level at or above the specified threshold, its predicted outputs 2602b may not be combined by the aggregator 2610 in connection with generating predicted outputs 2610b for the collective set of N data storage systems.

In at least one embodiment, there may be a general assumption that all N data storage systems or a specified subset of the N data storage systems may host data for applications similar to those issuing I/Os to the data storage system 2602. In such a case where all N data storage systems store data for, and receive I/Os from, the same or similar applications, the NN of each of the N data storage systems may be replaced with the retrained instance of NN A1 2602a. For example, assume that data storage systems 2602 and 2604 each run applications of the same type and by the same vendor, such as a database application by the same vendor. In this case, NN B1 2604a may be replaced by an instance of the retrained NN A1 2602a. As a variation, the NN B1 2604a may be retrained in a manner similar to NN A1 2602a using the new data set as the training data set. Additionally, any new data storage system added to the SAN or group of systems denoted in the FIG. 28 may also include an instance of the retrained NN A1 2602a, assuming that the new data storage system also stores data for, and receives I/Os from, the same or similar applications that issue I/Os to the system 2602.

It should generally be noted that the aggregator 2610 may use the predicted outputs 2610b for the group of N data storage systems in any suitable manner. For example, in at least one embodiment, the predicted outputs 2610b determined at various points in time may be used to predict a storage consumption rate with respect to free or unused storage and further predict when a storage entity's unused capacity is exhausted or expected to fall below a specified minimum amount of unused capacity. The storage entity may be, for example, collective storage capacity across all N systems, one or more storage pools of logical devices, one or more groups of physical devices or drives such as one or more RAID groups, and the like.

In at least one embodiment, the aggregator 2610 may also provide an aggregated confidence level denoting a prediction success rate collectively for all N data storage systems. In such an embodiment, the aggregated confidence level may be determined as an average of the individual local confidence levels of the N data storage systems. In at least one embodiment, any of the N data storage systems having a local confidence level below the specified threshold may be excluded from computation performed in determining the aggregated confidence level.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing continuous learning comprising:
   receiving a first neural network that is trained using a first training data set to predict a first set of one or more outputs;
   determining whether the first neural network has a successful prediction rate greater than a prediction threshold; and
   responsive to determining the first neural network does not have a successful prediction rate greater than the prediction threshold, performing first processing including:
      training the first neural network using a second training data set different than the first training data set, wherein during said training of the first neural network using the second training data set, weights of the first neural network are adjusted;
      determining that a trigger condition has occurred, wherein the trigger condition includes detecting, during said training of the first neural network using the second training data set, that at least a first weight of the first neural network has a corresponding weight change exceeding a threshold weight change;
      responsive to determining the trigger condition has occurred, performing second processing that reconfigures the first neural network and generates a reconfigured first neural network; and
      training the reconfigured first neural network, rather than the first neural network, using the second training data set.

2. The method of claim 1, wherein the trigger condition is one of a plurality of trigger conditions, and wherein if any one or more of the plurality of trigger conditions occurs in connection with said training of the first neural network with the second training data set, said second processing is performed.

3. The method of claim 2, wherein the plurality of trigger conditions includes a second trigger condition that includes determining that said training of the first neural network using the second training data set results in the first neural network obtaining a successful prediction rate that is not greater than the prediction threshold for at least a specified amount of time.

4. The method of claim 3, wherein a first data set includes first inputs and corresponding first outputs, wherein the first neural network is known to have a successful prediction rate that is not greater than the prediction threshold when predicting outputs for the first inputs of the first data set, and wherein the second training data set includes at least some of the first inputs and corresponding first outputs of the first data set.

5. The method of claim 1, wherein said detecting, that at least the first weight of the first neural network has a corresponding weight change exceeding the threshold weight change, is performed using a second neural network.

6. The method of claim 5, wherein the second neural network is trained to detect weight changes of connections in a neural network where the weight changes exceed the threshold weight change.

7. The method of claim 6, further comprising:
   obtaining a plurality of images, wherein each of the plurality of images represents a plurality of weights of the first neural network during said training of the first neural network using the second training data set; and
   wherein said detecting includes:
      providing the plurality of images as inputs to the second neural network; and
      determining, in accordance with the plurality of images, that the first weight of the first neural network has the corresponding weight change exceeding the threshold weight change.

8. The method of claim 1, wherein said second processing that reconfigures the first neural network includes removing a first node from the first neural network.

9. The method of claim 8, wherein said training of the first neural network using the second training data set includes assigning a value of zero to each weight applied to an output of the first node whereby the first node is effectively removed from the first neural network, wherein the reconfigured neural network includes a value of zero for each weight applied to an output of the first node, and wherein said training the reconfigured first neural network is not allowed to modify any weight that is applied to an output of the first node and that is assigned a value of zero.

10. The method of claim 8, wherein said training of the first neural network using the second training data set includes assigning a value of zero to each weight applied to an input of the first node whereby the first node is effectively removed from the first neural network, wherein the reconfigured neural network includes a value of zero for each weight applied to an input of the first node, and wherein said training the reconfigured first neural network is not allowed to modify any weight that is applied to an input of the first node and that is assigned a value of zero.

11. The method of claim 1, wherein said second processing that reconfigures the first neural network includes adding a new node to the first neural network.

12. The method of claim 11, wherein the first weight of the first neural network having a corresponding weight change exceeding the threshold weight change is included on a first connection from a first node to a second node and the first weight is applied to a first output of the first node of a first hidden layer, and said second processing adds the new node to the first hidden layer.

13. The method of claim 12, wherein the first node has connections to a first set of one or more other nodes and the new node has connections to at least one node of the first set.

14. The method of claim 13, wherein the new node has a connection to at least one node providing and propagating an input to the first node.

15. The method of claim 13, wherein the first node propagates a first output over the first connection to the second node and wherein the new node has a connection to the second node.

16. The method of claim 1, wherein said second processing that reconfigures the first neural network includes resetting a particular weight of the first neural network.

17. The method of claim 16, wherein during said training of the first neural network using the second training data set, the particular weight has a non-zero value that is less than a specified threshold weight, and wherein said second processing resets the particular weight to zero in the reconfigured first neural network, and wherein said training the reconfigured first neural network is allowed to modify the particular weight.

18. A system comprising:
one or more processors; and
one or more memories comprising code stored thereon that, when executed, perform a method of performing continuous learning comprising:
receiving a first neural network that is trained using a first training data set to predict a first set of one or more outputs;
determining whether the first neural network has a successful prediction rate greater than a prediction threshold; and
responsive to determining the first neural network does not have a successful prediction rate greater than the prediction threshold, performing first processing including:
training the first neural network using a second training data set different than the first training data set, wherein during said training of the first neural network using the second training data set, weights of the first neural network are adjusted;
determining that a trigger condition has occurred, wherein the trigger condition includes detecting, during said training of the first neural network using the second training data set, that at least a first weight of the first neural network has a corresponding weight change exceeding a threshold weight change;
responsive to determining the trigger condition has occurred, performing second processing that reconfigures the first neural network and generates a reconfigured first neural network; and
training the reconfigured first neural network, rather than the first neural network, using the second training data set.

19. A non-transitory computer readable medium comprising code stored thereon that, when executed, performs a method of performing continuous learning comprising:
receiving a first neural network that is trained using a first training data set to predict a first set of one or more outputs;
determining whether the first neural network has a successful prediction rate greater than a prediction threshold; and
responsive to determining the first neural network does not have a successful prediction rate greater than the prediction threshold, performing first processing including:
training the first neural network using a second training data set different than the first training data set, wherein during said training of the first neural network using the second training data set, weights of the first neural network are adjusted;
determining that a trigger condition has occurred, wherein the trigger condition includes detecting, during said training of the first neural network using the second training data set, that at least a first weight of the first neural network has a corresponding weight change exceeding a threshold weight change;
responsive to determining the trigger condition has occurred, performing second processing that reconfigures the first neural network and generates a reconfigured first neural network; and
training the reconfigured first neural network, rather than the first neural network, using the second training data set.

* * * * *